US012331959B2

(12) United States Patent
Park et al.

(10) Patent No.: US 12,331,959 B2
(45) Date of Patent: *Jun. 17, 2025

(54) HEAT EXCHANGER UNIT

(71) Applicant: KYUNGDONG NAVIEN CO., LTD., Gyeonggi-do (KR)

(72) Inventors: Jun Kyu Park, Seoul (KR); Duck Sik Park, Seoul (KR)

(73) Assignee: KYUNGDONG NAVIEN CO., LTD., Gyeonggi-do (KR)

(*) Notice: Subject to any disclaimer, the term of this patent is extended or adjusted under 35 U.S.C. 154(b) by 220 days.

This patent is subject to a terminal disclaimer.

(21) Appl. No.: 18/099,223

(22) Filed: Jan. 19, 2023

(65) Prior Publication Data

US 2023/0152007 A1 May 18, 2023

Related U.S. Application Data

(63) Continuation of application No. 16/973,025, filed as application No. PCT/KR2019/006543 on May 30, 2019, now Pat. No. 11,585,572.

(30) Foreign Application Priority Data

Jun. 5, 2018 (KR) .................. 10-2018-0064666
Jun. 5, 2018 (KR) .................. 10-2018-0064668
(Continued)

(51) Int. Cl.
*F28F 1/20* (2006.01)
*F24H 8/00* (2022.01)
(Continued)

(52) U.S. Cl.
CPC .............. *F24H 8/006* (2013.01); *F24H 9/18* (2013.01); *F28D 1/053* (2013.01); *F28F 1/32* (2013.01);
(Continued)

(58) Field of Classification Search
CPC ... F24H 8/06; F24H 9/18; F28D 1/053; F28D 2021/0024; F28F 1/32; F28F 9/02
(Continued)

(56) References Cited

U.S. PATENT DOCUMENTS 2,006,649 A 7/1935 Modine
4,509,672 A 4/1985 Woodhull, Jr. et al.
(Continued)

FOREIGN PATENT DOCUMENTS

AT 396026 B 5/1993
AT 399772 B 7/1995
(Continued)

OTHER PUBLICATIONS

Korean Patent Office, Notification of First Office Action for related Application No. 10-2024-0040455 report issue date Jun. 18, 2024, Korea, 10 pages.
(Continued)

*Primary Examiner* — Davis D Hwu
(74) *Attorney, Agent, or Firm* — MCDONALD HOPKINS LLC

(57) ABSTRACT

A heat exchanger unit according to the present invention includes a sensible heat exchanger including a sensible heat exchange pipe disposed in a sensible heat exchange area for heating water used for heating by receiving sensible heat generated by a combustion reaction, wherein the sensible heat exchange pipe receives the water used for heating and flows same through the interior, and a sensible heat fin disposed in the sensible heat exchange area. The sensible heat fin is formed in a plate shape across the sensible heat exchange pipe and penetrated by the sensible heat exchange pipe; and a latent heat exchanger positioned downstream from the sensible heat exchange area on the basis of a reference direction, which is a flow direction of combustion
(Continued)

gas generated during the combustion reaction, the latent heat exchanger including a latent heat exchange pipe disposed in a latent heat exchange area.

19 Claims, 29 Drawing Sheets

(30) Foreign Application Priority Data

Jun. 5, 2018 (KR) ........................ 10-2018-0064669
Dec. 6, 2018 (KR) ........................ 10-2018-0156356

(51) Int. Cl.
*F24H 9/18* (2022.01)
*F28D 1/053* (2006.01)
*F28F 1/32* (2006.01)
*F28F 9/02* (2006.01)
*F28D 21/00* (2006.01)

(52) U.S. Cl.
CPC ........ *F28F 9/02* (2013.01); *F28D 2021/0024* (2013.01)

(58) Field of Classification Search
USPC .......................................................... 165/181
See application file for complete search history.

(56) References Cited

U.S. PATENT DOCUMENTS

| | | | |
|---|---|---|---|
| 5,346,001 A | 9/1994 | Rieke et al. | |
| 5,359,989 A | 11/1994 | Chase et al. | |
| 5,437,248 A | 8/1995 | Miura et al. | |
| 5,761,808 A | 6/1998 | Patel et al. | |
| 6,059,174 A | 5/2000 | Kojima et al. | |
| 6,923,013 B2 | 8/2005 | Chiang et al. | |
| 7,096,933 B1 | 8/2006 | Zia et al. | |
| 7,353,781 B2 | 4/2008 | Jung et al. | |
| 10,126,014 B2 | 11/2018 | Kim | |
| 10,254,053 B2 | 4/2019 | Okamoto et al. | |
| 10,295,222 B2 | 5/2019 | Ooshita | |
| 10,393,404 B2 | 8/2019 | Kondo et al. | |
| 10,408,549 B2 | 9/2019 | Oohigashi et al. | |
| 10,605,484 B2 | 3/2020 | Kim | |
| 10,612,776 B2 | 4/2020 | Ono et al. | |
| 10,823,455 B2 | 11/2020 | Park et al. | |
| 10,890,356 B2 | 1/2021 | Shiotsu et al. | |
| 10,928,063 B2 | 2/2021 | Ono et al. | |
| 11,287,158 B2 | 3/2022 | Kondo et al. | |
| 11,585,572 B2 * | 2/2023 | Park ........................ F24H 8/00 | |
| 2004/0031480 A1 | 2/2004 | Jung et al. | |
| 2007/0204980 A1 | 9/2007 | Kim et al. | |
| 2010/0116226 A1 | 5/2010 | Lovascio et al. | |
| 2010/0307727 A1 | 12/2010 | Min | |
| 2011/0114300 A1 | 5/2011 | Kim et al. | |
| 2013/0125838 A1 | 5/2013 | Min | |
| 2013/0180689 A1 | 7/2013 | Boning et al. | |
| 2013/0216962 A1 | 8/2013 | Dresner et al. | |
| 2015/0204579 A1 | 7/2015 | Brown et al. | |
| 2015/0300687 A1 | 10/2015 | Cui | |
| 2016/0273850 A1 | 9/2016 | Okamoto et al. | |
| 2016/0377320 A1 | 12/2016 | Kim | |
| 2017/0059205 A1 | 3/2017 | Kim | |
| 2017/0108281 A1 | 4/2017 | Klaves et al. | |
| 2017/0335740 A1 | 11/2017 | Dries et al. | |
| 2018/0087805 A1 | 3/2018 | Ooshita | |
| 2018/0087806 A1 | 3/2018 | Kondo et al. | |
| 2018/0216848 A1 | 8/2018 | Jeong | |
| 2018/0238639 A1 | 8/2018 | Jeong | |
| 2018/0363897 A1 | 12/2018 | Ono et al. | |
| 2018/0363948 A1 | 12/2018 | Park et al. | |
| 2018/0372311 A1 | 12/2018 | Ono et al. | |
| 2019/0154300 A1 | 5/2019 | Kondo et al. | |
| 2019/0226719 A1 | 7/2019 | Shiotsu et al. | |
| 2021/0199340 A1 | 7/2021 | Park et al. | |
| 2021/0247102 A1 | 8/2021 | Park et al. | |
| 2021/0247103 A1 | 8/2021 | Park et al. | |

FOREIGN PATENT DOCUMENTS

| | | |
|---|---|---|
| CA | 2978765 A1 | 3/2018 |
| CN | 1370964 A | 9/2002 |
| CN | 1460820 A | 12/2003 |
| CN | 1605812 A | 4/2005 |
| CN | 2842210 Y | 11/2006 |
| CN | 101782270 A | 7/2010 |
| CN | 101903711 A | 12/2010 |
| CN | 102901221 A | 1/2013 |
| CN | 103069225 A | 4/2013 |
| CN | 205299948 U | 6/2016 |
| CN | 105987632 A | 10/2016 |
| CN | 106133456 A | 11/2016 |
| CN | 205690651 U | 11/2016 |
| CN | 206478864 U | 9/2017 |
| CN | 107923653 A | 4/2018 |
| DE | 102017212965 B4 | 11/2020 |
| EP | 0195383 A2 | 9/1986 |
| EP | 0685698 A | 12/1995 |
| EP | 0687870 B1 | 1/2000 |
| EP | 1026454 A2 | 8/2000 |
| EP | 1139036 A2 | 10/2001 |
| EP | 1396688 A2 | 3/2004 |
| EP | 1026454 B1 | 4/2006 |
| EP | 2722610 A1 | 4/2016 |
| EP | 3173722 A | 5/2017 |
| FR | 2640028 A2 | 6/1990 |
| JP | S60-106058 U | 7/1985 |
| JP | 2003-021390 A | 1/2003 |
| JP | 2003-161527 A | 6/2003 |
| JP | 2005326102 A | 11/2005 |
| JP | 2006-153375 A | 6/2006 |
| JP | 2006284037 A | 10/2006 |
| JP | 2019-095116 A | 6/2019 |
| JP | 2019-128083 A | 8/2019 |
| KR | 10-1999-0000646 A | 1/1999 |
| KR | 20-1999-0000409 A | 1/1999 |
| KR | 10-0219911 B1 | 9/1999 |
| KR | 10-2000-0057855 A | 9/2000 |
| KR | 200219877 Y1 | 4/2001 |
| KR | 10-2001-0049983 A | 6/2001 |
| KR | 10-2018-0097682 A | 6/2001 |
| KR | 20-0257930 Y | 12/2001 |
| KR | 10-2002-0000703 A | 1/2002 |
| KR | 10-2002-0001465 A | 1/2002 |
| KR | 100392593 B1 | 1/2002 |
| KR | 2002-0067301 A | 8/2002 |
| KR | 10-0361553 B | 11/2002 |
| KR | 10-0386960 B | 6/2003 |
| KR | 1020050000127 A | 1/2005 |
| KR | 10-2006-000590 A | 1/2006 |
| KR | 10-0570291 B | 4/2006 |
| KR | 10-0570286 B1 | 11/2006 |
| KR | 10-0896407 B | 5/2009 |
| KR | 1020090047901 A | 5/2009 |
| KR | 20090067760 A1 | 6/2009 |
| KR | 100933419 B1 | 12/2009 |
| KR | 10-20100054384 A | 5/2010 |
| KR | 100975104 B1 | 5/2010 |
| KR | 1020100117842 A | 11/2010 |
| KR | 10-2010-0128505 A | 12/2010 |
| KR | 10-2011-0077307 A | 7/2011 |
| KR | 10-2011-0077308 A | 7/2011 |
| KR | 10-2014-0051760 A | 5/2014 |
| KR | 10-2014-0083626 A | 7/2014 |
| KR | 10-1445786 B1 | 10/2014 |
| KR | 101586646 B1 | 9/2015 |
| KR | 10-2017-0025476 A | 3/2017 |
| KR | 10-2017-0031338 A | 3/2017 |
| KR | 10-2017-0067491 A | 6/2017 |
| KR | 2020170003855 U | 11/2017 |
| KR | 10-1810122 B1 | 12/2017 |
| KR | 10-2018-0007933 A | 1/2018 |
| KR | 10-2018-0007984 A | 1/2018 |

(56) References Cited

FOREIGN PATENT DOCUMENTS

| KR | 10-2018-0097681 A | 8/2018 |
|---|---|---|
| KR | 1020180087986 A | 8/2018 |
| KR | 10-2019-0132043 A | 11/2019 |
| KR | 10-2019-0138553 A | 12/2019 |
| KR | 10-2019-0138554 A | 12/2019 |
| KR | 10-2019-0138555 A | 12/2019 |
| KR | 10-2019-0138585 A | 12/2019 |
| KR | 10-2021-0032347 A | 3/2021 |
| KR | 10-2021-0032348 A | 3/2021 |
| KR | 10-2021-0039363 A | 4/2021 |
| WO | 2006097959 A1 | 9/2006 |
| WO | 2007102653 A1 | 9/2007 |
| WO | 2008056238 A2 | 5/2008 |
| WO | 2012020909 A | 2/2012 |
| WO | 2012177154 A | 12/2012 |
| WO | 2014104575 A | 7/2014 |
| WO | 2017099381 A | 6/2017 |

OTHER PUBLICATIONS

Korean Patent Office, Third Party Submission for related Application No. 10-2024-0040455 report issue date Jul. 2, 2024, Korea, 2 pages.
United States Patent Office, Notification of Third Party Submission for U.S. Appl. No. 18/099,223 report issued on Jul. 28, 2024, United States, 25 pages.
Ahn et al., Brazing Technology for Heat Exchangers, Journal of KWS, vol. 17, No. 2, Apr. 1999, pp. 9-17.
Chinese Patent Office, Notice of Allowance for corresponding Chinese Application No. 202210759593.4 report issued on Sep. 28, 2023, China, 5 pages.
United States Patent Office, Notification of Final Office Action for corresponding U.S. Appl. No. 16/973,016 report issued on Nov. 17, 2023, United States, 12 pages.
Korean Patent Office, Notification of First Office Action for corresponding application No. 10-2023-0064904, issued on Jun. 29, 2023, Korea, 6 pages.
United States Patent Office, Notification of Non Final Office Action for corresponding U.S. Appl. No. 16/973,016 report issued on Mar. 7, 2024, United States, 13 pages.
Korean Patent Office, Notification of First Office Action for corresponding Application No. 10-2023-0108464 report Issue date Sep. 15, 2023, Korea, 7 pages.
Korean Patent Office, Notification of Preliminary Rejection for corresponding Application No. 10-2022-0119550 report Issue date Sep. 15, 2023, Korea, 5 pages.
United States Patent Office, Notification of Non Final Office Action for related U.S. Appl. No. 17/131,772, report issue date Aug. 16, 2023, 11 pages.
International Search Report and Written Opinion for International Patent Application No. PCT/KR2019/006543 dated Aug. 29, 2019, 10 pages long.
Extended European Search Report for European App. No. 19814468.5 dated Jul. 5, 2021, 9 pages long.
First Office Action for Korean Patent Application No. 10-2021-0039671 dated Jun. 18, 2021, 6 pages long.
First Office Action for Korean Patent Application No. 10-2021-0032298 dated Jun. 18, 2021, 6 pages long.
Extended European Search Report for European App. No. 19814828.0 dated Jun. 9, 2021, 7 pages long.
First Office Action for corresponding Chinese Patent App. No. 201980037912.7 dated Nov. 1, 2021, 9 pages long.
Notice of Allowance for related Korean Patent App. No. 10-2018-0156357 received on Nov. 17, 2021, 2 pages long.
First Office Action for corresponding Chinese Patent App. No. 20190038009.2 dated Nov. 16, 2021, 10 pages long.
Notification of Third Party Submission for related Korean Patent App. No. 10-2021-0032298 dated Dec. 29, 2021. 2 pages long.
Notification of Third Party Submission for related Korean Patent App. No. 10-2021-0032298 dated Feb. 10, 2022, 2 pages long.
Notice of Reason for Cancellation for related Korean Patent Application No. 10-2018-0156356 dated Feb. 24, 2022, 13 pages long.
Notification of Third Party Submission for related Korean Patent Application No. 10-2019-0178390 dated Jan. 17, 2022, 2 pages long.
Notification of Third Party Submission for related Korean Patent Application No. 10-2019-0178390 dated Mar. 31, 2022, 2 pages long.
"6. Report on development of multi-stage core type oil cooling systems for marine and industrial use" (Final version) issued on Jun. 2005, pp. 11, 12 and 34.
Office Action for related CN Application No. 202011606440.3 dated May 30, 2022, 21 pages long.
Office Action for related KR Application No. 10-2020-0083879 dated Jun. 14, 2022, 9 pages long.
Extended European Search Report for related EP Application No. 20217737.4 dated May 11, 2021, 8 pages long.
Office Action for related U.S. Appl. No. 16/973,016 dated Sep. 15, 2022, 46 pages long.
Office Action for related U.S. Appl. No. 17/131,772 dated Sep. 22, 2022, 50 pages long.
Office Action for related KR Application No. 10-2022-0119550 dated Nov. 30, 2022, 8 pages long.
Development of Ultra-Efficient Condensing Gas Boiler, pp. 1-160, Publication Date: 2013, Kiturami Co. Ltd., http://ntis.go.kr/outcomes/popup/srchtotlrschrpt.do?cmd=get_contents&rstld=rep-2013-0118225187&tapgubun=baseinfo.
State Intellectual Property Office of People's Republic of China, Notification of First Office Action for corresponding Application No. 202210757708.6 report issue date Mar. 28, 2023, China.
State Intellectual Property Office of People's Republic of China, Notification of First Office Action for corresponding Application No. 202210759593.4 report issue date Mar. 27, 2023, China.
United States Patent Office, Notification of Final Office Action for related U.S. Appl. No. 17/131,772, report issue date Mar. 30, 2023.
United States Patent Office, Notice of Allowance for corresponding U.S. Appl. No. 16/973,016 issued on Feb. 27, 2025, United States, 8 pages.

* cited by examiner

HEAT EXCHANGER UNIT

CROSS-REFERENCE TO RELATED APPLICATIONS

This application is a continuation of U.S. patent application Ser. No. 16/973,025 filed on Dec. 7, 2020, and entitled "HEAT EXCHANGER UNIT AND CONDENSING BOILER USING THE SAME," which is the U.S. National Phase entry of International Patent Application No. PCT/KR2019/006543 filed May 30, 2019, which claims priority to Korean Patent Application Nos. 10-2018-0064669, filed on Jun. 5, 2018; 10-2018-0064666 filed Jun. 5, 2018; 10-2018-0064668 filed Jun. 5, 2018; and 10-2018-0156356 filed Dec. 6, 2018, all of the above listed applications are herein incorporated by reference.

TECHNICAL FIELD

The present disclosure relates to a heat exchanger unit.

BACKGROUND ART

A boiler is an apparatus for heating a desired area by heating fluid in a container. Accordingly, to heat up heating-water of the boiler, the boiler generally has a heat source, a burner including the heat source, and a heat exchanger unit for heating the heating-water using combustion gas. In a condensing boiler that comprehensively uses heat of combustion gas, sensible heat generated from a burner is supplied to heating-water, and the sensible heat of the combustion gas generated from the burner and latent heat caused by a phase change of the combustion gas are supplied to the heating-water. Accordingly, the heating-water is heated.

To supply the sensible heat and the latent heat to the heating-water, a method of locating a container for storing the heating-water in a position close to an area in which the combustion gas flows and a heat source for supplying sensible heat is mainly used. Heat is indirectly transferred to the heating-water through the container to raise the temperature of the heating-water to a temperature appropriate for heating, and thereafter the heating-water is supplied to an area that has to be heated.

A plate type heat exchanger unit having a plurality of stacked plates is mainly used for the heat transfer. However, the plate type heat exchanger unit has problems of a difficulty in a manufacturing process and high cost despite excellent thermal efficiency.

DISCLOSURE

Technical Problem

The present disclosure has been made to solve the above-mentioned problems occurring in the prior art. An aspect of the present disclosure provides a heat exchanger unit that has excellent thermal efficiency while using a fin-tube type heat exchange device.

Technical Solution

A heat exchanger unit according to an embodiment of the present disclosure includes a sensible heat exchanging part including a sensible heat exchange pipe that is disposed in a sensible heat exchange area for receiving sensible heat generated by a combustion reaction and heating heating-water and that receives the heating-water and allows the heating-water to flow therethrough and a sensible heat fin disposed in the sensible heat exchange area and formed in a plate shape across the sensible heat exchange pipe such that the sensible heat exchange pipe passes through the sensible heat fin, and a latent heat exchanging part including a latent heat exchange pipe that is disposed in a latent heat exchange area for receiving latent heat generated during a phase change of combustion gas and heating the heating-water and that receives the heating-water and allows the heating-water to flow therethrough and a latent heat fin disposed in the latent heat exchange area and formed in a plate shape across the latent heat exchange pipe such that the latent heat exchange pipe passes through the latent heat fin, the latent heat exchange area being located downstream of the sensible heat exchange area based on a reference direction that is a flow direction of the combustion gas generated during the combustion reaction.

A condensing boiler according to an embodiment of the present disclosure includes a burner assembly causes a combustion reaction, a combustion chamber located downstream of the burner assembly on the basis of a flow direction of a combustion gas generated by the combustion reaction, and in which flame generated by the combustion reaction is located and a heat exchanger unit configured to receive sensible heat and the combustion gas generated by the combustion reaction to heat heating-water. The heat exchanger unit includes a sensible heat exchanging part including a sensible heat exchange pipe disposed in a sensible heat exchange area and configured to receive the heating-water and allow the heating-water to flow therethrough and a sensible heat fin disposed in the sensible heat exchange area and formed in a plate shape across the sensible heat exchange pipe such that the sensible heat exchange pipe passes through the sensible heat fin, the sensible heat exchange area being configured to receive sensible heat generated by a combustion reaction and to heat the heating-water, the heat exchanger unit includes a latent heat exchanging part including a latent heat exchange pipe disposed in a latent heat exchange area and configured to receive the heating-water and allow the heating-water to flow therethrough and a latent heat fin disposed in the latent heat exchange area and formed in a plate shape across the latent heat exchange pipe such that the latent heat exchange pipe passes through the latent heat fin, the latent heat exchange area being located downstream of the sensible heat exchange area based on a reference direction that is a flow direction of combustion gas generated during the combustion reaction and configured to receive latent heat generated during a phase change of the combustion gas and to heat the heating-water.

Advantageous Effects

Accordingly, heat transfer efficiency may not be deteriorated despite the use of an inexpensive and easy-to-manufacture fin-tube type heat exchanger unit.

DETAILED DESCRIPTION OF THE PREFERRED EMBODIMENT

Figure 1:
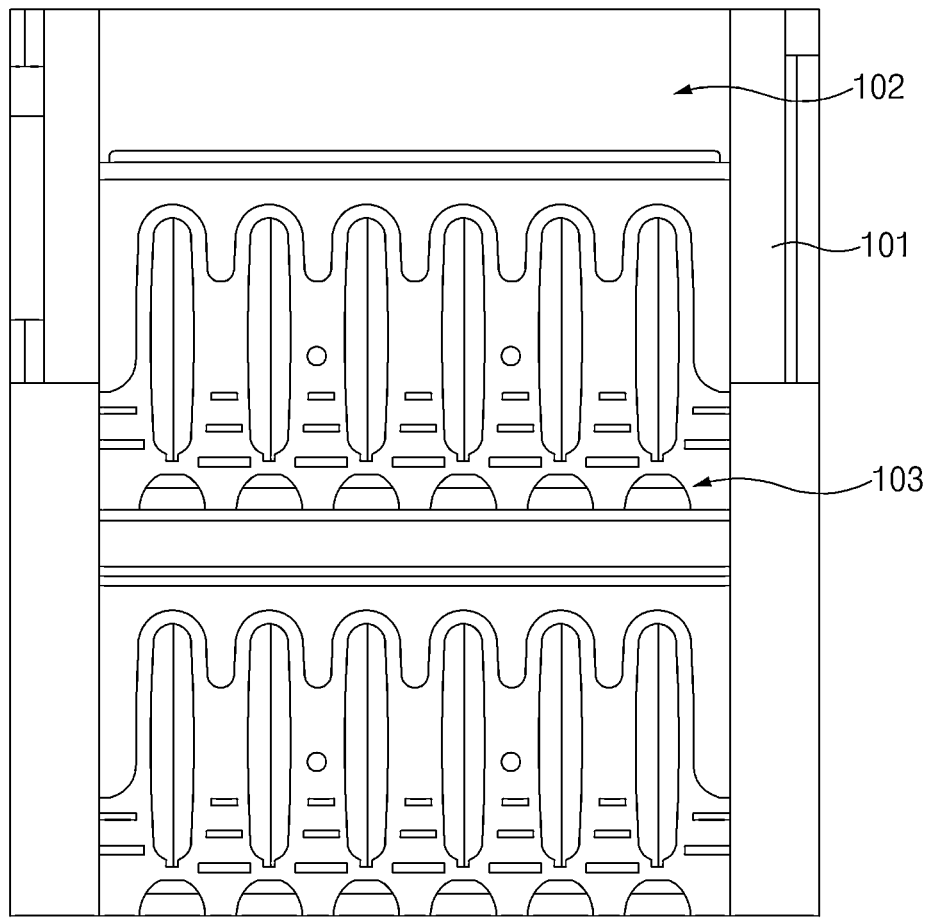
FIG. 1 is a vertical sectional view of part of an exemplary heat exchanger unit.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

As a method of arranging a burner, heat exchangers, and a combustion chamber constituting a condensing boiler, a method of configuring the condensing boiler by locating the burner at the lowermost position and sequentially arranging the combustion chamber surrounded by insulation of a dry type, a sensible heat exchanger of a fin-tube type, and a latent heat exchanger of a plate type in an upward direction may be considered. This type of condensing boiler is referred to as a bottom-up boiler. In the case of the bottom-up boiler, condensate generated by condensation of combustion gas in the latent heat exchanger may fall onto the sensible heat exchanger and the combustion chamber.

Therefore, the sensible heat exchanger and the insulation of the dry type that surrounds the combustion chamber may be easily corroded by the condensate with high acidity. Furthermore, as the different types of heat exchangers are connected with each other, manufacturing costs may be increased due to additional connecting parts.

To solve the problems caused by the condensate, a method of configuring a condensing boiler by locating a burner at the uppermost position and sequentially arranging a combustion chamber thermally insulated by being surrounded by a heat insulation pipe, a sensible heat exchanger of a fin-tube type, and a latent heat exchanger of a plate type in a downward direction may be considered. This type of condensing boiler is referred to as a top-down boiler. In this case, as the latent heat exchanger is located at the lowermost position, condensate is immediately discharged through a condensate receiver and does not reach the sensible heat exchanger or the combustion chamber, and thus a problem of corrosion may be solved. However, many parts including the heat insulation pipe used to cool the combustion chamber are used, and due to this, the number of assembly steps is increased, which leads to an increase in manufacturing costs. Furthermore, as the different types of heat exchangers are connected with each other, manufacturing costs may be increased due to additional connecting parts.

FIG. 1 is a vertical sectional view of part of an exemplary heat exchanger unit. As illustrated in FIG. 1, a top-down boiler may be used, and a method of performing thermal insulation in a dry type by surrounding a combustion chamber 102 and a sensible heat exchanger 103 with insulation 101 may be considered. That is, a case where the insulation of a dry type, which is used for the combustion chamber 102, is disposed to insulate heat radiated from the area of the sensible heat exchanger 103 may be considered. However, in this case, due to the sensible heat exchanger 103, flame generated through a combustion reaction, and excessive heat generated from combustion gas, the insulation 101 may be damaged, and the durability may be decreased. Furthermore, condensate is more likely to be generated in a position adjacent to the sensible heat exchanger 103 than in the combustion chamber 102, and therefore when the insulation 101, as in the drawing, further extends downward beyond the position that the combustion chamber 102 extends downward and reaches, the condensate may make contact with the insulation 101 of a dry type so that the insulation 101 may be damaged.

First Embodiment

Figure 2:
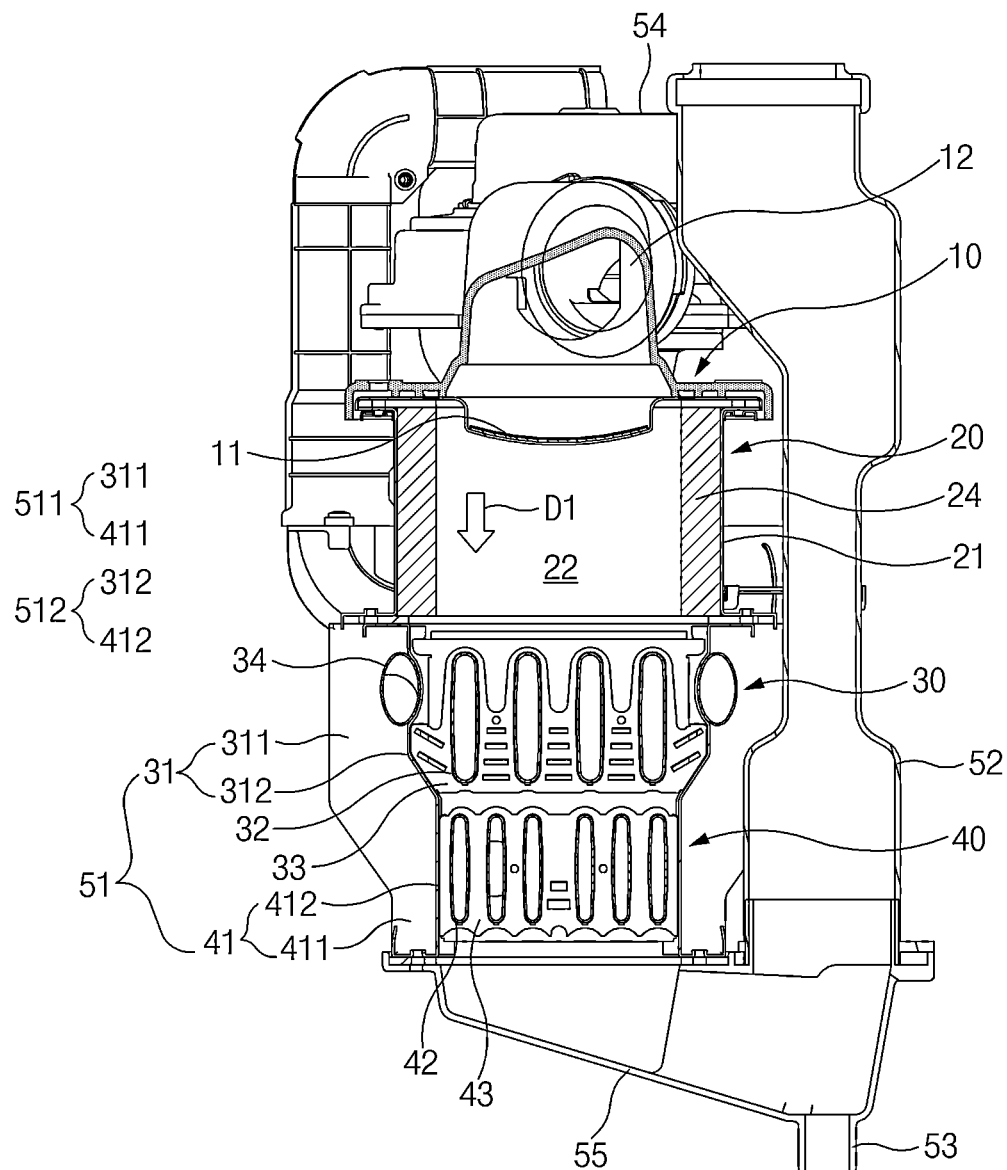
FIG. 2 is a vertical sectional view of a heat exchanger unit and a condensing boiler using the same according to a first embodiment of the present disclosure.
Figure 3:
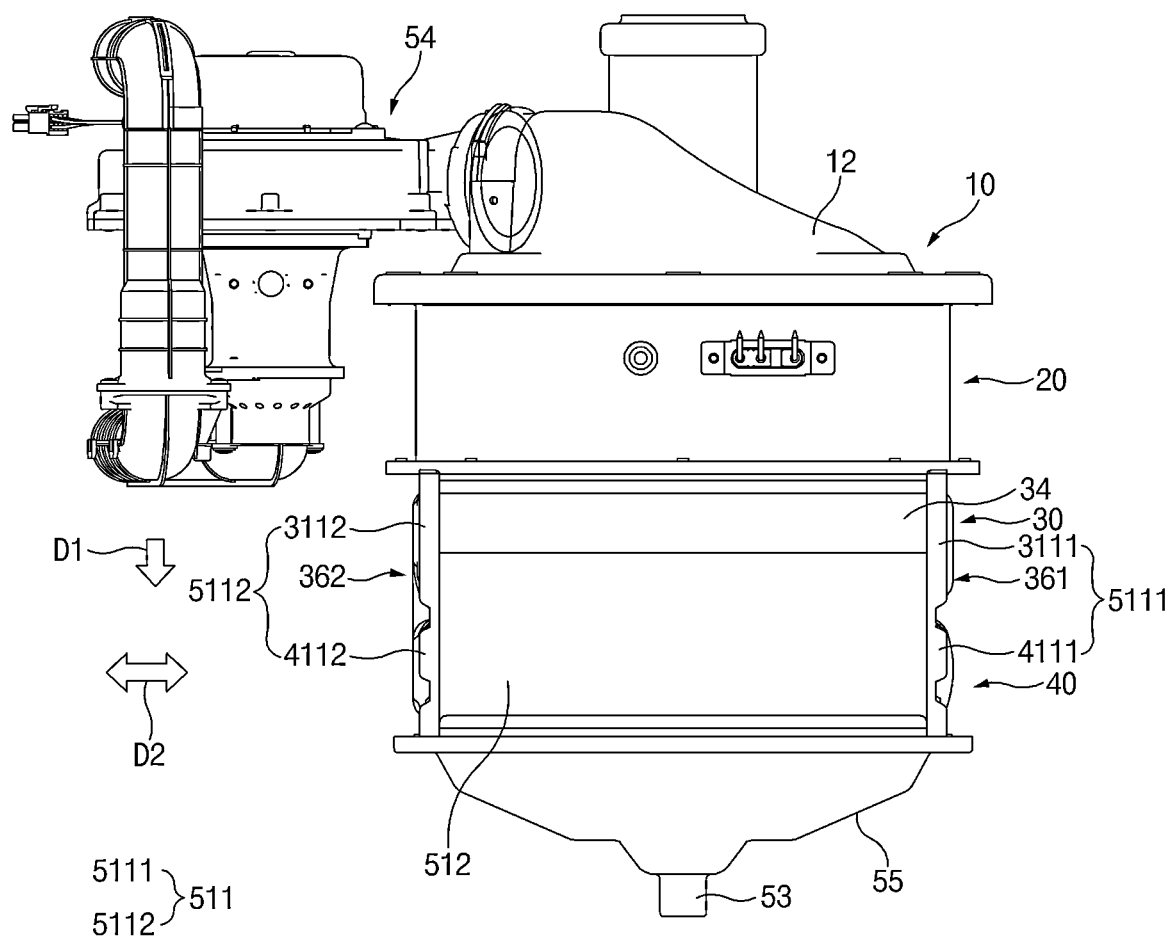
FIG. 3 is a side view of the heat exchanger unit and the condensing boiler using the same according to the first embodiment of the present disclosure.

FIG. 2 is a vertical sectional view of a heat exchanger unit and a condensing boiler 1 using the same according to the first embodiment of the present disclosure. FIG. 3 is a side view of the heat exchanger unit and the condensing boiler 1 using the same according to the first embodiment of the present disclosure.

Referring to the drawings, the heat exchanger unit according to the first embodiment of the present disclosure includes a sensible heat exchanger 30, a latent heat exchanger 40, and sensible heat insulation pipes 34. The components constituting the heat exchanger unit may be fixed in positions as illustrated.

Furthermore, the condensing boiler 1 including the heat exchanger unit according to the first embodiment of the present disclosure includes a combustion chamber 20 and a burner assembly 10 including a burner 11. The burner assembly 10 and the heat exchanger unit are disposed in sequence along a flow direction D1 of combustion gas, and components are arranged in the heat exchanger unit along the same direction in the order of the combustion chamber 20, the sensible heat exchanger 30, the latent heat exchanger 40, and the sensible heat insulation pipes 34 disposed together with the sensible heat exchanger 30. Accordingly, the components of the condensing boiler 1 will be described below in the above-described order of arrangement.

The heat exchanger unit and the condensing boiler 1 using the same according to the first embodiment of the present disclosure will be described below based on a top-down condensing boiler 1 in which combustion gas flows vertically downward. Accordingly, the flow direction D1 of the combustion gas that is represented by an arrow may be the same as the vertical downward direction at the position where the condensing boiler 1 is installed. As the top-down condensing boiler 1 is selected, condensate produced by condensation of the combustion gas may be generated only at the lowermost side of the condensing boiler 1 and may be immediately discharged to the outside through a lower end of the condensing boiler 1. Accordingly, components constituting the condensing boiler 1 may be prevented from being corroded. However, the configuration of the present disclosure may be used for a bottom-up condensing boiler capable of naturally forming a path of heating-water in a downward direction by using a property by which heated combustion gas is moved upward by convection.

The condensing boiler 1 according to the first embodiment of the present disclosure may include a condensate receiver 55 located at the most downstream side along the flow direction D1 of the combustion gas. When condensate generated from the latent heat exchanger 40 drops in the vertically downward direction by the weight of the condensate, the condensate receiver 55 may collect the condensate. To allow the collected condensate to be discharged through a condensate outlet 53 extending in the vertically downward direction, the condensate receiver 55 may have an inner surface inclined toward the condensate outlet 53.

Furthermore, to allow residual combustion gas to be discharged at the same time that the condensate is discharged, an exhaust duct 52 may be formed so as to be in communication with the condensate receiver 55. The exhaust duct 52 extends in the vertically upward direction and discharges the residual combustion gas to the outside.

Burner Assembly 10

The burner assembly 10 is a component that includes the burner 11 radiating heat and that causes a combustion reaction of injected fuel and air to generate combustion gas. A premix burner may be used as the burner assembly 10 used in the condensing boiler 1 according to the first embodiment of the present disclosure. The premix type burner is a device that mixes injected air and fuel at a predetermined ratio and burns the mixed air and fuel using radiating heat to generate combustion gas. For this operation, the burner assembly 10 according to the first embodiment of the present disclosure may include a mix chamber 12 that is a space in which mixed fuel for a combustion reaction is prepared by mixing injected fuel and air at a predetermined ratio, and the burner 11 that applies heat to the mixed fuel mixed by the mix chamber 12. The burner assembly 10 having the above-described structure is provided to obtain optimal fuel efficiency and thermal efficiency by causing a combustion reaction by heating air and fuel mixed at a ratio appropriate for the combustion reaction.

To supply air into the mix chamber 12 and blow combustion gas generated in the burner assembly 10 in the vertically downward direction, the condensing boiler 1 of the present disclosure may further include a blower 54. The blower 54 may include a pump that is connected with the mix chamber 12 and that forcibly delivers air toward the burner assembly 10 that is connected to the mix chamber 12 in the vertically downward direction.

Combustion Chamber 20

Figure 4:
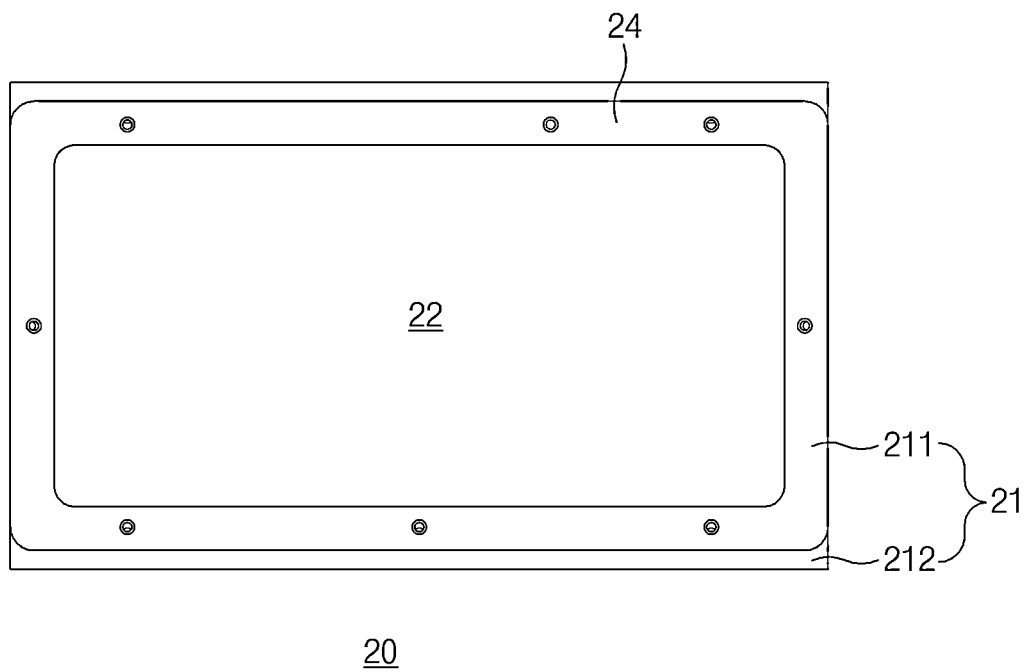
FIG. 4 is a plan view of a combustion chamber of the heat exchanger unit according to the first embodiment of the present disclosure.

FIG. 4 is a plan view of the combustion chamber 20 according to the first embodiment of the present disclosure.

The combustion chamber 20 will be described below with reference to FIG. 4 together with FIGS. 2 and 3. The combustion chamber 20 is a component that includes an interior space 22 provided such that flame that a combustion reaction by the burner assembly 10 generates is located. Accordingly, the combustion chamber 20 is formed by surrounding the interior space 22 with sidewalls. The burner assembly 10 and the combustion chamber 20 are coupled such that the burner 11 of the burner assembly 10 is located upstream of the interior space 22 based on the flow direction D1 of the combustion gas.

The burner assembly 10 applies heat to air and fuel to cause a combustion reaction. Flame and combustion gas accompanied by thermal energy are generated as products of the combustion reaction. The flame is located in the interior space 22 of the combustion chamber 20, but extends from the burner assembly 10 along the flow direction D of the combustion gas. The combustion gas flows through the interior space 22. The interior space 22 of the combustion chamber 20 may be connected in a direction parallel to the flow direction D1 of the combustion gas. In the first embodiment of the present disclosure, the flow direction D1 of the combustion gas is the vertically downward direction, and therefore the interior space 22 of the combustion chamber 20 is formed to be connected in the vertical direction.

A combustion chamber heat insulation part 24 may be formed on at least a partial area of an inner surface of a combustion chamber sidewall 21 constituting the combustion chamber 20. The combustion chamber sidewall 21 may be constituted by two general side plates 211 parallel to each other and two heat insulation side plates 212 perpendicular to the general side plates 211 and parallel to each other and may be formed in a rectangular parallelepiped shape. The combustion chamber heat insulation part 24 may be disposed on the insides of the heat insulation side plates 212. The combustion chamber heat insulation part 24 may be formed of insulation blocking a heat flow and may reduce the amount by which heat generated by the combustion reaction is transferred outside the combustion chamber 20 through inner surfaces of the combustion chamber 20. The amount of heat transferred from the interior space 22 of the combustion chamber 20 to the outside of the combustion chamber 20 may be reduced by the combustion chamber heat insulation part 24. A porous polystyrene panel decreasing a heat flow or a needle mat made of silica, which is an inorganic material, may be used as an example of the insulation. However, the type of the insulation is not limited thereto.

The combustion chamber heat insulation part 24 may be disposed on the general side plates 211 of the combustion chamber 20 as well, and thus an additional thermal insulation effect may be obtained by surrounding the entire interior space 22 of the combustion chamber 20 with the insulation.

A heat insulation pipe through which fluid flows may be disposed around the combustion chamber 20 for thermal insulation. However, in a case where a large number of heat insulation pipes are used, a lot of cost is consumed in production. However, because the heat exchanger unit of the present disclosure is implemented in the top-down type, condensation of condensate does not occur in the combustion chamber 20, and there is no risk of corrosion. Accordingly, the combustion chamber 20 of a dry type that uses insulation cheaper than a heat insulation pipe as a material of which the combustion chamber heat insulation part 24 is made may be configured.

The length of the combustion chamber heat insulation part 24 may be determined such that the combustion chamber heat insulation part 24 surrounds only the interior space 22 of the combustion chamber 20 without surrounding the sensible heat exchanger 30, which will be described below, based on the flow direction D1 of the combustion gas. That is, the combustion chamber heat insulation part 24 may be provided so as not to be located inside a sensible heat exchanger case 31 that will be described below. Accordingly, in the case where the insulation 101 is disposed as illustrated in FIG. 1, the insulation 101 may be damaged by excessive heat and condensate, whereas in the first embodiment of the present disclosure, the combustion chamber heat insulation part 24 is disposed as illustrated in FIG. 2, and thus excessive heat generated from the sensible heat exchanger 30 may not be transferred to the combustion chamber heat insulation part 24.

Sensible Heat Exchanger 30

Figure 5:
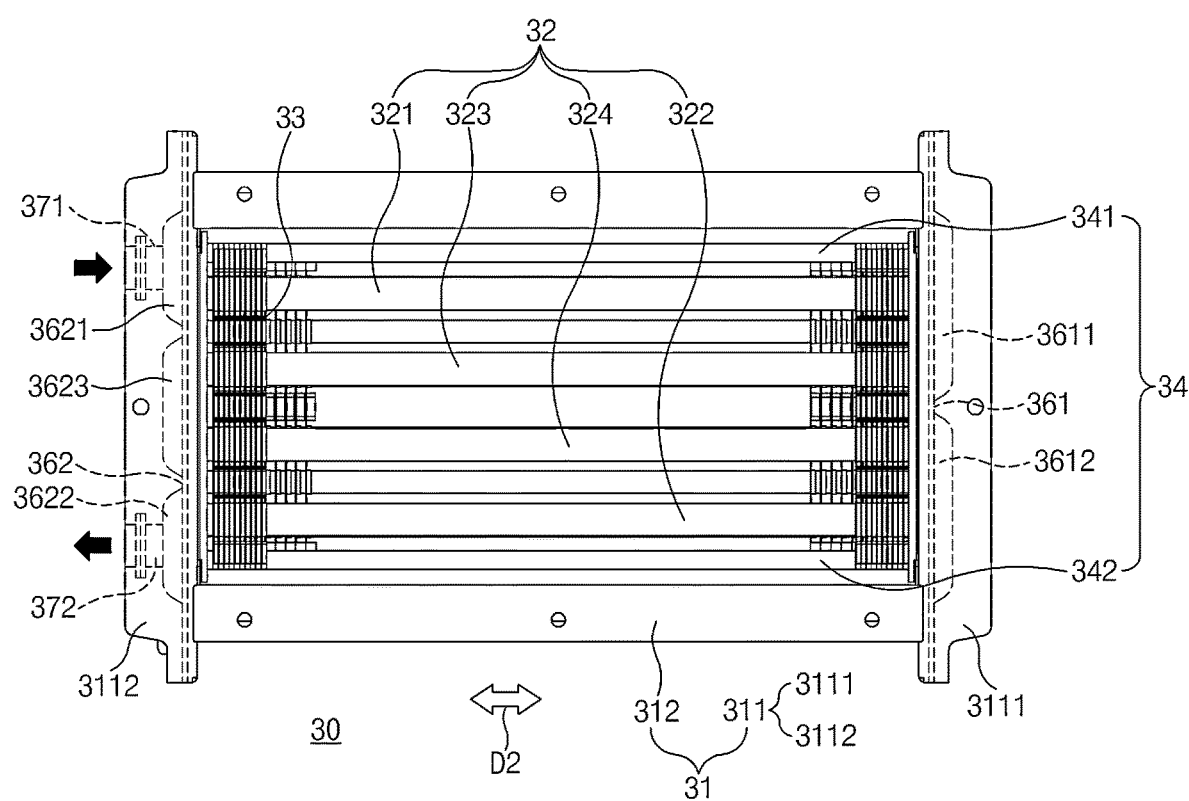
FIG. 5 is a plan view of a sensible heat exchanger of the heat exchanger unit according to the first embodiment of the present disclosure.
Figure 6:
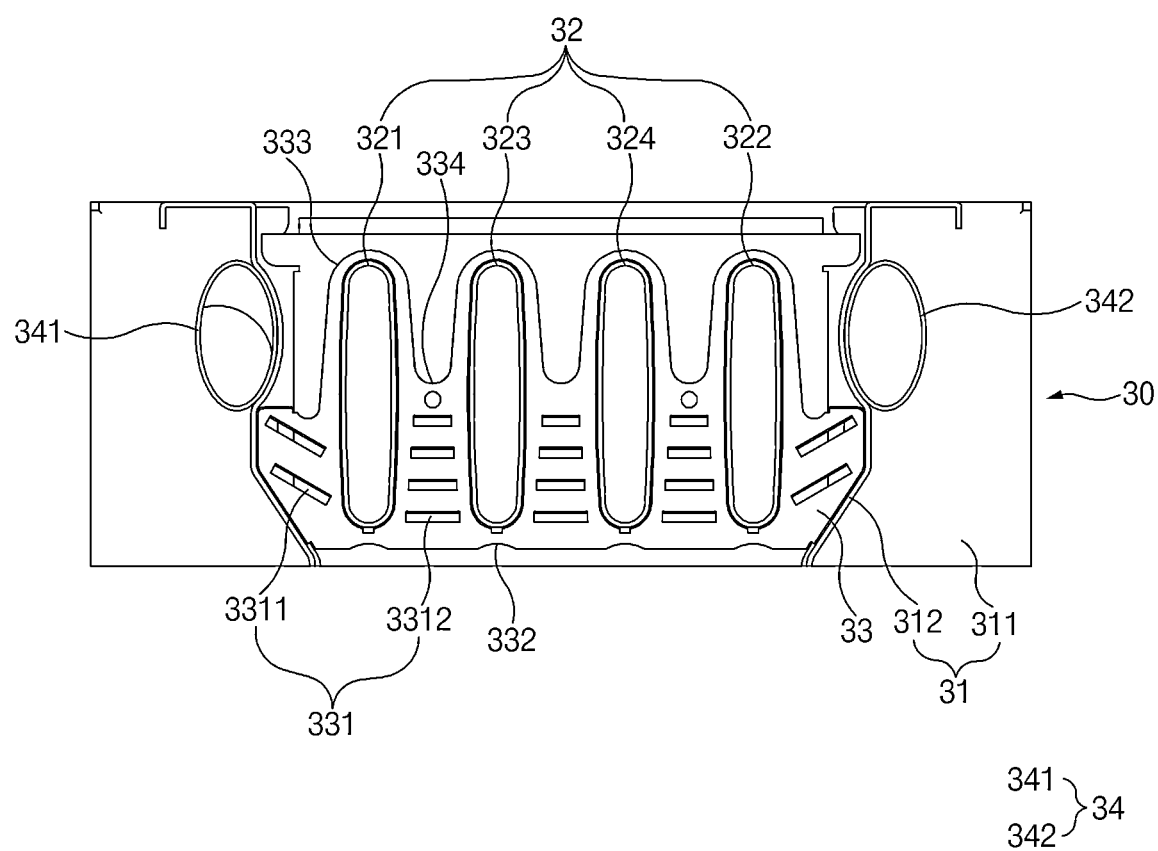
FIG. 6 is a view illustrating an area where a sensible heat exchange pipe and a sensible heat fin are disposed in the vertical sectional view of the heat exchanger unit according to the first embodiment of the present disclosure.

FIG. 5 is a plan view of the sensible heat exchanger 30 of the heat exchanger unit according to the first embodiment of the present disclosure. FIG. 6 is a view illustrating an area where a sensible heat exchange pipe 32 and a sensible heat fin 33 are disposed in the vertical sectional view of the heat exchanger unit according to the first embodiment of the present disclosure.

A basic configuration of the sensible heat exchanger 30 will be described below with reference to FIGS. 2, 3, 5, and 6.

The sensible heat exchanger 30 is disposed downstream of the combustion chamber 20 based on the flow direction D1 of the combustion gas. The sensible heat exchanger 30 is a component that receives, by radiant heat and convection of the combustion gas, sensible heat generated by a combustion reaction triggered by the burner assembly 10 located over the sensible heat exchanger 30 and that heats heating-water flowing in the sensible heat exchanger 30.

Specifically, the sensible heat exchanger 30 includes the sensible heat exchange pipe 32 through which the heating-water flows and around which the combustion gas flows, and the sensible heat exchanger case 31 into which opposite ends of the sensible heat exchange pipe 32 are inserted. The sensible heat exchange pipe 32 is located in the sensible heat exchanger case 31, and the combustion gas flows around the sensible heat exchange pipe 32 to indirectly exchange heat with the heating-water.

The sensible heat exchange pipe 32 extends along a predetermined direction D2 in a space formed in the sensible heat exchanger case 31. The predetermined direction D2 may preferably be a direction perpendicular to the flow direction D1 of the combustion gas. The sensible heat exchange pipe 32 may include a plurality of straight portions 321, 322, 323, and 324 arranged to be spaced apart from each other along an orthogonal direction perpendicular to the one direction and the flow direction D1 of the combustion gas.

The plurality of straight portions 321, 322, 323, and 324 are arranged, and flow passage cap plates 361 and 362 that will be described below exist to connect end portions of the straight portions 321, 322, 323, and 324 inserted into insertion holes formed in general sensible heat side plates 311 of the sensible heat exchanger case 31 that will be described below. The set of the straight portions 321, 322, 323, and 324 forms the one sensible heat exchange pipe 32. Accordingly, a continuous winding flow passage of the heating-water may be formed by the arrangement of the sensible heat exchange pipe 32.

For example, in a case where the straight portions 321, 322, 323, and 324 of FIG. 5 are connected in series, the heating-water may be heated by receiving sensible heat of the combustion gas and the burner assembly 10 while passing through the sensible heat exchange pipe 32 in such a manner that the heating-water introduced in the direction of the arrow illustrated in FIG. 5 is discharged by flowing to the right in the drawing along the first outer straight portion 321 included in the sensible heat exchange pipe 32, flowing to the left in the drawing along the intermediate straight portion 323 located under the first outer straight portion 321 in the drawing, flowing, in a discharge step, to the right in the drawing along the intermediate straight portion 324 located over the second outer straight portion 322 in the drawing, and moving to the left in the drawing along the second outer straight portion 322.

A turbulator (not illustrated) having a shape that hampers a flow of the heating-water to make the flow of the heating-water turbulent may be disposed in the sensible heat exchange pipe 32.

The sensible heat exchanger case 31 may be constituted by two general side plate portions spaced apart from each other in the predetermined direction D2 and parallel to each other and two heat insulation side plate portions spaced apart from each other along an orthogonal direction perpendicular to the predetermined direction D2 and parallel to each other and may be formed in the form of a rectangular parallelepiped. The general side plate portions and the heat insulation side plate portions may be general side plates and heat insulation side plates that are separate from each other and may be partial areas of a side plate of an integrated heat exchanger case. In this disclosure, it will be exemplified that the general side plate portions and the heat insulation side plate portions are formed of general side plates and heat insulation side plates that are separate from each other.

The general sensible heat side plates 311 and sensible heat insulation side plates 312 form the interior space of the sensible heat exchanger case 31. Here, the sensible heat insulation side plates 312 are used with the meaning of side plates to which the sensible heat insulation pipes 34 are disposed to be adjacent, rather than the meaning of side plates that reduce the amount of heat transferred to the outside, thereby achieving thermal insulation.

The general sensible heat side plates 311 may include a first general sensible heat side plate 3111 and a second general sensible heat side plate 3112 spaced apart from each other along the predetermined direction D2. The opposite ends of the straight portions 321, 322, 323, and 324 constituting the sensible heat exchange pipe 32 may be inserted into the first general sensible heat side plate 3111 and the second general sensible heat side plate 3112, and thus the straight portions 321, 322, 323, and 324 may be accommodated in the sensible heat exchanger case 31. The combustion gas flows in the space formed in the sensible heat exchanger case 31 and moves from the combustion chamber 20 to a latent heat exchanger case 41 that will be described below.

The sensible heat insulation pipes 34 may be disposed adjacent to the sensible heat exchanger 30. The sensible heat insulation pipes 34 are pipe type components that are disposed to thermally insulate the sensible heat exchanger 30 by allowing the heating-water to flow through the components. Here, the thermal insulation includes both confining heat in any position to prevent heat transfer and absorbing heat released from any position to the outside so as to decrease the amount of heat finally released to the outside. The meaning of the thermal insulation may be identically applied to other embodiments of the present disclosure and modified examples thereof.

Specifically, the sensible heat insulation pipes 34 may be disposed adjacent to the outsides of the sensible heat insulation side plates 312. The sensible heat insulation pipes 34 may be disposed adjacent to the two sensible heat insulation side plates 312, respectively. The sensible heat insulation pipes 34 may be disposed to make contact with the outsides of the sensible heat insulation side plates 312, or the sensible heat insulation pipes 34 may be disposed in positions spaced apart from the outsides of the sensible heat insulation side plates 312.

Referring to the drawings, in the heat exchanger unit according to the first embodiment of the present disclosure, a first sensible heat insulation pipe 341 and a second sensible heat insulation pipe 342 are spaced apart from each other and are disposed along the outsides of the sensible heat insulation side plates 312. In FIG. 5, the sensible heat insulation pipes 34 are illustrated as being located inward of the sensible heat insulation side plates 312. However, the sensible heat insulation side plates 312 cover the sensible heat insulation pipes 34 at the same time as being located inward of the sensible heat insulation pipes 34 inside the sensible heat exchanger 30, and the positions of the sensible heat insulation pipes 34 are illustrated for convenience of description. Accordingly, the sensible heat insulation pipes 34 covered by the sensible heat insulation side plates 312 are actually located in the area where the sensible heat insulation pipes 34 are illustrated in FIG. 5, and in the plan view, the sensible heat insulation pipes 34 do not appear.

Accordingly, the sensible heat insulation pipes 34 are located outside the sensible heat exchanger case 31 through which the combustion gas passes, and therefore the sensible heat insulation pipes 34 may not cross or meet the combustion gas. The sensible heat insulation pipes 34 may not be used for heat exchange between the combustion gas and the heating-water, but may perform only a thermal insulation function of blocking release of heat from the sensible heat exchanger 30 to the outside by using the heating-water.

The sensible heat insulation pipes 34 may be disposed to be spaced apart from the combustion chamber 20 along the flow direction D1 of the combustion gas without making contact with the combustion chamber 20. Accordingly, the sensible heat insulation pipes 34 may not be used for thermal insulation of the combustion chamber 20, but may be used only for thermal insulation of the sensible heat exchanger 30.

The sensible heat insulation pipes 34, together with the sensible heat exchange pipe 32, form a sensible heat flow passage through which the heating-water flows.

The shape of interior spaces of the sensible heat insulation pipes 34, as illustrated in FIGS. 2 and 6, may be formed in an oval shape in a cross-section obtained by cutting the sensible heat insulation pipes 34 with a plane perpendicular to the direction in which the sensible heat insulation pipes 34 extend. Specifically, the interior spaces of the sensible heat insulation pipes 34 may be formed in an oval shape having a long axis parallel to the flow direction D1 of the combustion gas.

The sensible heat insulation pipes 34 may be located adjacent to the sensible heat insulation side plates 312 of the sensible heat exchanger 30 and may be disposed at an upstream side based on the flow direction D1 of the combustion gas. That is, the sensible heat insulation pipes 34 may be disposed closer to the combustion chamber 20 than the latent heat exchanger 40 that will be described below. Flame generated by the burner assembly 20 in the combustion chamber 20 may reach downstream of the combustion chamber 20 based on the flow direction D1 of the combustion gas, and therefore the upstream side of the sensible heat exchanger 30 may have a highest temperature while making contact with the combustion chamber 20. Accordingly, the sensible heat insulation pipes 34 may be disposed adjacent to the upstream side of the sensible heat exchanger 30 and may thermally insulate the upstream side of the sensible heat exchanger 30 from which a large amount of heat is released due to the largest temperature difference between the interior space of the sensible heat exchanger 30 and the outside. However, the sensible heat insulation pipes 34 may be located in the center based on the flow direction D1 of the combustion gas.

The sensible heat exchanger 30 may further include the sensible heat fin 33 capable of raising the thermal conductivity of the sensible heat exchange pipe 32, and thus the sensible heat exchanger 30 of a fin-tube type may be formed. The sensible heat fin 33 is formed in a plate shape that is perpendicular to the direction in which the sensible heat exchange pipe 32 extends, and the sensible heat exchange pipe 32 passes through the sensible heat fin 33. A plurality of sensible heat fins 33 may be disposed to be spaced apart from each other at predetermined intervals along the predetermined direction D2 in which the sensible heat exchange pipe 32 extends. The sensible heat exchange pipe 32 and the sensible heat fin 33 may be formed of a metallic material with high thermal conductivity to increase the surface area of the sensible heat exchange pipe 32 from which the sensible heat fin 33 receives sensible heat, thereby transferring a larger amount of sensible heat to the heating-water.

In a cross-section obtained by cutting the sensible heat exchange pipe 32 with a plane perpendicular to the predetermined direction D2 in which the sensible heat exchange pipe 32 extends, the interior space of the sensible heat exchange pipe 32 may be formed in the shape of a long hole that extends along the flow direction D1 of the combustion gas. As can be seen in FIG. 6, the sensible heat exchange pipe 32 according to the first embodiment of the present disclosure may have a flat long hole shape formed such that a value obtained by dividing the length of the interior space of the sensible heat exchange pipe 32 in the cross-section based on the flow direction D1 of the combustion gas by the width according to the direction perpendicular to the flow direction D1 of the combustion gas equals 2 or more.

When the flat type pipe having the above-described shape is employed for the sensible heat exchange pipe 32, due to a wider heat exchange area in the relationship with combustion gas, the heating-water may receive a larger amount of heat and may be sufficiently heated even though flowing along the sensible heat exchange pipe 32 having the same length, as compared with when a pipe having a different shape, such as a circular shape or an oval shape, is employed for the sensible heat exchange pipe 32.

A through-hole through which the sensible heat exchange pipe 32 passes may be formed in the sensible heat fin 33. The area of the through-hole may be equal to or smaller than the area of the sensible heat exchange pipe 32, and the sensible heat exchange pipe 32 may be firmly inserted into the through-hole. Furthermore, the sensible heat fin 33 may be integrally coupled with the sensible heat exchange pipe 32 through brazing welding.

However, the sensible heat insulation pipes 34 are not coupled with the sensible heat fin 33. The sensible heat insulation pipes 34 are not fastened with the sensible heat fin 33, and the sensible heat insulation pipes 34 and the sensible heat fin 33 may be disposed on opposite sides with the sensible heat insulation side plates 312 therebetween. The sensible heat fin 33 and the sensible heat insulation pipes 34 may make contact with the sensible heat insulation side plates 312, but the sensible heat fin 33 and the sensible heat insulation pipes 34 do not make direct contact with each other. Because the sensible heat insulation pipes 34, as described above, are disposed for thermal insulation of the sensible heat exchanger 30 rather than for heat exchange between the combustion gas and the heating-water, the sensible heat fin 33 and the sensible heat insulation pipes 34 are not directly connected with each other. Accordingly, the sensible heat fin 33 and the sensible heat insulation pipes 34 are disposed so as not to cross each other.

A common louver hole 331 may be additionally formed in the sensible heat fin 33 along the predetermined direction D2 in which the sensible heat exchange pipe 32 extends. The louver hole 331 may be formed by punching. The louver hole 331 includes a burr raised along the periphery thereof. When the combustion gas flows, the burr blocks the combustion gas to cause the combustion gas to flow around the sensible heat exchange pipe 32, thereby facilitating heat exchange between the combustion gas and the heating-water.

A plurality of louver holes 331 may be formed. The louver holes 331, as illustrated in FIG. 6, may include a plurality of first louver holes 3311 that extend in an oblique direction with respect to the flow direction D1 of the combustion gas and that are formed in the outermost portions of the sensible heat fin 33, and a plurality of second louver holes 3312 that are formed between the sensible heat exchange pipes 32 adjacent to each other and that extend in the direction perpendicular to the flow direction D1 of the combustion gas. The louver holes 331 may be disposed to be spaced apart from each other at predetermined intervals along the flow direction D1 of the combustion gas.

The sensible heat fin 33 may further include valleys 334 and protruding portions 333. The sensible heat fin 33 may be basically formed to surround the sensible heat exchange pipe 32. The sensible heat fin 33 may surround areas corresponding to a predetermined width from the peripheries of upstream-side end portions of the sensible heat exchange pipe 32 based on the flow direction D1 of the combustion gas such that the areas are distinguished from the remaining areas of the sensible heat exchange pipe 32. Accordingly, between the adjacent upstream-side end portions of the sensible heat exchange pipe 32, the valleys 334 may be concavely formed in the sensible heat fin 33 along the flow direction D1 of the combustion gas. The areas of the sensible heat fin 33 that are adjacent to the upstream-side end portions of the sensible heat exchange pipe 32 relatively protrude to form the protruding portions 33. Unnecessary areas are open by forming the valleys 334, and thus the combustion gas may more freely flow between the sensible heat fin 33 and the sensible heat exchange pipe 32.

The sensible heat fin 33 may further include concave portions 332. The concave portions 332 are concavely formed from a downstream-side edge of the sensible heat fin 33 toward downstream-side end portions of the sensible heat exchange pipe 32 based on the flow direction D1 of the combustion gas. The purpose of forming the concave portions 332 is similar to the purpose of forming the valleys 334.

Figure 7:
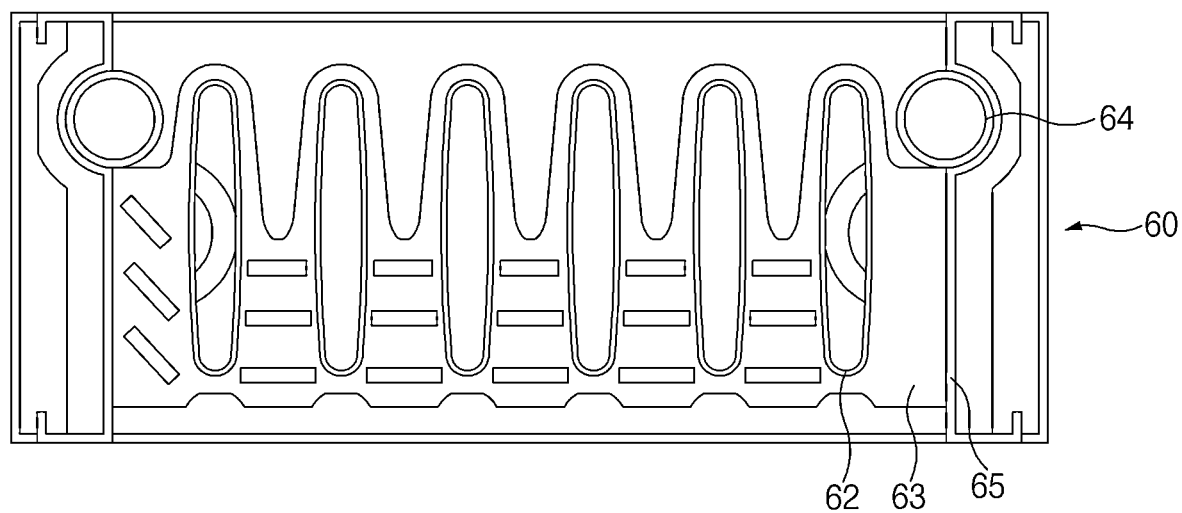
FIG. 7 is a view illustrating an area where a sensible heat exchange pipe and a sensible heat fin are disposed in a vertical sectional view of a heat exchanger unit according to one modified example of the first embodiment of the present disclosure.

According to one modified example of the first embodiment, the shapes of a sensible heat exchange pipe 62, sensible heat insulation pipes 64, and a sensible heat fin 63 may be deformed. FIG. 7 is a view illustrating an area where the sensible heat exchange pipe 62 and the sensible heat fin 63 are disposed in a vertical sectional view of a heat exchanger unit according to the one modified example of the first embodiment of the present disclosure.

According to the one modified example of the first embodiment, the sensible heat insulation pipes 64 may be disposed adjacent to an upstream side of a sensible heat exchanger 60 based on the flow direction of the combustion gas, which is one of directions in which the cross-section of the illustrated sensible heat exchange pipe 62 extends, and a cross-section obtained by cutting the sensible heat insulation pipes 64 with a plane perpendicular to a predetermined direction in which the sensible heat insulation pipes 64 extend may have a circular shape. Furthermore, unlike in FIG. 6, the sensible heat insulation pipes 64 may be disposed adjacent to an inner surface of a heat insulation side plate 65. Unlike in the first embodiment of FIG. 6, six sensible heat exchange pipes 62 may be provided in the one modified example of the first embodiment of FIG. 7. However, the number of sensible heat exchange pipes 62 is not limited thereto.

According to the one modified example of the first embodiment, likewise to second louver holes 6312, first louver holes 6311 of the sensible heat fin 63 may extend in a direction perpendicular to the flow direction of the combustion gas. Various modifications can be made to the shape of louver holes 631.

Figure 8:
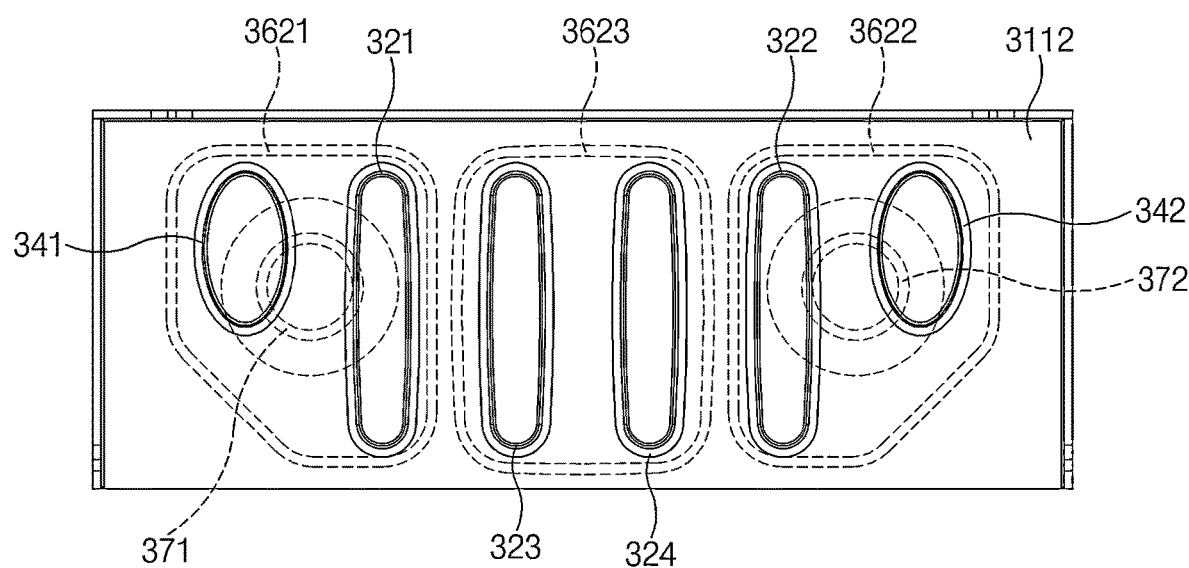
FIG. 8 is a view illustrating a second general sensible heat side plate of the heat exchanger unit according to the first embodiment of the present disclosure and flow passage caps included in a second flow passage cap plate when viewed from the outside along a predetermined direction.
Figure 9:
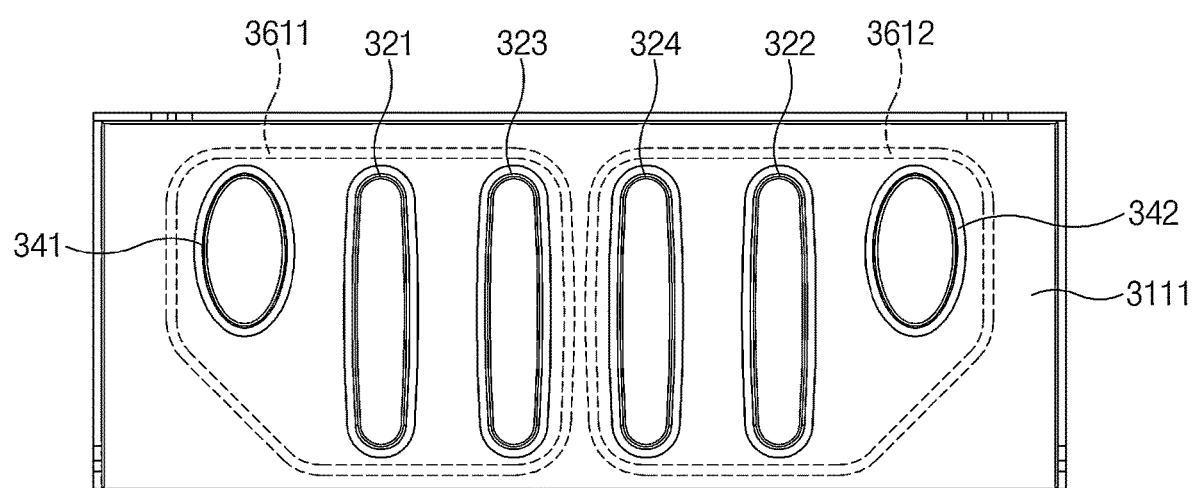
FIG. 9 is a view illustrating a first general sensible heat side plate of the heat exchanger unit according to the first embodiment of the present disclosure and flow passage caps included in a first flow passage cap plate when viewed from the inside along the predetermined direction.

The flow passage cap plates 361 and 362 of the sensible heat exchanger 30 according to the first embodiment will be described below with reference to FIGS. 2, 3, 5, 6, 8, and 9. FIG. 8 is a view illustrating the second general sensible heat side plate 3112 according to the first embodiment of the present disclosure and flow passage caps included in the second flow passage cap plate 362 when viewed from the outside along the predetermined direction D2. FIG. 9 is a view illustrating the first general sensible heat side plate 3111 of the heat exchanger unit according to the first embodiment of the present disclosure and flow passage caps included in the first flow passage cap plate 361 when viewed from the inside along the predetermined direction D2.

Figure 29:
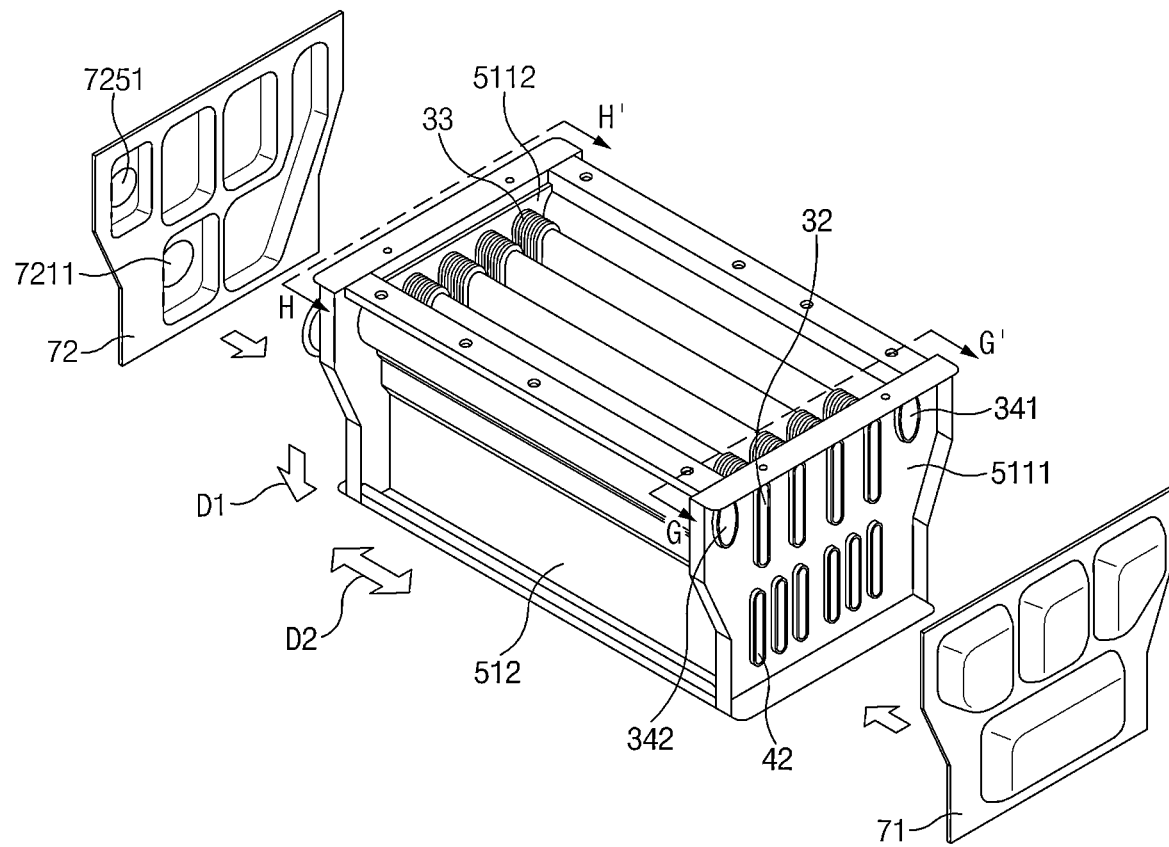
FIG. 29 is a perspective view illustrating a situation in which the connection flow passage cap plates are separated from each other in the heat exchanger unit according to the other modified example of the first embodiment of the present disclosure.

Referring to FIG. 29 for explaining another modified example of the first embodiment of the present disclosure, FIG. 8 is view in which flow passage caps 3621, 3622, and 3623 of the second flow passage cap plate 362 are illustrated by dotted lines on a view of the second general sensible heat side plate 3112, the straight portions 321, 322, 323, and 324 of the sensible heat exchange pipe 32, and the sensible heat insulation pipes 341 and 342 of the first embodiment of the present disclosure that corresponds to a view of a second main general side plate 5112 and pipes 32, 42, 341, and 342 coupled thereto when viewed from a second connection flow passage cap plate 72 of FIG. 29 along line H-H'. FIG. 9 is a view in which flow passage caps 3611 and 3612 of the first flow passage cap plate 361 are illustrated by dotted lines on a view of the first general sensible heat side plate 3111, the straight portions 321, 322, 323, and 324 of the sensible heat exchange pipe 32, and the sensible heat insulation pipes 341 and 342 of the first embodiment of the present disclosure that corresponds to a view of a first main general side plate 5111, into which a first connection flow passage cap plate 71 is inserted, when viewed along line G-G' of FIG. 29 for explaining the other modified example of the first embodiment of the present disclosure.

The heat exchanger unit may include the plurality of flow passage cap plates 361 and 362 including a plurality of flow passage caps that connect the sensible heat insulation pipes 34 and end portions of the sensible heat exchange pipe 32 adjacent to the sensible heat insulation pipes 34 or connect the straight portions 321, 322, 323, and 324 adjacent to each other among the plurality of straight portions 321, 322, 323, and 324. The flow passage cap plates 361 and 362 may include the flow passage caps and may connect the straight portions 321, 322, 323, and 324 spaced apart from each other, thereby forming a flow passage through which the heating-water flows in the sensible heat exchanger 30.

Specifically, opposite ends of the straight portions 321, 322, 323, and 324 included in the sensible heat exchange pipe 32 and opposite ends of the sensible heat insulation pipes 34 are inserted into the general sensible heat side plates 311 of the sensible heat exchanger case 31, but are open without being closed. The straight portions 321, 322, 323, and 324 included in the sensible heat exchange pipe 32 and the sensible heat insulation pipes 34 extend from one of the general sensible heat side plates 311 to the other, and the opposite ends thereof are exposed outside the general sensible heat side plates 311. The flow passage cap plates 361 and 362 are coupled to the general sensible heat side plates 311 while covering the general sensible heat side plates 311 from the outside. Accordingly, the flow passage caps of the flow passage cap plates 361 and 362, together with the general sensible heat side plates 311, form a connection space that surrounds the ends of the straight portions 321, 322, 323, and 324 and the ends of the sensible heat insulation pipes 34.

The flow passage caps included in the flow passage cap plates 361 and 362 form an empty connection space, in which fluid is able to flow, between the general sensible heat side plates 311 and the inner surfaces of the flow passage caps. The flow passage caps having the connection space therein may connect two straight portions adjacent to each other among the plurality of straight portions 321, 322, 323, and 324 inserted into the general sensible heat side plates 311, or may connect the sensible heat insulation pipes 34 and straight portions adjacent to the sensible heat insulation pipes 34. The flow passage cap plates 361 and 362 may be coupled to the general sensible heat side plates 311 through brazing welding, or may be fit into the general sensible heat side plates 311. However, the coupling method is not limited thereto.

The number of straight portions 321, 322, 323, and 324 or the sensible heat insulation pipes 34 that the flow passage caps simultaneously connect is not limited to the content illustrated in the drawing. Accordingly, the number of flow passage caps included in one flow passage cap plate 361 or 362 is also not limited to the content illustrated, and a modification can be made to the number of flow passage caps.

A flow passage cap may form a series flow passage in which an inlet of one pipe and an outlet of another pipe are connected, or may form a parallel flow passage in which inlets and outlets of connected pipes are common. Here, an inlet refers to an opening at one end of a pipe through which the heating-water is introduced into the pipe, and an outlet refers to an opening at an opposite end of the pipe through which the heating-water is released from the pipe. The pipes include the straight portions 321, 322, 323, and 324 and the first and second sensible heat insulation pipes 341 and 342. In a case of forming a series flow passage using the pipes, acoustic boiling noise generated by the heating-water that flows slow and is overheated may be reduced, and the heating-water may be allowed to flow fast. In a case where a parallel flow passage is at least partially included in the series flow passage, the load of a pump forcibly delivering the heating-water may be decreased.

A straight portion in which one end of the sensible heat exchange pipe 32 is located and that is located at the outermost position based on the orthogonal direction is referred to as the first outer straight portion 321. A sensible heat insulation pipe adjacent to the first outer straight portion 321 is referred to as the first sensible heat insulation pipe 341.

Furthermore, a sensible heat insulation pipe located on the opposite side to the first sensible heat insulation pipe 341 in the orthogonal direction is referred to as the second sensible heat insulation pipe 342, a straight portion adjacent to the second sensible heat insulation pipe 342 is referred to as the second outer straight portion 322, and straight portions located between the first outer straight portion 321 and the second outer straight portion 322 are referred to as the intermediate straight portions 323 and 324.

The first sensible heat insulation pipe 341, the first outer straight portion 321, the intermediate straight portions 323 and 324, the second outer straight portion 322, and the second sensible heat insulation pipe 342 may be sequentially connected to form one series sensible heat flow passage, or may form a parallel flow passage in which inlets and outlets of at least some thereof are common. One intermediate straight portion 323 and the other intermediate straight portion 324 may also be connected in series.

The pipes may be connected only in series to form a sensible heat flow passage. For example, inlets and outlets of pipes adjacent to each other among the pipes may be connected in series to form a sensible heat flow passage through which the heating-water is delivered from the first sensible heat insulation pipe 341 to the first outer straight portion 321, the intermediate straight portion 323 adjacent to the first outer straight portion 321, the intermediate straight portion 324 adjacent to the second outer straight portion 322, the second outer straight portion 322, and the second sensible heat insulation pipe 342 in sequence. A sensible heat flow passage configured only in series will be described below in detail in the description of a sensible heat flow passage included in a heat exchanger unit according to another modified example of the first embodiment of the present disclosure that will be described with reference to FIGS. 10 to 14.

A sensible heat flow passage may partly include a parallel flow passage, and therefore a case where some of the straight portions 321, 322, 323, and 324 are connected in parallel will be described in the description of a sensible heat flow passage according to an embodiment of the present disclosure that is described with reference to FIGS. 8 and 9.

For example, a parallel flow passage may be configured as follows. The first sensible heat insulation pipe 341 and the first outer straight portion 321 may form a parallel flow passage, the second sensible heat insulation pipe 342 and the second outer straight portion 322 may form a parallel flow passage, the intermediate straight portions 323 and 324 may form a parallel flow passage, the first outer straight portion 321 and the intermediate straight portion 323 may form a parallel flow passage, and the second outer straight portion 322 and the intermediate straight portion 324 may form a parallel flow passage.

Furthermore, an entire sensible heat flow passage may be configured by combining a plurality of parallel flow passages among the parallel flow passages with a series flow passage. For example, when the first sensible heat insulation pipe 341 and the first outer straight portion 321 form a parallel flow passage, the parallel flow passage, the intermediate straight portions 323 and 324, the second outer straight portion 322, and the second sensible heat insulation pipe 342 may be sequentially connected to form one sensible heat flow passage. In contrast, when the second sensible heat insulation pipe 342 and the second outer straight portion 322 form a parallel flow passage, the first sensible heat insulation pipe 341, the first outer straight portion 321, the intermediate straight portions 323 and 324, and the parallel flow passage may be sequentially connected to form one sensible heat flow passage. Furthermore, in a case where parallel flow passages are formed in the above-described two portions, the parallel flow passages may be connected with the intermediate straight portions 323 and 324 located therebetween to form one sensible heat flow passage.

A case where a parallel flow passage receives the heating-water first when the heating-water is introduced into the sensible heat exchanger 30 will be described in the first embodiment of the present disclosure. The first outer straight portion 321 and the first sensible heat insulation pipe 341 may be connected in parallel and may receive and discharge the heating-water together. A heating-water supply hole 371 may be formed in the inlet flow passage cap 3621 among the flow caps included in the second flow passage cap plate 362 that covers the second general sensible heat side plate 3112. The heating-water supply hole 371 may be an opening that receives the heating-water from a heating-water pipe and delivers the heating-water to the inlet flow passage cap 3621. The heating-water supply hole 371 may connect a sensible heat flow passage and a latent heat flow passage by receiving the heating-water discharged from the latent heat exchanger 40.

The inlet flow passage cap 3621 connects one end of the first outer straight portion 321 and one end of the first sensible heat insulation pipe 341 that is adjacent to the one end of the first outer straight portion 321. While the heating-water is supplied to the inlet flow passage cap 3621 through the heating-water supply hole 371, the heating-water is introduced into the one end of the first outer straight portion 321 and the one end of the first sensible heat insulation pipe 341 that are connected to the inlet flow passage cap 3621.

The heating-water passes through the first outer straight portion 321 and the first sensible heat insulation pipe 341 and reaches the first flow passage cap 3611 of the first flow passage cap plate 361 located on the opposite side to the second flow passage cap plate 362 based on the sensible heat exchange pipe 32. The first flow passage cap 3611 connects an opposite end of the first sensible heat insulation pipe 341, an opposite end of the first outer straight portion 321, and the intermediate straight portion 323 adjacent to the first outer straight portion 321. Accordingly, the first outer straight portion 321 and the first sensible heat insulation pipe 341 is connected with the adjacent intermediate straight portion 323 in series in the first flow passage cap 3611 and receives the heating-water passing through the first outer straight portion 321 and the first sensible heat insulation pipe 341.

The intermediate straight portion 323 adjacent to the first outer straight portion 321 and the intermediate straight portion 324 adjacent to the second outer straight portion 322 that will be described below may be connected in the intermediate flow passage cap 3623 located on the second flow passage cap plate 362 and may deliver the heating-water from one intermediate straight portion 323 to the other intermediate straight portion 324. The two intermediate straight portions 323 and 324 form part of a heating-water flow passage in series in the intermediate flow passage cap 3623.

A case where the heating-water is discharged through a parallel flow passage from the sensible heat exchanger 30 will be described. A straight portion disposed adjacent to the second sensible heat insulation pipe 342, which is the sensible heat insulation pipe 34 through which the heating-water is discharged, is the second outer straight portion 322.

The second outer straight portion 322 and the second sensible heat insulation pipe 342 may be connected in parallel and may receive and discharge the heating-water together. One end of the second outer straight portion 322 and one end of the second sensible heat insulation pipe 342 that is adjacent to the one end of the second outer straight portion 322 are connected with the straight portion 324 adjacent to the second outer straight portion 322 in series in the second flow passage cap 3621 among the flow passage caps included in the first flow passage cap plate 361 that covers the first general sensible heat side plate 3111. Accordingly, the heating-water delivered to the second flow passage cap 3612 through the adjacent straight portion 324 is introduced into the one end of the second outer straight portion 322 and the one end of the second sensible heat insulation pipe 342.

The heating-water passes through the second outer straight portion 322 and the second sensible heat insulation pipe 342 and is discharged to an opposite end of the second outer straight portion 322 and an opposite end of the second sensible heat insulation pipe 342. The opposite end of the second outer straight portion 322 and the opposite end of the second sensible heat insulation pipe 342 are connected to the outlet flow passage cap 3622, which is one of the flow passage caps formed on the second flow passage cap plate 362, and therefore the heating-water is located in the outlet flow passage cap 3622. The outlet flow passage cap 3622 includes a heating-water outlet 372, and the heating-water released to the outlet flow passage cap 3622 is discharged through the heating-water outlet 372. The heating-water pipe may receive the heated heating-water through the heating-water outlet 372 and may deliver the heating-water to a main flow passage.

The description of the configuration of the sensible heat flow passage of the first embodiment may be applied to other embodiments of the present disclosure and modified examples thereof.

Latent Heat Exchanger 40

The latent heat exchanger 40 will be described below with reference to FIGS. 2 and 3. The latent heat exchanger 40 may be disposed downstream of the sensible heat exchanger 30 based on the flow direction D1 of the combustion gas. The latent heat exchanger 40 receives latent heat generated during a phase change of the combustion gas and heats the heating-water using the latent heat. Accordingly, the combustion gas passing through the sensible heat exchanger 30 is delivered to the latent heat exchanger 40, the heating-water flows in the latent heat exchanger 40, and the heating-water and the combustion gas indirectly exchange heat with each other.

Similarly to the sensible heat exchanger 30, the latent heat exchanger 40 may include a latent heat exchange pipe 42 through which the heating-water flows and around which the combustion gas flows. The latent heat exchange pipe 42 may deliver latent heat by a phase change of the combustion gas to the heating-water. The latent heat exchanger 40 may include the latent heat exchanger case 41 into which opposite ends of the latent heat exchange pipe 42 are inserted. The latent heat exchange pipe 42 may be formed to be similar to the sensible heat exchange pipe 32, and the latent heat exchanger case may also be formed to be similar to the sensible heat exchanger case 31. Therefore, exceptional characteristics will be described below, but the overall description is replaced with the description of the sensible heat exchanger 30. However, a phenomenon may arise in which condensate is generated by a phase change of the combustion gas around the latent heat exchange pipe 42 and falls into the condensate receiver 55 by the gravity.

Likewise to the sensible heat exchanger 30, the latent heat exchanger 40 may be of a fin-tube type. Accordingly, a latent heat fin 43 is formed in a plate shape perpendicular to the predetermined direction D2 in which the latent heat exchange pipe 42 extends, and the latent heat exchange pipe 42 passes through the latent heat fin 43. The latent heat fin 43 may transfer a larger amount of latent heat to the heating-water by increasing the surface area of the latent heat exchange pipe 42 capable of receiving latent heat.

A plurality of latent heat fins 43 may be disposed to be spaced apart from each other at predetermined intervals along the predetermined direction D2 in which the latent heat exchange pipe 42 extends. The intervals at which the latent heat fins 43 are spaced apart from each other may be intervals by which condensate formed between the adjacent latent heat fins 43 is easily discharged. The intervals by which the condensate is easily discharged refer to intervals between the latent heat fins 43 in a state in which the weight of the condensate formed between the latent heat fins 43 is greater than the vertical resultant force of tensions acting between the latent heat fins 43 and the condensate. The height of the condensate formed between the latent heat fins 43 is inversely proportional to the minimum interval between the latent heat fins 43 by which the condensate is easily discharged. Therefore, the intervals by which the condensate is easily discharged may be determined by selecting an appropriate height of the condensate desired to be discharged from the latent heat exchanger 40.

The number of latent heat fins 43 may be smaller than the number of sensible heat fins 33. Accordingly, the intervals at which the adjacent latent heat fins 43 are spaced apart from each other may be greater than or equal to the intervals at which the adjacent sensible heat fins 33 are spaced apart from each other. Specific descriptions of the numbers and intervals of the sensible heat fins 33 and the latent heat fins 43 are replaced with contents that will be described below in a third embodiment. The cross-sectional area of the interior space of the latent heat exchange pipe 42 obtained by cutting the latent heat exchange pipe 42 with a plane perpendicular to the direction in which the latent heat exchange pipe 42 extends may be smaller than the cross-sectional area of the interior space of the sensible heat exchange pipe 32 obtained by cutting the sensible heat exchange pipe 32 with a plane perpendicular to the direction in which the sensible heat exchange pipe 32 extends. The direction in which the latent heat exchange pipe 42 extends may also be the predetermined direction D2. As in the description of the latent heat fin 43 described above, by making the size of the latent heat exchange pipe 42 smaller than the size of the sensible heat exchange pipe 32, the latent heat exchange pipe 42 may have a larger surface area in the same volume than the sensible heat exchange pipe 32. As the surface area of the latent heat exchange pipe 42 is increased, a larger amount of heat may be exchanged between the heating-water flowing along the latent heat exchange pipe 42 and the condensate.

The cross-section of the latent heat exchange pipe 42 obtained by cutting the latent heat exchange pipe 42 with a plane perpendicular to the predetermined direction D 2 may have a long hole shape similarly to the cross-section of the sensible heat exchange pipe 32.

In the first embodiment of the present disclosure, the latent heat exchanger 40 is illustrated as having no means for thermal insulation. However, in various modified examples, the latent heat exchanger 40 may also have latent heat insulation pipes (not illustrated) that are disposed in the same manner as the sensible heat insulation pipes 34. The latent heat insulation pipes may be disposed adjacent to the latent heat exchanger case, and the heating-water may flow through the latent heat insulation pipes to thermally insulate the latent heat exchanger 40.

Although the sensible heat exchanger case 31 and the latent heat exchanger case 41 have been described as separate from each other, the sensible heat exchanger case 31 and the latent heat exchanger case 41 may be integrally formed with each other as illustrated in the drawing. In this case, an integrated main case 51 including both the sensible heat exchanger case 31 and the latent heat exchanger case 41 may be considered. Accordingly, the sensible heat insulation side plates 312 of the sensible heat exchanger 30 and latent heat insulation side plates 412 of the latent heat exchanger 40 may integrally form main heat insulation side plates 512, and the general sensible heat side plates 311 of the sensible heat exchanger 30 and general latent heat side plates 411 of the latent heat exchanger 40 may integrally form main general latent heat side plates 511. Likewise, a first main general side plate 5111 included in the main general side plates 511 may include the first sensible heat insulation side plate 3111 and a first latent heat insulation side plate 4111 located at the same side along the predetermined direction D2, and a second main general side plate 5112 included in the main general side plates 511 may include the second sensible heat insulation side plate 3112 and a second latent heat insulation side plate 4112 located on the opposite side along the predetermined direction D2.

Hereinafter, a situation in which heat exchangers 30 and 40 of a heat exchanger unit according to another modified example of the first embodiment of the present disclosure are connected by connection flow passage cap plates 71 and 72 to form a sensible heat flow passage and a latent heat flow passage connected together will be described below with reference to FIGS. 10 to 14 and 29.

Figure 10:
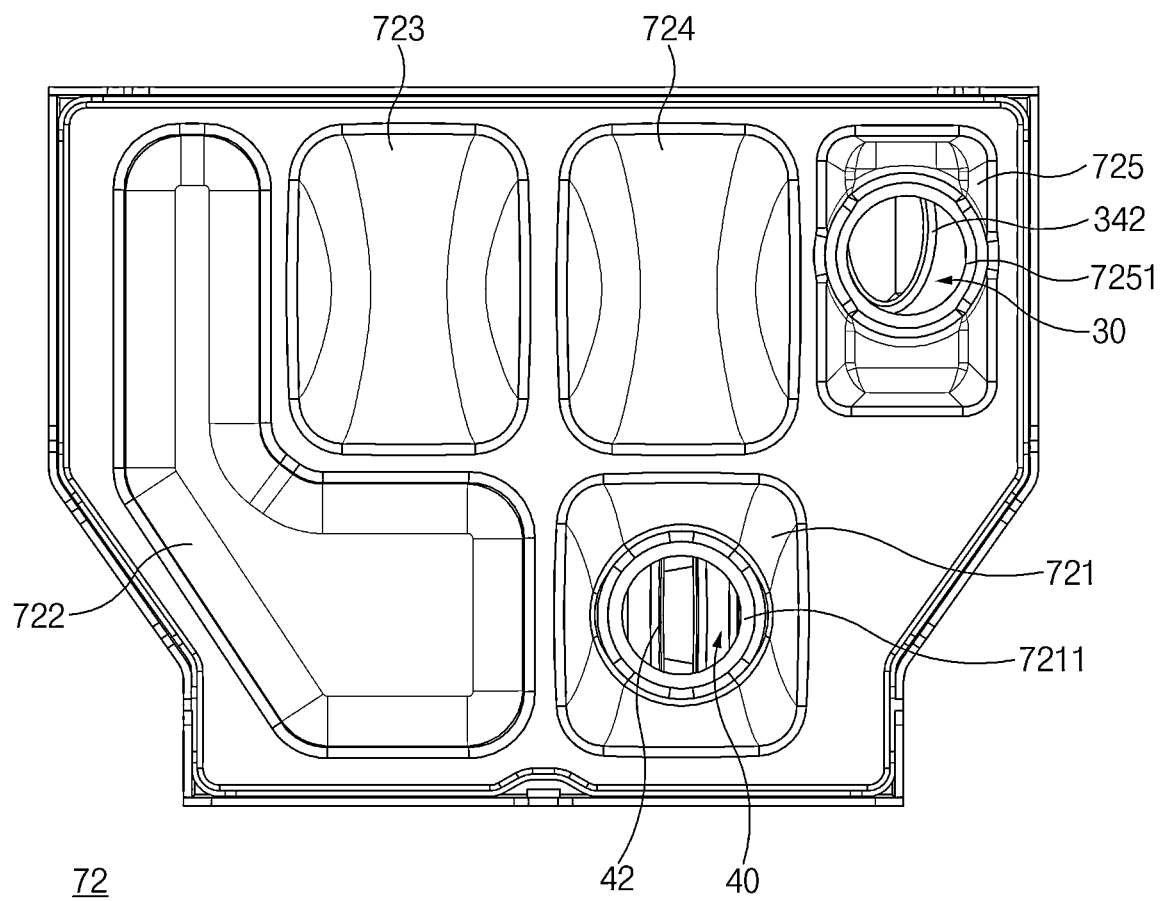
FIG. 10 is a view illustrating a heat exchanger unit according to another modified example of the first embodiment of the present disclosure when viewed from outside a second connection flow passage cap plate.
Figure 11:
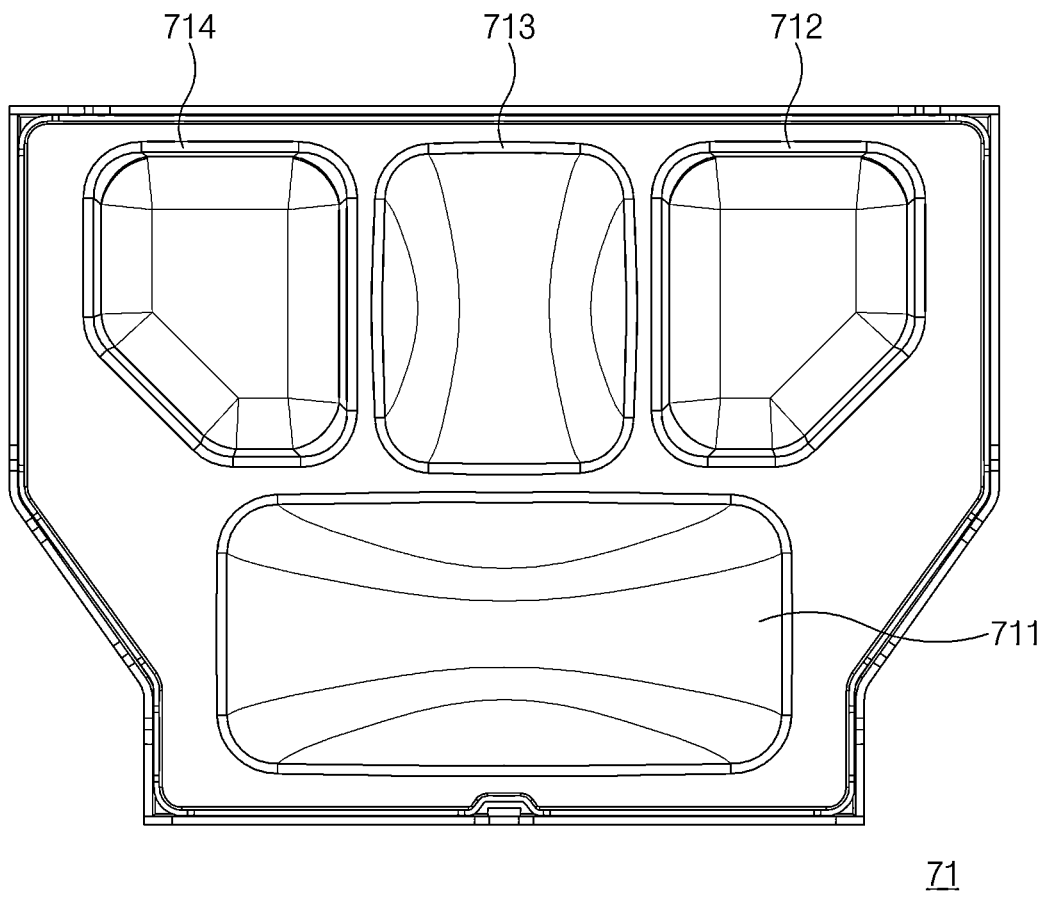
FIG. 11 is a view illustrating a first connection flow passage cap plate of the heat exchanger unit according to the other modified example of the first embodiment of the present disclosure.
Figure 12:
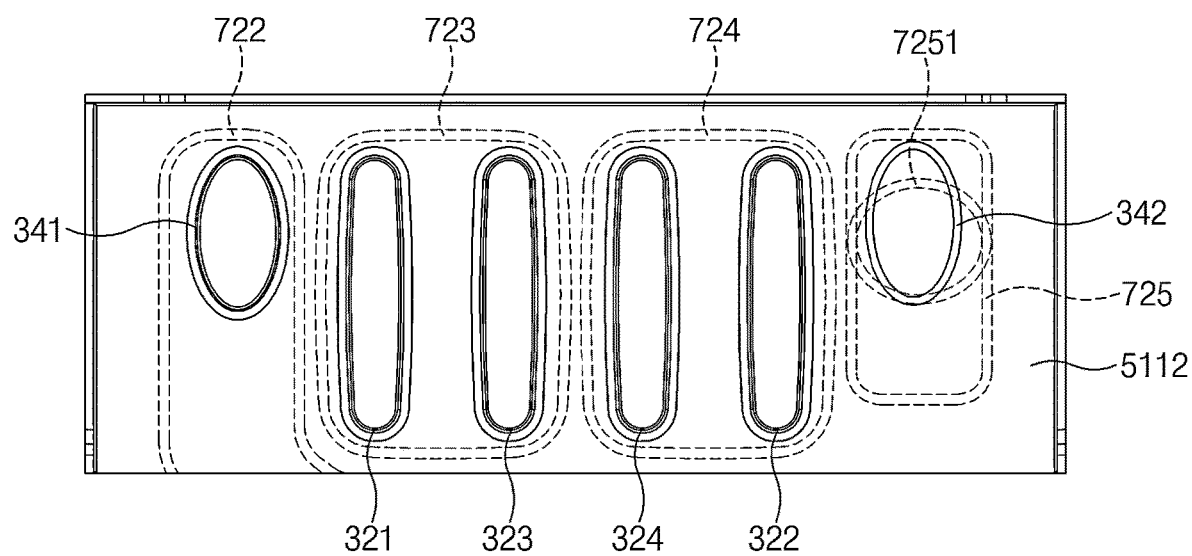
FIG. 12 is a view illustrating a partial area of a second main general side plate of the heat exchanger unit according to the other modified example of the first embodiment of the present disclosure together with flow passage caps included in the second connection flow passage cap plate when viewed from the outside along a predetermined direction.
Figure 13:
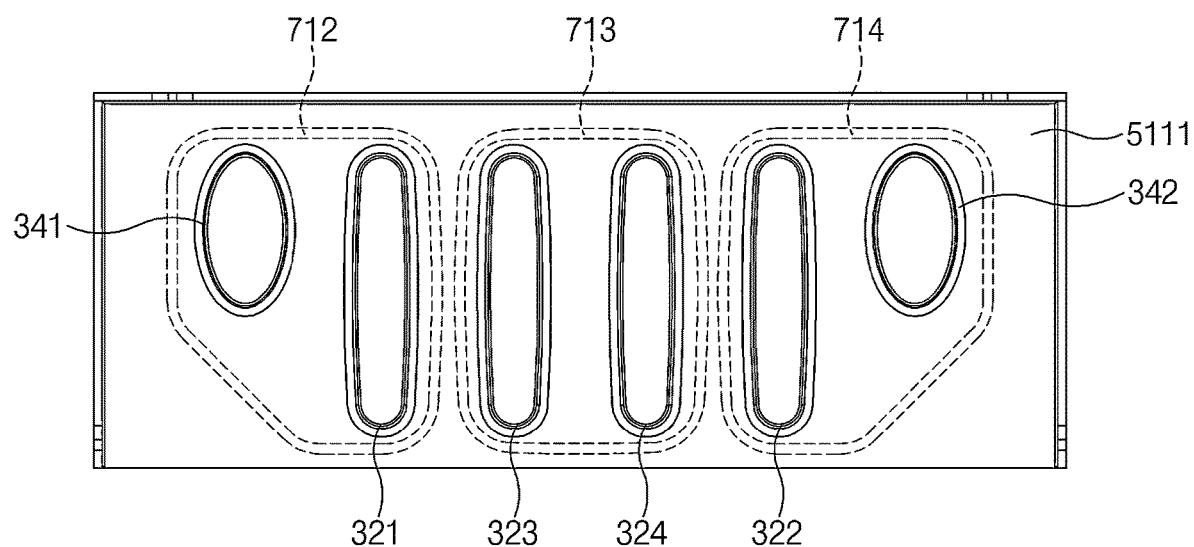
FIG. 13 is a view illustrating a first main general side plate of the heat exchanger unit according to the other modified example of the first embodiment of the present disclosure together with flow passage caps included in the first connection flow passage cap plate when viewed from the inside along a predetermined direction.
Figure 14:
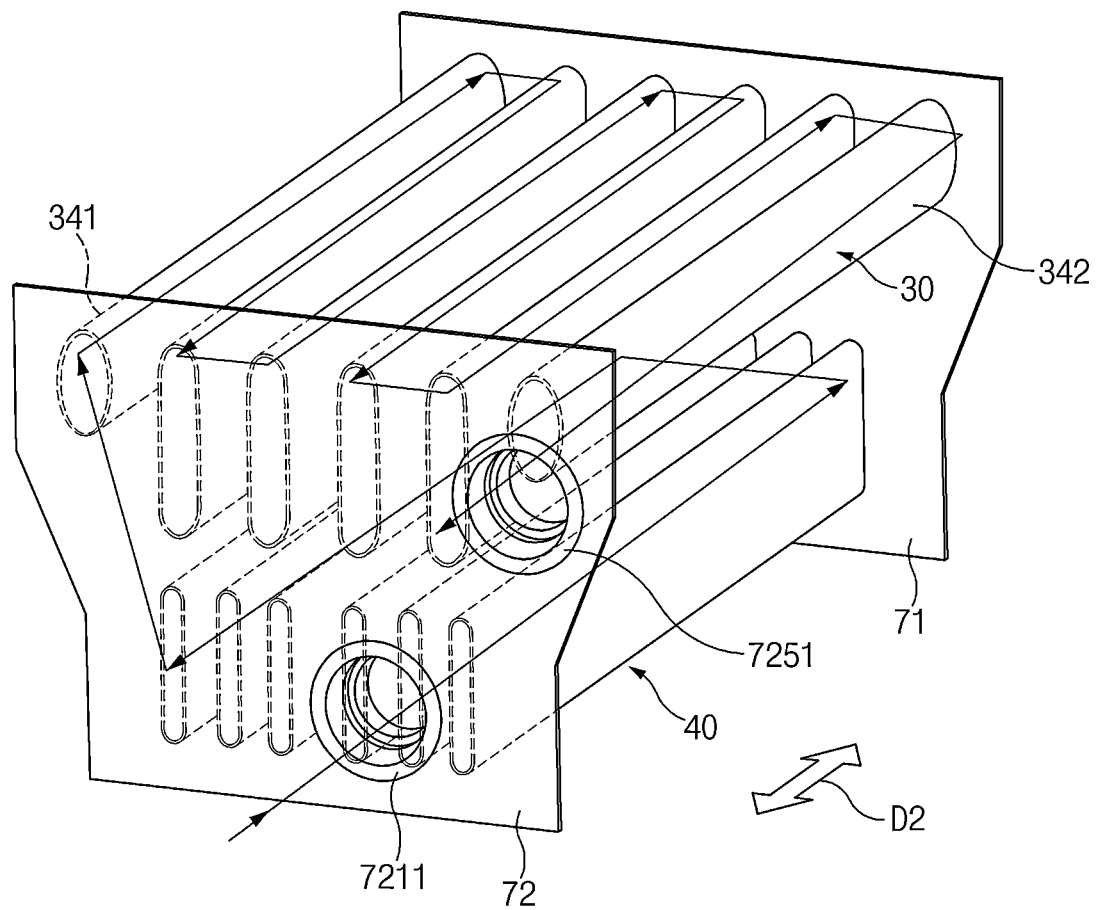
FIG. 14 is a perspective view illustrating a sensible heat flow passage and a latent heat flow passage of the heat exchanger unit according to the other modified example of the first embodiment of the present disclosure.

FIG. 10 is a view illustrating the heat exchanger unit according to the other modified example of the first embodiment of the present disclosure when viewed from outside the second connection flow passage cap plate 72. FIG. 11 is a view illustrating the first connection flow passage cap plate 71 of the heat exchanger unit according to the other modified example of the first embodiment of the present disclosure. FIG. 12 is a view illustrating a partial area of a second main general side plate 5112 of the heat exchanger unit according to the other modified example of the first embodiment of the present disclosure together with flow passage caps included in the second connection flow passage cap plate 72 when viewed from the outside along a predetermined direction. FIG. 13 is a view illustrating a first main general side plate 5111 of the heat exchanger unit according to the other modified example of the first embodiment of the present disclosure together with flow passage caps included in the first connection flow passage cap plate 71 when viewed from the inside along a predetermined direction. FIG. 14 is a perspective view illustrating the sensible heat flow passage and the latent heat flow passage of the heat exchanger unit according to the other modified example of the first embodiment of the present disclosure. FIG. 29 is a perspective view illustrating a situation in which the connection flow passage cap plates are separated from each other in the heat exchanger unit according to the other modified example of the first embodiment of the present disclosure.

FIG. 12 is view in which flow passage caps 722, 723, 724, and 725 of the second connection flow passage cap plate 72 are illustrated by dotted lines on a view of the second main general side plate 5112, straight portions 321, 322, 323, and 324 of a sensible heat exchange pipe 32, and sensible heat insulation pipes 341 and 342 according to the other modified example of the first embodiment of the present disclosure when viewed from the second connection flow passage cap plate 72 of FIG. 29 along line H-H' FIG. 13 is view in which flow passage caps 712, 713, and 714 of the first connection flow passage cap plate 71 are illustrated by dotted lines on a view of the first main general side plate 5111, the straight portions 321, 322, 323, and 324 of the sensible heat exchange pipe 32, and the sensible heat insulation pipes 341 and 342 according to the other modified example of the first embodiment of the present disclosure when viewed along line G-G' of FIG. 29.

In the other modified example of the first embodiment of the present disclosure, the latent heat flow passage that is connected to the sensible heat flow passage and through which heating-water flows is formed by a latent heat exchange pipe 42, and the sensible heat flow passage through which the heating-water flows is formed by the sensible heat exchange pipe 32 and sensible heat insulation pipes 34. In FIG. 14, the latent heat flow passage is represented in the form of an arrow passing through the latent heat exchange pipe 42, and the sensible heat flow passage is represented in the form of an arrow passing through the sensible heat exchange pipe 32 and the sensible heat insulation pipes 341 and 342. For a better understanding of areas through which the flow passages pass, the flow passage caps of the connection flow passage cap plates 71 and 72 are not illustrated in FIG. 14 in a state in which general side plates, heat insulation side plates, and fins of the heat exchanger unit are removed. The sensible heat flow passage and the latent heat flow passage are connected to form an integrated heating-water flow passage. The sensible heat flow passage may include a series flow passage in at least a partial section, and the latent heat flow passage may include a parallel flow passage in at least a partial section. In the other modified example of the first embodiment of the present disclosure illustrated in FIGS. 10 to 14 and 29, the sensible heat flow passage is configured to include only a series flow passage, and the latent heat flow passage is configured to include a parallel flow passage.

To form the heating-water flow passage without connection by a separate tube body, the connection flow passage cap plates 71 and 72 connecting the sensible heat exchanger 30 and the latent heat exchanger 30 may be disposed in the other modified example of the first embodiment of the present disclosure.

To connect openings of the latent heat exchange pipe 42, the sensible heat exchange pipe 32, and the sensible heat insulation pipes 34 exposed outside the two main general side plates 5111 and 5112 of the main case (51 of FIG. 2), the connection flow passage cap plates 71 and 72, a kind of a flow passage cap plate, include flow passage caps having, between the main general side plate 511 and the flow passage caps, a connection space surrounding the openings.

To connect an outlet of the latent heat flow passage that is exposed outside a reference side plate, which is one of the two main general side plates 5111 and 5112, and is formed by the latent heat exchange pipe 42 and an inlet of the sensible heat flow passage that is exposed outside the reference side plate and that introduces the heating-water into the sensible heat insulation pipes 34, one of the connection flow passage cap plates 71 and 72 that is located on one side along the predetermined direction D1 includes a connection flow passage cap having, between the reference side plate and the connection flow passage cap, a connection space surrounding the outlet of the latent heat flow passage and the inlet of the sensible heat flow passage.

In the other modified example of the first embodiment of the present disclosure, the reference side plate is the second main general side plate 5112, and the one connection flow passage cap plate is the second connection flow passage cap plate 72 including the connection flow passage cap 722. However, the position where the reference side plate is disposed is not limited thereto.

The connection flow passage cap 722 extends along the flow direction D1 of the combustion gas to connect the sensible heat exchanger 30 and the latent heat exchanger 40 stacked on each other. Furthermore, as the connection flow passage cap 722 connects a plurality of straight portions included in the latent heat exchange pipe 42 and the sensible heat insulation pipes 34, the connection flow passage cap 722 may extend into the latent heat exchanger 40 while extending along the flow direction D1 of the combustion gas. Accordingly, the connection flow passage cap 722 that is not completely parallel to the flow direction D1 of the combustion gas and that has a portion in an inclined form may be formed.

An inlet flow passage cap 721 having a heating-water supply hole 7211 formed therein and the outlet flow passage cap 725 having a heating-water discharge hole 7251 that is the outlet of the sensible heat flow passage are formed in the second connection flow passage cap plate 72. The outlet of the sensible heat flow passage is implemented by the outlet of the second sensible heat insulation pipe 342. In the other modified example of the first embodiment of the present disclosure, it is assumed that the heating-water is introduced into the latent heat exchanger 40 through the heating-water supply hole 7211, the heating-water flows to the sensible heat exchanger 30 through the connection flow passage cap 722, and the heating-water is heated and discharged through the heating-water discharge hole 7251 from the sensible heat exchanger 30. However, the inlet flow passage cap 721 and the heating-water supply hole 7211 may be disposed to be connected with the sensible heat exchanger 30, the outlet flow passage cap 725 and the heating-water discharge hole 7251 may be disposed to be connected with the latent heat exchanger 40, and the heating-water flow passage may be formed in an opposite direction such that the heating-water passing through the sensible heat exchanger 30 faces toward the latent heat exchanger 40.

The plurality of straight portions included in the latent heat exchange pipe 42 may be connected to the inlet flow passage cap 721 in parallel, and the heating-water introduced through the heating-water supply hole 7211 may move along the parallel flow passage. The outlet of the second sensible heat insulation pipe 342 may be connected to the outlet flow passage cap 725, and the outlet flow passage cap 725 may receive, from the second sensible heat insulation pipe 342, the heating-water heated via the sensible heat flow passage and may discharge the heating-water.

When it is assumed that a virtual rectangular parallelepiped accommodates both the latent heat exchanger 40 and the sensible heat exchanger 30, the heating-water supply hole 7211 that is the inlet of the latent heat flow passage and the heating-water discharge hole 7251 that is the outlet of the sensible heat flow passage may be provided together on a reference surface that is one of the six surfaces of the rectangular parallelepiped. In other words, both the heating-water supply hole 7211 and the heating-water discharge hole 7251 may be provided in a flow passage cap plate that covers one of side plates constituting the main case (51 of FIG. 1). In the other modified example of the first embodiment of the present disclosure, the one side plate may be the second main general side plate 5111 that forms a connection space together with the flow passage caps of the second connection flow passage cap plate 72, and the flow passage cap plate covering the one side plate is the second connection flow passage cap plate 72. Accordingly, the heating-water is introduced into and discharged from the heat exchanger unit through a side surface on which the second connection flow passage cap plate 72 is disposed among side surfaces of the heat exchanger unit. However, the reference surface may be differently disposed without being limited thereto.

As the heating-water supply hole 7211 and the heating-water discharge hole 7251 are disposed in the same side surface of the heat exchanger unit, the direction in which the heating-water is introduced through the heating-water supply hole 7211 and the direction which the heating-water is discharged through the heating-water discharge hole 7251 may be opposite to each other. As the heating-water is introduced and discharged through the same side surface, a space required for arranging a heating-water pipe connected to the heating-water supply hole 7211 and the heating-water discharge hole 7251 may be saved. However, the heating-water supply hole 7211 and the heating-water discharge hole 7251 may be disposed in opposite side surfaces.

To locate the heating-water supply hole 7211 and the heating-water discharge hole 7251 in the same side surface, the heating-water flow passage may include an even number of sections in which the heating-water faces from one side to an opposite side of the predetermined direction D2 or from the opposite side to the one side. That is, the number of times that the heating-water faces from one side surface to another side surface of the heat exchanger unit based on the predetermined direction D2 may be an even number in the entire heating-water flow passage. In other words, when only a change in a progress direction from one side to an opposite side of the predetermined direction D2 or from the opposite side to the one side is counted, the heating-water flow passage may change the direction an odd number of times. In the other modified example of the first embodiment of the present disclosure, the entire heating-water flow passage changes the direction a total of seven times, but the number of times is not limited thereto. In other words, in the latent heat flow passage and the sensible heat flow passage, the number of sections connecting the reference surface and the surface opposite to the reference surface along the predetermined direction D2 may be an even number such that the heating-water flowing from the reference surface to the surface located on the opposite side to the reference surface returns to the reference surface again.

The description of the positions of the heating-water supply hole 7211 and the heating-water discharge hole 7251 of the first embodiment may be applied to other embodiments of the present disclosure and modified examples thereof.

The second connection flow passage cap plate 72 includes the second sensible heat flow passage cap 723 and the fourth sensible heat flow passage cap 724 that connect the straight portions 321, 322, 323, and 324 included in the sensible heat exchange pipe 32. The second sensible heat flow passage cap 723 may connect the first outer straight portion 321 and the intermediate straight portion 323 in series, and the third sensible heat flow passage cap 724 may connect the second outer straight portion 322 and the intermediate straight portion 324 in series.

The first connection flow passage cap plate 71 is coupled to the first main general side plate 5111 on the opposite side to the second connection flow passage cap plate 72 based on the sensible heat exchanger 30 and the latent heat exchanger 40. Accordingly, the connection flow passage cap 722 is not formed, and the first connection flow passage cap plate 71 includes the latent heat flow passage cap 722 connecting the straight portions included in the latent heat exchange pipe 42, the first sensible heat flow passage cap 712 connecting the straight portions included in the sensible heat exchange pipe 32, the third sensible heat flow passage cap 713, and the fifth sensible heat flow passage cap 714. In FIG. 11, one latent heat flow passage cap 711 is formed. However, the number of latent heat flow passage caps 711 is not limited thereto, and a plurality of latent heat flow passage caps 711 may be formed.

The latent heat flow passage cap 711 may be connected with ends of the plurality of straight portions included in the latent heat exchange pipe 42. Accordingly, the plurality of straight portions included in the latent heat exchange pipe 42 may form a parallel flow passage. The first sensible heat flow passage cap 712 may connect the first sensible heat insulation pipe 341 and the first outer straight portion 321, the third sensible heat flow passage cap 713 may connect the intermediate straight portions 323 and 324, and the fifth sensible heat flow passage cap 714 may connect the second outer straight portion 322 and the second sensible heat insulation pipe 342.

The description of the configuration of the latent heat flow passage including the parallel flow passage of the first embodiment may be applied to other embodiments of the present disclosure and modified examples thereof.

The heating-water flow passage formed by the first connection flow passage cap plate 71 and the second connection flow passage cap plate 72 according to the other modified example of the first embodiment of the present disclosure will be described along a flow of heating-water. The heating-water is introduced into the latent heat exchanger 40 through the heating-water supply hole 7211 formed in the inlet flow passage cap 721 of the second connection flow passage cap plate 72. As the inlet flow passage cap 721 connects the plurality of straight portions of the latent heat exchange pipe 42 in parallel, the heating-water is delivered to the latent heat flow passage cap 711, which is formed on the second connection flow passage cap plate 72, along the parallel flow passage through the plurality of latent heat exchange pipes 42 connected to the inlet flow passage cap 721.

As the latent heat flow passage cap 722 connects the latent heat exchange pipes 42 in parallel, the heating-water is delivered to the connection flow passage cap 713 through the plurality of latent heat exchange pipes 42 not connected with the inlet flow passage cap 712 and connected with the connection flow passage cap 713 in parallel. That is, the heating-water flows in parallel in the area of the heating-water flow passage that corresponds to the latent heat exchanger 40.

The connection flow passage cap 722 is connected with the first sensible heat insulation pipe 341. The heating-water flows through the first sensible heat insulation pipe 341 and is delivered to the first sensible heat flow passage cap 712 of the first connection flow passage cap plate 71, and heat loss of the sensible heat exchanger 30 is interrupted.

The heating-water is delivered to the first outer straight portion 321 connected to the first sensible heat flow passage cap 712. The heating-water is delivered to the second sensible heat flow passage cap 723. As the intermediate straight portion 323 is connected to the second sensible heat flow passage cap 723, the heating-water flows along the intermediate straight portion 323 and is delivered to the third sensible heat flow passage cap 713. As the intermediate straight portion 324 is connected to the third sensible heat flow passage cap 713, the heating-water flows along the intermediate straight portion 324 and is delivered to the fourth sensible heat flow passage cap 724. As the second outer straight portion 322 is connected to the fourth sensible heat flow passage cap 724, the heating-water flows along the second outer straight portion 322 and is delivered to the fifth sensible heat flow passage cap 714. As the second sensible heat insulation pipe 342 is connected to the fifth sensible heat flow passage cap 714, the heating-water flows along the second sensible heat insulation pipe 342 and is delivered to the outlet flow passage cap 725.

That is, the heating-water flows along the sensible heat flow passage in series. The heating-water is heated by sensible heat while reciprocating between the first connection flow passage cap plate 71 and the second connection flow passage cap plate 72 and is delivered to the second sensible heat insulation pipe 342.

The second sensible heat insulation pipe 342 interrupts heat loss of the sensible heat exchanger 30 while delivering the heating-water to the outlet flow passage cap 725, and the heating-water is discharged through the heating-water discharge hole 7251 and is used for heating.

Main Flow Passage

The condensing boiler 1 including the heat exchanger according to the first embodiment of the present disclosure includes the main flow passage. The main flow passage is a pipe that is directly or indirectly connected to a heating flow passage for providing heating and that supplies the heating-water to the heating flow passage. The main flow passage is directly or indirectly connected to the sensible heat exchanger 30 or the latent heat exchanger 40 and supplies the heating-water to the heat exchanger to heat the heating-water or supplies the heated heating-water from the heat exchanger to the heating flow passage. Accordingly, the heating-water pipe connected with the sensible heat exchanger 30 and the latent heat exchanger 40 to supply or receive the heating-water may be included in the main flow passage.

Second Embodiment

Figure 15:
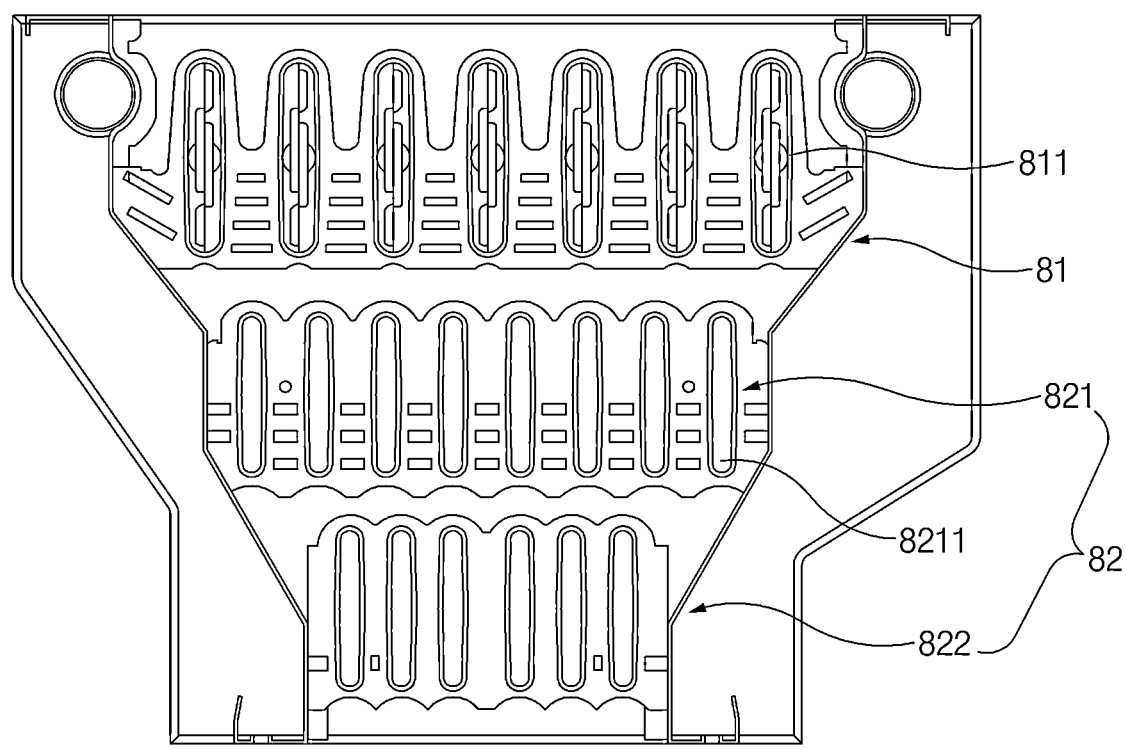
FIG. 15 is a vertical sectional view of a heat exchanger unit according to a second embodiment of the present disclosure.

FIG. 15 is a vertical sectional view of a heat exchanger unit according to the second embodiment of the present disclosure.

Referring to FIG. 15, the heat exchanger unit according to the second embodiment of the present disclosure may have a sensible heat exchanger 81 and a latent heat exchanger 82 having two rows of latent heat exchangers. A first latent heat exchanger 821 located at an upstream side based on a flow direction of combustion gas may have a greater width in an orthogonal direction than a second latent heat exchanger 822.

Furthermore, the heat exchanger unit according to the second embodiment of the present disclosure may have a larger number of straight portions 8211 included in a latent heat exchange pipe and a larger number of straight portions 811 included in a sensible heat exchange pipe than the heat exchanger units according to the first embodiment of the present disclosure and the one modified example of the first embodiment of the present disclosure. The number of straight portions that the first latent heat exchanger 821 has may be larger than the number of straight portions that the second latent heat exchanger 821 has.

Figure 16:
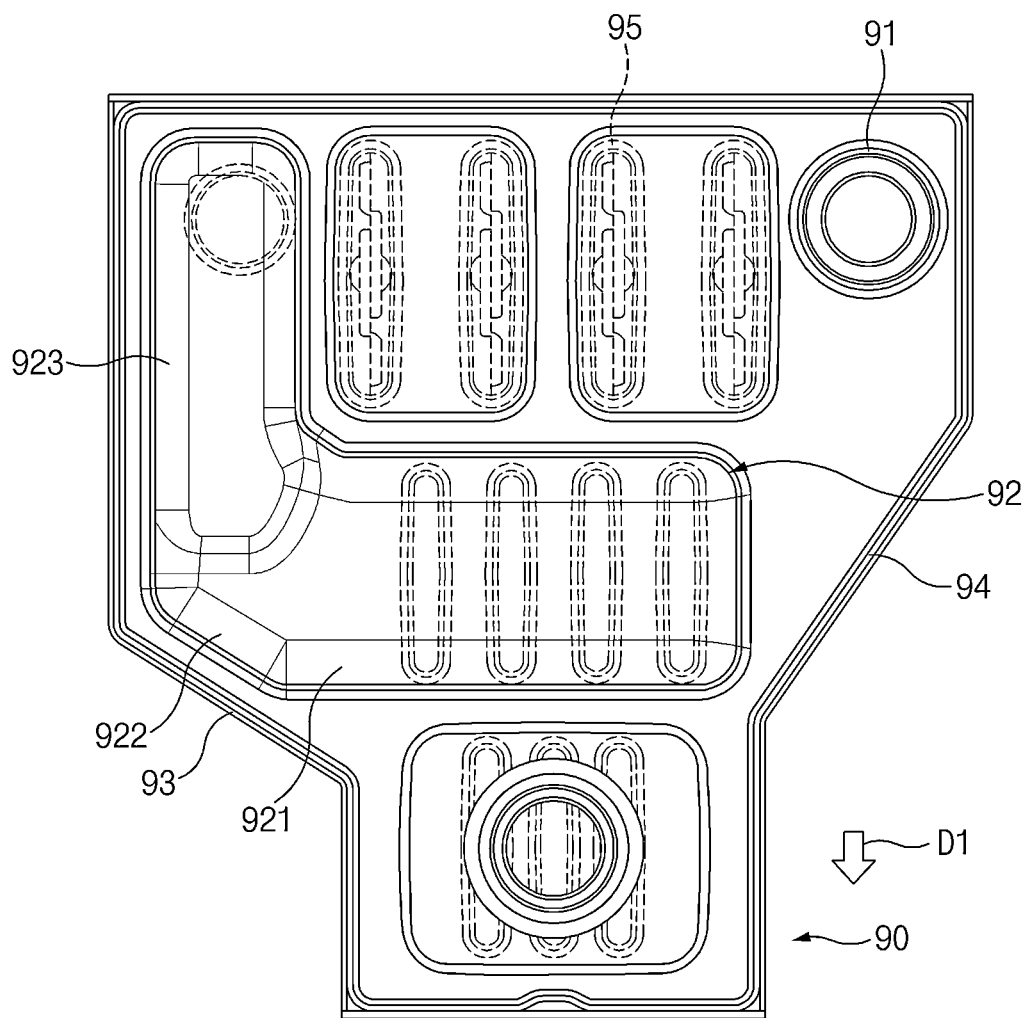
FIG. 16 is a front view illustrating a flow passage cap plate of a heat exchanger unit according to a modified example of the second embodiment of the present disclosure together with pipes.

FIG. 16 is a front view illustrating a flow passage cap plate 90 of a heat exchanger unit according to a modified example of the second embodiment of the present disclosure together with pipes. The pipes are illustrated by dotted lines.

Referring to FIG. 16, the flow passage cap plate 90 of the heat exchanger unit according to the modified example of the second embodiment of the present disclosure includes a heating-water discharge hole 91 not formed through a flow passage cap and directly formed through the flow passage cap plate 90. The heating-water discharge hole 91 may not be located downstream of a sensible heat exchange pipe 95 along a flow direction D1 of combustion gas and may be disposed on the same line along an orthogonal direction so as to be adjacent to the sensible heat exchange pipe 95.

The flow passage cap plate 90 according to the modified example of the second embodiment of the present disclosure may include a modified connection flow passage cap 92. When the modified connection flow passage cap 92 is compared with the connection flow passage cap (722 of FIG. 10) according to the other modified example of the first embodiment of the present disclosure, the length of an inclined portion 922 formed to be inclined with respect to the orthogonal direction and the flow direction D1 of the combustion gas is smaller than the length of a portion 923 extending along the flow direction D1 of the combustion gas and the length of a portion 921 extending along the orthogonal direction. Furthermore, when the modified connection flow passage cap 92 is compared with the connection flow passage cap (722 of FIG. 10) according to the other modified example of the first embodiment of the present disclosure, the width of the inclined portion 922 is smaller than the width of the portion 921 extending along the orthogonal direction.

Due to the position of the heating-water discharge hole 912 and the shape of the connection flow passage cap 92, the flow passage cap plate 90 may have an asymmetrical structure that does not have line symmetry with respect to a line parallel to the flow direction D1 of the combustion gas. The flow passage cap plate 90 may have a tapered shape having a decreasing width along the flow direction D1 of the combustion gas. In FIG. 16, a left inclined portion 93 and a right inclined portion 94 may be configured to have tapered outer surfaces from different locations to other different locations based on the flow direction D1 of the combustion gas. This is to reduce a waste of material by cutting a portion corresponding to an unnecessary area.

The shapes of the sensible heat exchanger 81 and the latent heat exchanger 82 according to the second embodiment or the shape of the flow passage cap plate 90 according to the modified example of the second embodiment may be applied to other embodiments of the present disclosure and modified examples thereof.

Third Embodiment

Figure 17:
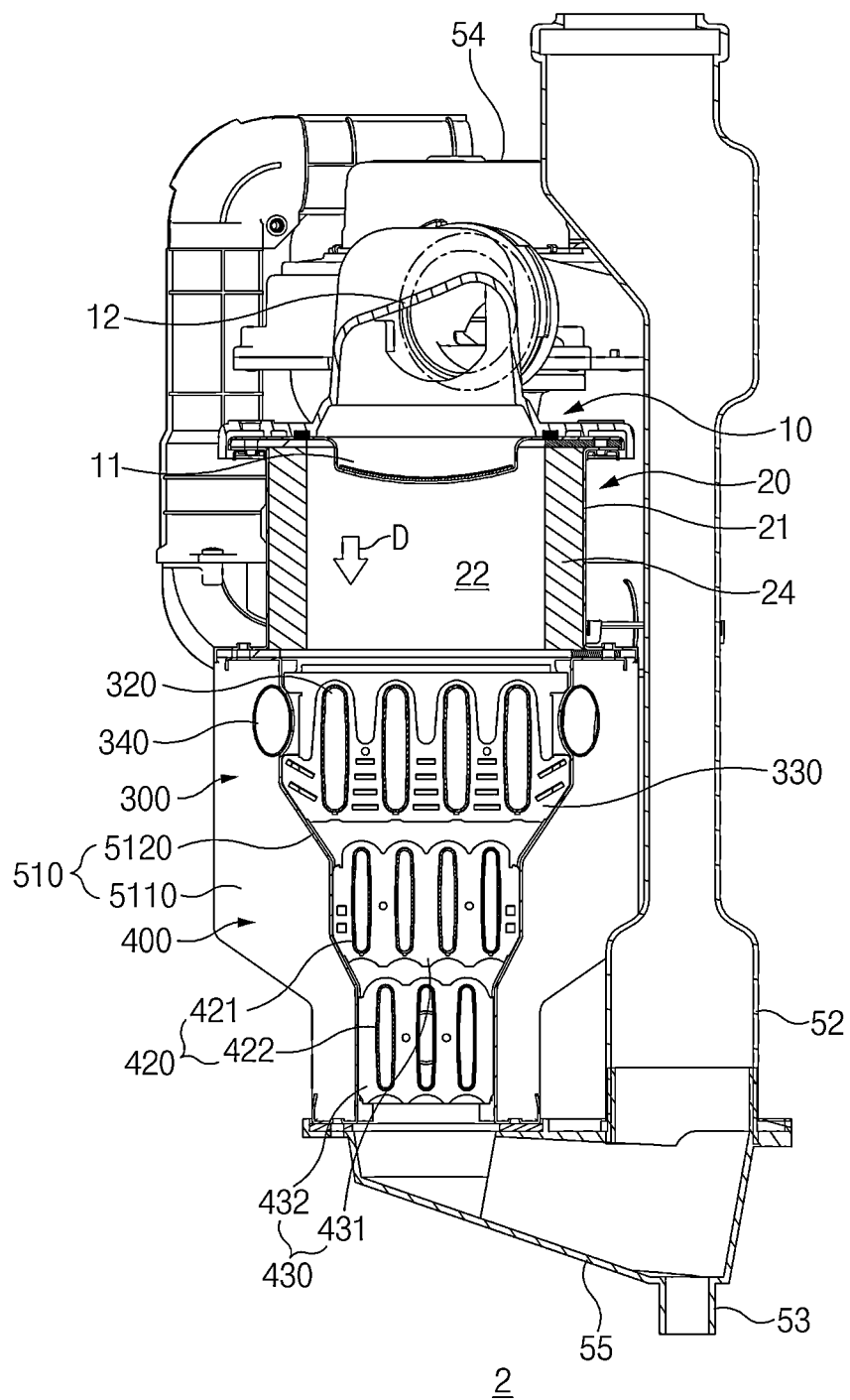
FIG. 17 is a vertical sectional view of a heat exchanger unit and a condensing boiler using the same according to a third embodiment of the present disclosure.
Figure 18:
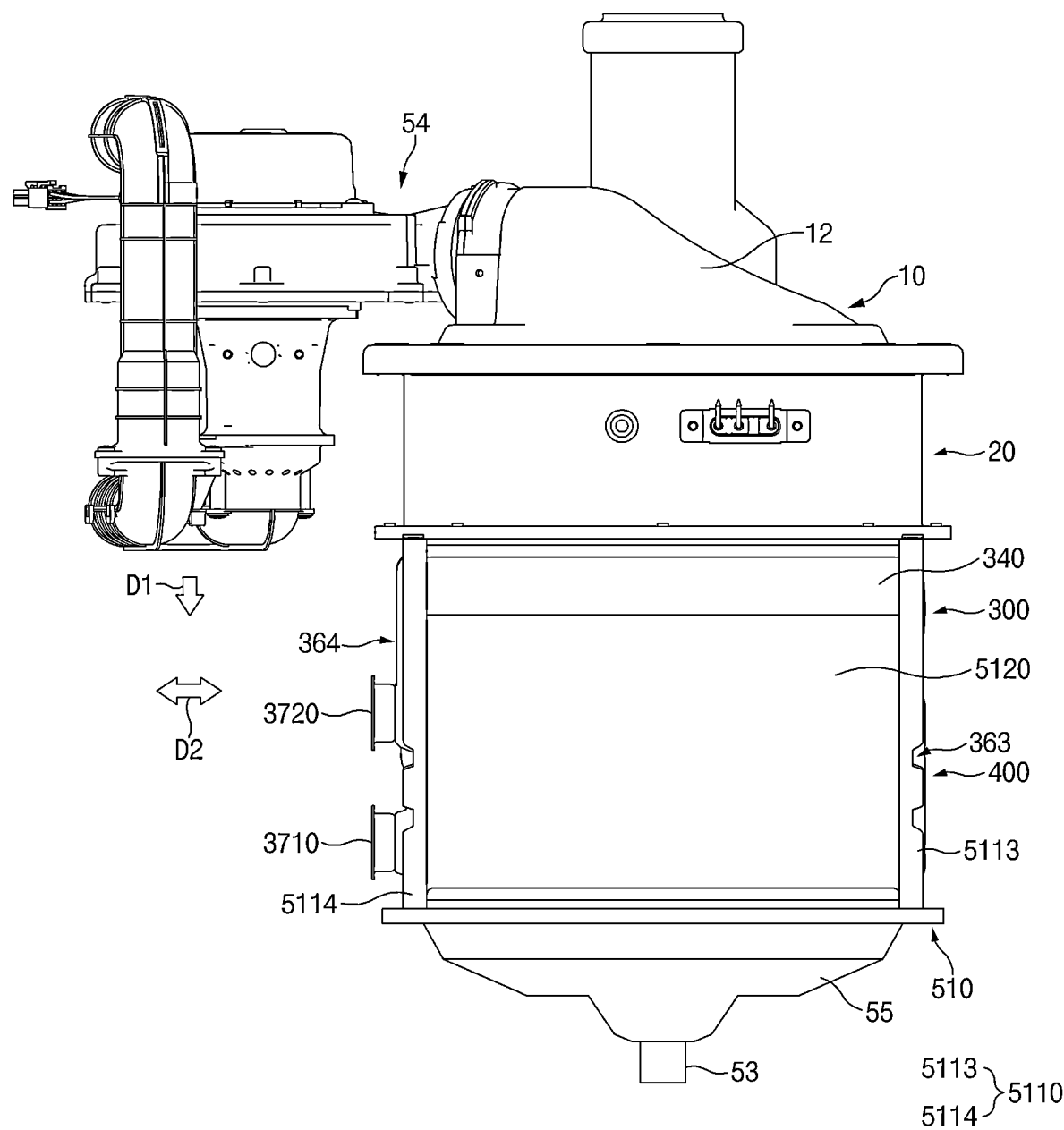
FIG. 18 is a side view of the heat exchanger unit and the condensing boiler using the same according to the third embodiment of the present disclosure.

FIG. 17 is a vertical sectional view of a heat exchanger unit and a condensing boiler 2 using the same according to the third embodiment of the present disclosure. FIG. 18 is a side view of the heat exchanger unit and the condensing boiler 2 using the same according to the third embodiment of the present disclosure.

Referring to the drawings, the condensing boiler 2 according to the third embodiment of the present disclosure includes a combustion chamber 20 and the heat exchanger unit.

Furthermore, the condensing boiler 2 including the heat exchanger unit according to the third embodiment of the present disclosure includes a burner assembly 10 including a burner 11. The burner assembly 10 and the heat exchanger unit are disposed in sequence along a reference direction D1, which is a flow direction of combustion gas, and components are arranged in the heat exchanger unit along the same direction in the order of the combustion chamber 20 and the heat exchanger unit. Accordingly, the components of the condensing boiler 2 will be described below in the above-described order of arrangement.

The heat exchanger unit according to the third embodiment of the present disclosure, and the burner assembly 10, the combustion chamber 20, a condensate receiver 55, a condensate outlet 53, and an exhaust duct 52 included in the condensing boiler 2 using the heat exchanger unit are identical or very similar to the corresponding components of the first embodiment. Therefore, descriptions thereof are replaced with the above-described contents of the first embodiment.

Heat Exchanger Unit

Figure 19:
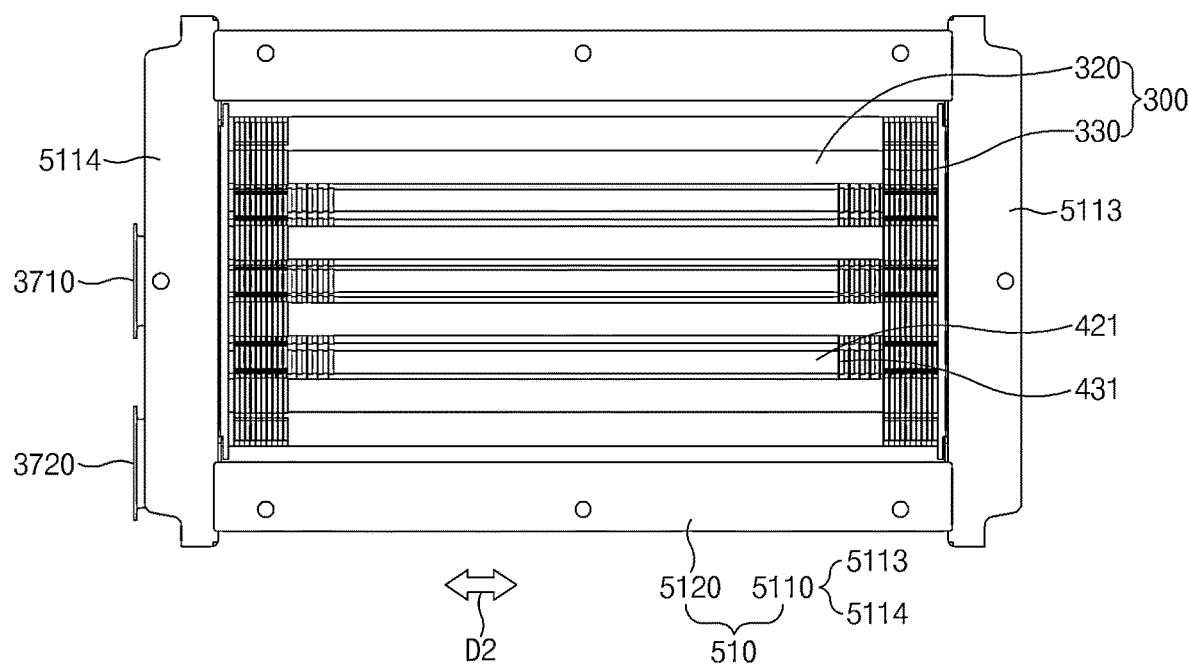
FIG. 19 is a plan view of the heat exchanger unit according to the third embodiment of the present disclosure.
Figure 20:
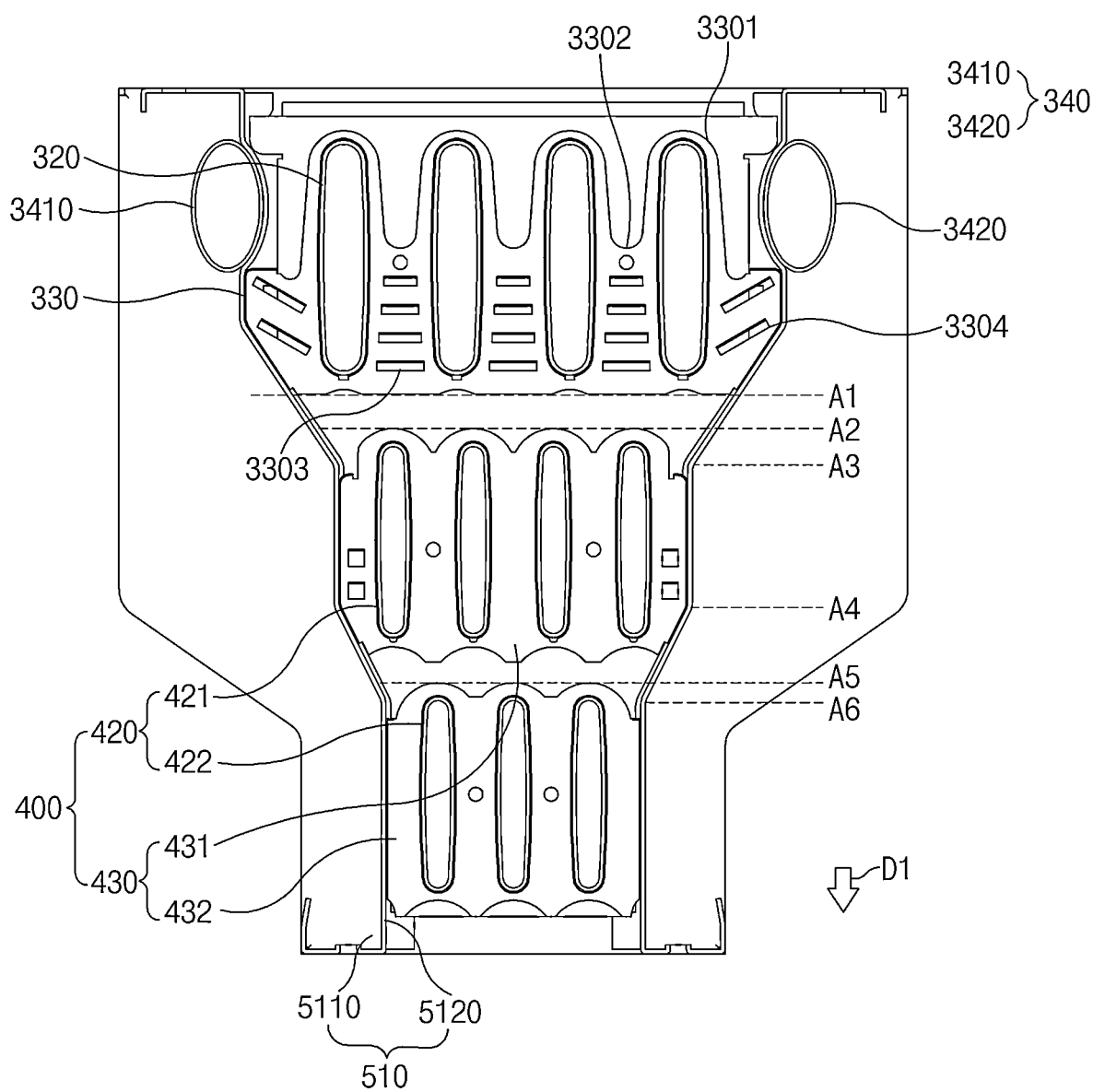
FIG. 20 is a vertical sectional view of the heat exchanger unit according to the third embodiment of the present disclosure.

FIG. 19 is a plan view of the heat exchanger unit according to the third embodiment of the present disclosure. FIG. 20 is a vertical sectional view of the heat exchanger unit according to the third embodiment of the present disclosure.

Referring to the drawings, the heat exchanger unit according to the third embodiment of the present disclosure includes a sensible heat exchanging part 300 and a latent heat exchanging part 400. Furthermore, the heat exchanger unit of the present disclosure may include a housing 510 that defines heat exchange areas inside by surrounding a sensible heat exchange area and a latent heat exchange area in which the heat exchanging parts 300 and 400 are disposed.

The sensible heat exchanging part 300 and the latent heat exchanging part 400 may be disposed in the sensible heat exchange area and the latent heat exchange area, respectively. The sensible heat exchange area and the latent heat exchange area may be connected, and the combustion gas delivered from the combustion chamber 20 may flow in the sensible heat exchange area and the latent heat exchange area along the reference direction D1 that is the flow direction.

Heat Exchanger Unit—Sensible Heat Exchanging Part 300

The sensible heat exchange area is an area that is located downstream of the combustion chamber 20 based on the reference direction D1 and that receives sensible heat generated at the upstream side and heats heating-water. The size of the sensible heat exchange area is determined by a space from the most upstream side to the most downstream side of the sensible heat exchanging part 300 along the reference direction D1 in the space surrounded by the housing 510. Accordingly, the sensible heat exchange area may be connected with an interior space 22 of the combustion chamber 20 and may receive radiant heat from the burner 11, and the combustion gas may flow in the sensible heat exchange area. Furthermore, because the sensible heat exchange area has to be able to transfer sensible heat to the heating-water, the sensible heat exchanging part 300 including a sensible heat exchange pipe 320 and a sensible heat fin 330 is disposed in the sensible heat exchange area.

The sensible heat exchange pipe 320 is a pipe type component through which the heating-water flows and around which the combustion gas flows. The sensible heat exchange pipe 320 extends along a predetermined direction D2 in the sensible heat exchange area 32. The predetermined direction D2 may preferably be a direction perpendicular to the reference direction D1. The sensible heat exchange pipe 320 may extend along the predetermined direction D2 and may be coupled to the housing 510.

The sensible heat exchange pipe 320 may include a plurality of sensible heat straight portions. The sensible heat straight portions may be arranged to be spaced apart from each other along an orthogonal direction perpendicular to the predetermined direction D2. The plurality of sensible heat straight portions of the sensible heat exchange pipe 320 may be coupled to flow passage cap plates 363 and 364 of the housing 510, which will be described below, to form one sensible heat flow passage through which the heating-water flows.

The sensible heat fin 330 is formed in a plate shape across the direction in which the sensible heat exchange pipe 320 extends, and the sensible heat exchange pipe 320 passes through the sensible heat fin 330. As the sensible heat fin 330 has a shape through which the sensible heat exchange pipe 320 passes, the sensible heat exchanging part 300 may configure a heat exchanger of a fin-tube type.

As the sensible heat exchanging part 300 includes the sensible heat fin 330, the thermal conductivity of the sensible heat exchange pipe 320 may be raised. A plurality of sensible heat fins 330 may be disposed to be spaced apart from each other at predetermined intervals along the predetermined direction D2 in which the sensible heat exchange pipe 320 extends. The sensible heat fin 330 may transfer a larger amount of sensible heat to the heating-water by increasing the surface area of the sensible heat exchange pipe 320 capable of receiving sensible heat. Accordingly, for effective heat transfer, the sensible heat exchange pipe 320 and the sensible heat fin 330 may be formed of metal having a high thermal conductivity.

A cross-section obtained by cutting the sensible heat exchange pipe 320 with a plane perpendicular to the predetermined direction D2 in which the sensible heat exchange pipe 320 extends may be formed in the shape of a long hole that extends along the reference direction D1. As can be seen in the drawings, the sensible heat exchange pipe 320 according to the third embodiment of the present disclosure may have a flat shape formed such that a value obtained by dividing the length of the interior space in the cross-section based on the reference direction D1 by the width according to the direction perpendicular to the reference direction D1 equals 2 or more. When the flat type pipe having the above-described shape is employed for the sensible heat exchange pipe 320, due to a wider heat exchange area in the relationship with the combustion gas, the heating-water may receive a larger amount of heat and may be sufficiently heated even though flowing along the sensible heat exchange pipe 320 having the same length, as compared with when a pipe having a different shape, such as a circular shape or an oval shape, is employed for the sensible heat exchange pipe 320.

A through-hole through which the sensible heat exchange pipe 320 passes may be formed in the sensible heat fin 330. The area of the through-hole may be equal to or smaller than the area of the sensible heat exchange pipe 320, and the sensible heat exchange pipe 320 may be firmly inserted into the through-hole. Furthermore, the sensible heat fin 330 may be integrally coupled with the sensible heat exchange pipe 320 through brazing welding. A method of coupling the sensible heat fin 330 and the sensible heat exchange pipe 320 through brazing welding will be described in detail in the descriptions of FIGS. 15 and 16.

Common louver holes 3303 and 3304 may be additionally formed in the sensible heat fin 330 along the direction in which the sensible heat exchange pipe 320 extends. The louver holes 3303 and 3304 may be formed by punching. The louver holes 3303 and 3304 include a burr raised along the periphery thereof. When the combustion gas flows, the burr blocks the combustion gas to cause the combustion gas to flow around the sensible heat exchange pipe 320, thereby facilitating heat exchange between the combustion gas and the heating-water. A plurality of louver holes 3303 and 3304 may be formed. The louver holes 3303 and 3304, as illustrated in the drawings, may include the first louver holes 3303 that extend in an oblique direction with respect to the reference direction D1 and the second louver holes 3304 that are formed between the adjacent sensible heat straight portions of the sensible heat exchange pipe 320 and that extend in the orthogonal direction perpendicular to the reference direction D1. The louver holes 3303 and 3304 may be disposed to be spaced apart from each other at predetermined intervals along the reference direction D1.

The sensible heat fin 330 may further include valleys 3302 and protruding portions 3301. The sensible heat fin 330 may be basically formed to surround the sensible heat exchange pipe 320. The sensible heat fin 33 may surround areas corresponding to a predetermined width from the peripheries of upstream-side end portions of the sensible heat exchange pipe 320 based on the reference direction D1 such that the areas are distinguished from the remaining areas of the sensible heat exchange pipe 320. Accordingly, between the adjacent upstream-side end portions of the sensible heat exchange pipe 320, the valleys 3302 may be concavely formed in the sensible heat fin 330 along the reference direction D1. The areas of the sensible heat fin 330 that are adjacent to the upstream-side end portions of the sensible heat exchange pipe 320 relatively protrude to form the protruding portions 3301. Unnecessary areas are open by forming the valleys 3302, and thus the combustion gas may more freely flow between the sensible heat fin 330 and the sensible heat exchange pipe 320.

Heat Exchanger Unit—Latent Heat Exchanging Part 400

The latent heat exchange area is an area that is located downstream of the sensible heat exchange area based on the reference direction D1 and that receives latent heat generated during a phase change of the combustion gas and heats the heating-water. The size of the latent heat exchange area is determined by a space from the most upstream side to the most downstream side of the latent heat exchanging part 400 along the reference direction D1 in the space surrounded by the housing 510. The latent heat exchanging part 400 that includes a latent heat exchange pipe 420 through which the heating-water flows and around which the combustion gas flows and a latent heat fin 430 that is formed in a plate shape across the predetermined direction D2, in which the latent heat exchange pipe 420 extends, and through which the latent heat exchange pipe 420 passes is disposed in the latent heat exchange area.

The configurations of the latent heat exchange pipe 420 and the latent heat fin 430 are similar to the configurations of the sensible heat exchange pipe 320 and the sensible heat fin 330. Therefore, descriptions of basic structures of the latent heat exchange pipe 420 and the latent heat fin 430 are replaced with the above descriptions of the structures of the sensible heat exchange pipe 320 and the sensible heat fin 330. Accordingly, the latent heat exchanging part 400 may also be configured in a fin-tube type.

The latent heat exchange pipe 420 may include a plurality of upstream straight portions 421 and a plurality of downstream straight portions 422 located downstream of the upstream straight portions 421 based on the reference direction D1. One of the plurality of downstream straight portions 422 may be connected with one upstream straight portion 421 among the plurality of upstream straight portions 421. That is, the latent heat exchange pipe 420 may be disposed in two rows. The latent heat exchange pipe 420 may be disposed to have more than two rows. As the latent heat exchange pipe 420 has the plurality of rows of straight portions, the latent heat exchange pipe 420 may improve thermal efficiency that is likely to be degraded when a fin-tube type is used.

In FIG. 20, four upstream straight portions 421 and three downstream straight portions 422 are disposed. This is because the reference cross-sectional area of the latent heat exchange area is decreased along the reference direction D1 as will be described below. However, the number of latent heat straight portions 421 and 422 constituting the latent heat exchange pipe 420 and extending in the predetermined direction D2 is not limited thereto.

As the latent heat exchange pipe 420 is disposed in two rows, the latent heat fin 430 may also be disposed to be separated depending on the latent heat exchange pipe 420. That is, an upstream fin 431 included in the latent heat fin 430 may be coupled to the upstream straight portions 421, and a downstream fin 432 included in the latent heat fin 430 may be coupled to the downstream straight portions 422.

As the latent heat exchange pipe 420 is disposed in two rows, a situation in which the combustion gas fails to sufficiently transfer heat to the heating-water due to a deficiency of a heat transfer area in the latent heat exchange area may be prevented, and as sufficient heat exchange occurs over a wide area for the entire combustion gas, a fraction at which the combustion gas is discharged without experiencing a phase change may be reduced.

The cross-sectional area of the interior spaces of the latent heat straight portions 421 and 422 of the latent heat exchange pipe 420 may be smaller than the cross-sectional area of the interior spaces of the sensible heat straight portions of the sensible heat exchange pipe 320. Instead of making the cross-sectional area of the latent heat straight portions 421 and 422 smaller than the cross-sectional area of the interior spaces of the sensible heat straight portions, the total number of sensible heat straight portions may be made smaller than the total number of latent heat straight portions 421 and 422 such that the product of the cross-sectional area of the interior spaces of the sensible heat straight portions and the total length of the sensible heat exchange pipe 320 remains at a numerical value corresponding to the product of the cross-sectional area of the interior spaces of the latent heat straight portions 421 and 422 and the total length of the latent heat exchange pipe 420.

In other words, the latent heat exchange pipe 420 may be formed such that in a cross-section obtained by cutting the sensible heat exchange pipe 320 with a plane perpendicular to the direction in which the sensible heat exchange pipe 320 extends, the number of closed curves formed by the peripheries of the sensible heat straight portions is smaller than the number of closed curves formed by the peripheries of the latent heat straight portions 421 and 422. In a case where the same number of or more pipes having a larger cross-sectional area than the latent heat straight portions 421 and 422 are disposed in the sensible heat exchanging part 300, when the heating-water moves to the adjacent sensible heat exchange pipe 320 via the flow passage cap plates 363 and 364, the heating-water may not be efficiently circulated due to a rapid pressure drop in the heating-water that occurs in a section where a flow passage is sharply bent. Accordingly, the cross-sectional areas and the total numbers of the sensible heat exchange pipes 320 and the latent heat exchange pipes 420 are adjusted as described above. The contents regarding the cross-sectional areas and the total numbers of the heat exchange pipes may be applied to other embodiments and modified examples thereof. Likewise to the sensible heat fin 330, a plurality of latent heat fins 430 are disposed to be spaced apart from each other at predetermined intervals along the direction in which the latent heat exchange pipe 420 extends.

One or more layers in which the latent heat fins 430 located in the same position based on the reference direction D1 are disposed may be formed. The total number of latent heat fins 430 disposed in the layer most adjacent to the sensible heat fin 330 among the layers may be smaller than the total number of sensible heat fins 330.

Referring to the drawings, a total of two layers including one layer formed by the upstream fin 431 and one layer formed by the downstream fin 432 may be disposed. The upstream fin 431 is disposed in the layer most adjacent to the sensible heat fin 330 among the layers. The total number of upstream fins 431 may be smaller than the total number of sensible heat fins 330.

The distance by which the adjacent two latent heat fins 430 are spaced apart from each other may be longer than the distance by which the adjacent two sensible heat fins 330 are spaced apart from each other. To prevent condensate from being easily formed between the latent heat fins 430 and hampering a movement of the combustion gas, the interval between the latent heat fins 430 is greater than the interval between the sensible heat fins 330. In the latent heat fin 430, the distance by which the adjacent two downstream fins 432 are spaced apart from each other may be longer than the distance by which the adjacent two upstream fins 431 are spaced apart from each other.

A predetermined interval at which the adjacent latent heat fins 430 are spaced apart from each other along the predetermined direction D2 may be a distance by which condensate formed by condensation of the combustion gas between the adjacent latent heat fins 430 does not connect the adjacent latent heat fins 430. That is, the distance between the adjacent latent heat fins 430 may be an interval by which condensate is easily discharged.

Figure 21:
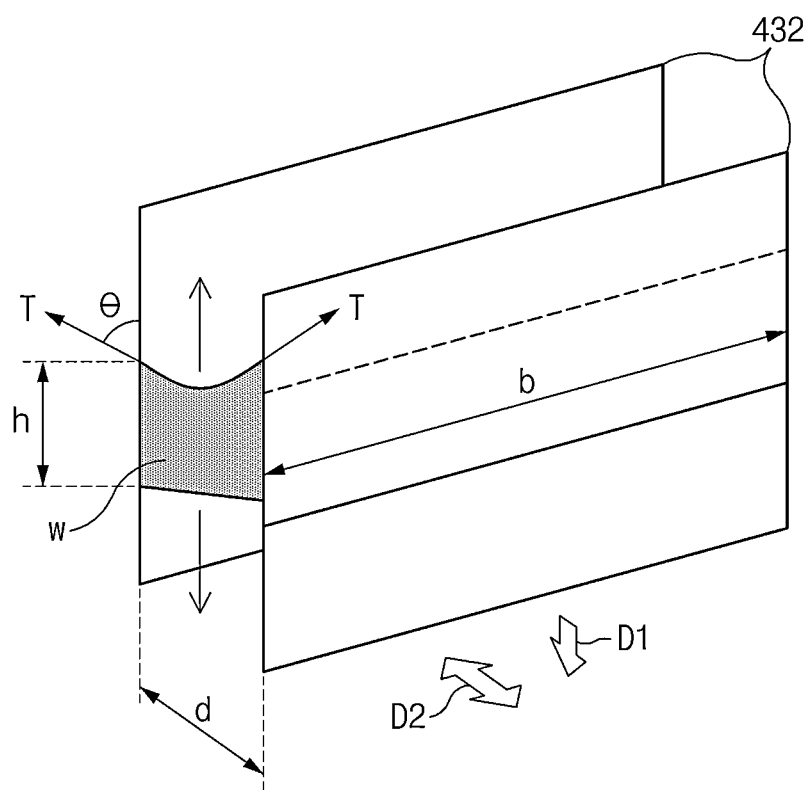
FIG. 21 is a perspective view illustrating a plurality of downstream fins according to the third embodiment of the present disclosure and condensate located therebetween.

FIG. 21 is a perspective view illustrating a plurality of downstream fins 432 according to the third embodiment of the present disclosure and condensate W located therebetween. The distance between the adjacent latent heat fins 430 will be described with reference to FIG. 21, with the downstream fins 432 among the latent heat fins 430 as an example.

Drops of condensate may be formed and attached to surfaces of the downstream fins 432. The drops of condensate formed on the surfaces of the adjacent downstream fins 432 may be combined to form a large drop of condensate W that blocks the space between the latent heat fins 430, and the combustion gas may not smoothly move along the reference direction D1 due to the large drop of condensate W. Accordingly, the downstream fins 432 are disposed to be spaced apart from each other at a predetermined interval or more such that the drops of condensate are not combined with each other and the combustion gas flows between the adjacent downstream fins 432.

Specifically, the interval by which the condensate W is easily discharged refers to the interval between the adjacent downstream fins 432 in a state in which the weight of the condensate W formed between the downstream fins 432 is greater than the vertical resultant force of tensions T acting between the downstream fins 432 and the condensate W.

Referring to the drawing, the condensate W exists between the downstream fins 432 that are spaced apart from each other by a distance of d and adjacent to each other and that have a width of b in the predetermined direction D2. At this time, the weight (or, the body force) of the condensate W formed to a height of h is represented by the product of the volume of the condensate W (the distance d×the width b×the height h) and the specific gravity Y of the condensate W. The weight acts on the condensate in the vertically downward direction.

Meanwhile, the force acting on the condensate W in the vertically upward direction is formed by the resultant force of surface tensions. The distance d satisfying Equation 1 below is the interval by which the condensate W is easily discharged, where θ is the angle that a line extending from the surface of the condensate W forms with each of the downstream fins 432 and T is surface tension by which the condensate W is pulled by the downstream fin 432.

$$\gamma \times b \times d \times h \times g \geq 2(T \times b \times \cos \theta)$$ [Equation 1]

Here, g is the acceleration of gravity. When Equation 1 above is balanced under the assumption that other conditions are equal, the height h of the condensate W and the interval d between the downstream fins 432 by which the condensate W is easily discharged have an inverse relationship. Accordingly, the interval by which the condensate is easily discharged may be determined by selecting an appropriate height of the condensate desired to be discharged from the latent heat exchanger 40.

Tension T measured in one situation is 0.073 N/m. At room temperature, the specific gravity of the condensate is 1000 kg/m$^3$, θ may be approximated to 0 degrees, and g may be approximated to 9.8 m/s$^2$. As the height h of the condensate mainly ranges from 5 mm to 8 mm, the predetermined interval d of 1.9 mm to 3 mm may be obtained in the one situation by substituting the values into Equation 1. The descriptions of the number of fins and the interval may be applied to other embodiments of the present disclosure and modified examples thereof Heat Exchanger Unit—Housing 510 and Flow Passage Cap Plates 363 and 364

The housing 510 will be described below with reference to FIGS. 17 to 20. The housing 510 is a component that surrounds and defines the sensible heat exchange area and the latent heat exchange area and may include a heat insulation side plate 5120 and a general side plate 5110. The general side plate 5110 may include a first general side plate 5113 and a second general side plate 5114 spaced apart from each other along the predetermined direction D2 and covered by the flow passage cap plates 363 and 364. The heat insulation side plate 5120 is a plate-shaped component extending along the reference direction D1 and the predetermined direction D2. Two heat insulation side plates 5120 may be disposed to be spaced apart from each other in the orthogonal direction. Accordingly, the heat insulation side plates 5120 form two side surfaces of the heat exchanger unit. The lateral shapes of the sensible heat exchange area and the latent heat exchange area are determined depending on the shape of inner surfaces of the heat insulation side plates 5120.

Here, the heat insulation side plates 5120 are used with the meaning of side plates to which sensible heat insulation pipes 340 are disposed to be adjacent, rather than the meaning of side plates that reduce the amount of heat transferred to the outside, thereby achieving thermal insulation. The sensible heat insulation pipes 340 may be additionally disposed adjacent to the heat insulation side plates 5120. The sensible heat insulation pipes 34 are pipe type components that are disposed adjacent to the housing 510 surrounding the sensible heat exchange area and that allow the heating-water to flow therethrough to reduce the amount by which heat of the sensible heat exchange area is released outside the housing 510. As illustrated, two sensible heat insulation pipes 340 may extend in the predetermined direction D2 that is the same as the direction in which the sensible heat exchange pipe 320 extends.

As illustrated in the drawings, the sensible heat insulation pipes 340 may be formed in an oval shape in a cross-section obtained by cutting the sensible heat insulation pipes 340 with a plane perpendicular to the direction in which sensible heat insulation pipes 340 extend. Specifically, the sensible heat insulation pipes 340 may be formed in an oval shape having a long axis parallel to the reference direction D1. The description of the sensible heat insulation pipes (34 of FIG. 2) of the first embodiment may be identically applied to the sensible heat insulation pipes 340 of the third embodiment.

The general side plates 51110 and the flow passage cap plates 363 and 364 are plate-shaped components extending along the reference direction D1 and the orthogonal direction. The two general side plates 5110 may be disposed to be spaced apart from each other in the predetermined direction D2 in which the sensible heat exchange pipe 320 or the latent heat exchange pipe 420 extends. The two general side plates 5110, when being disposed, may be disposed at opposite ends of the sensible heat straight portions and the latent heat straight portions 421 and 422. The opposite ends of the sensible heat straight portions and the latent heat straight portions 421 and 422 may be coupled through the two general side plates 5113 and 5114. Likewise, the two flow passage cap plates 363 and 364 may be coupled while covering the general side plates 5110 from the outside. Accordingly, the general side plates 5110 and the flow passage cap plates 363 and 364 may form the remaining two side surfaces of the heat exchanger unit that the heat insulation side plates 512 do not cover. Other lateral shapes of the sensible heat exchange area and the latent heat exchange area are determined depending on the shape of inner surfaces of the general side plates 5110.

The flow passage cap plates 312 and 313 may include the second flow passage cap plate 364 and the first flow passage cap plate 363 on which a plurality of flow passage caps are formed. The second flow passage cap plate 364 and the first flow passage cap plate 363 may cover the second general side plate 5114 and the first general side plate 5113 and may be disposed adjacent to the opposite ends of the sensible heat straight portions or the latent heat straight portions 421 and 422. A heating-water supply hole 3710 and a heating-water discharge hole 3720 may be disposed in the second flow passage cap plate 364. The heating-water supply hole 3710 may be an opening through which the heating-water is supplied from the outside to one end of an integrated latent heat flow passage formed by the latent heat exchange pipe 420 and may be an inlet of the latent heat flow passage, and the heating-water discharge hole 3720 may be an opening through which the heating-water is discharged to the outside from one end of an integrated sensible heat flow passage formed by the sensible heat exchange pipe 320 and may be an outlet of the sensible heat flow passage.

The heating-water may be introduced from the outside through the heating-water supply hole 3710 located at a relatively downstream side based on the reference direction D1 and may be delivered to the latent heat exchange pipe 420. The heating-water heated in the sensible heat exchange pipe 320 may be discharged to the outside through the heating-water discharge hole 3720 located at a relatively upstream side based on the reference direction D1. However, the positions of the heating-water supply hole 3710 and the heating-water discharge hole 3720 are not limited thereto.

To connect the outlet of the latent heat flow passage exposed outside one of the side plates constituting the housing 510 and the inlet of the sensible heat flow passage exposed outside the one side plate, one of the flow passage cap plates 363 and 364 may include, between the one side plate and the one flow passage cap plate, a flow passage cap having a connection space surrounding the outlet of the latent heat flow passage and the inlet of the sensible heat flow passage. In the third embodiment of the present disclosure, the flow passage cap may be a second flow passage cap 3642 provided on the second flow passage cap plate 364. Accordingly, one of the side plates is the second general side plate 5112 that forms the connection space together with the second flow passage cap plate 364. However, the side plate and the flow passage cap plate that connect the inlet of the sensible heat flow passage and the outlet of the latent heat flow passage are not limited thereto.

The descriptions of the heating-water pipe and the main flow passage of the first embodiment may be applied to a heating-water pipe and a main flow passage that are connected to the heating-water supply hole 3710 and the heating-water discharge hole 3720 of the third embodiment of the present disclosure.

Shape of Heat Exchange Area Formed by Housing 510

The cross-sectional area of each heat exchange area defined on a plane perpendicular to the reference direction D1 is referred to as a reference cross-sectional area. The housing 510 may be provided such that the reference cross-sectional area at the most downstream side is smaller than the reference cross-sectional area at the most upstream side based on the reference direction D1. The housing 510 may be provided such that at least one section in which the reference cross-sectional area of the heat exchange area gradually decreases along the reference direction D1 is formed to allow the combustion gas to flow at higher speed in the latent heat exchange area than in the sensible heat exchange area.

The housing 510 may be formed to include at least one section in which the reference cross-sectional area gradually decreases along the reference direction D1. Accordingly, the heat exchange area may have a tapered shape along the reference direction D1 as a whole. As the housing 510 is formed such that the reference cross-sectional area of the heat exchange area decreases, the occurrence of a dead zone where heat transfer efficiency is deteriorated due to a sharp reduction in flow speed at a specific position when the combustion gas flows in the latent heat exchange area may be prevented by Bernoulli's principle. In particular, in a case where the latent heat exchange pipe 420 is formed of two or more layers as in the third embodiment of the present disclosure, the condensate may block the space between the latent heat fins 430, or the length of the latent heat exchange area along the reference direction D1 may become longer, and thus thermal efficiency may be deteriorated. However, the problem may be overcome because the heat exchange area has a tapered shape due to the housing. Specifically, the housing 510 may be formed to include at least one section in which the width of the heat exchange area in the orthogonal direction gradually decreases along the reference direction D1, and the width of the heat exchange area in the predetermined direction D2 may be formed to remain constant along the reference direction D1. That is, the reference cross-sectional area is decreased by reducing only the width in the orthogonal direction in a state in which the width in the predetermined direction D2 is maintained along the reference direction D1. To form the above-described shape, the general side plates 5110 may be formed in a general plate shape, and the heat insulation side plates 5120 may be formed to be bent as illustrated.

Specifically, referring to FIG. 20, a section corresponding to the latent heat exchange area is a section from a second point A2 at which the inlet end of the upstream fin 431 is located to a point at which the outlet end of the downstream fin 432 is located. A section in which the reference cross-sectional area decreases along the reference direction D1 in the latent heat exchange area is formed between the second point A2 and a third point A3 and between a fourth point A4 and a sixth point A6. A section in which the reference cross-sectional area is maintained is formed between the third point A3 and the fourth point A4 and between the sixth point A6 and the outlet end of the downstream fin 432. Furthermore, a section between a first point A1 and the second point A2 that does not correspond to the latent heat exchange area, but is part of the heat exchange area is also a section in which the reference cross-sectional area decreases along the reference direction D1.

In FIG. 20, it can be seen that the heat exchange area is formed to include at least one section in which the width in the orthogonal direction decreases along the reference direction D1 and at least one section in which the width in the orthogonal direction remains constant.

Specifically, it can be seen that the width of the latent heat exchange area in the orthogonal direction decreases along the reference direction D1 in the section from the second point A2 to the third point A3 and in the section from the fourth point A4 to the sixth point A6. In contrast, it can be seen that the width in the orthogonal direction remains constant in the section from the third point A3 to the fourth point A4 and in the section from the sixth point A6 to the most downstream side of the housing 510.

It can be seen that in the section in which the straight portions 421 and 422 of the latent heat exchange pipe 420 are located, the width in the orthogonal direction approximately remains constant and heat exchange is sufficiently performed, and in the section located between the straight portions, the reference cross-sectional area decreases along the reference direction D1 to increase flow speed.

The shape of the heat exchange area may be described by defining the most upstream side of each fin 330, 432, or 432 based on the reference direction D1 as an inlet end and defining the most downstream side as an outlet end. The housing 510 may be provided such that the reference cross-sectional area gradually decreases from the outlet end of the sensible heat fin 330 to the inlet end of the latent heat fin 430 along the reference direction D1. That is, in FIG. 20, the housing 510 may be formed such that the reference cross-sectional area gradually decreases along the reference direction D1 in the section from the first point A1 at which the outlet end of the sensible heat fin 330 is located to the second point A2 at which the inlet end of the latent heat fin 430 is located.

The housing 510 may be provided such that the reference cross-sectional area of the inlet end of the downstream fin 432 is smaller than the reference cross-sectional area of the inlet end of the upstream fin 431. That is, the section between the second point A2 and a fifth point A5 includes at least one section in which the reference cross-sectional area decreases along the reference direction D1, such that the reference cross-sectional area at the fifth point A5 at which the inlet end of the downstream fin 432 is located is smaller than the reference cross-sectional area at the second point A2 at which the inlet end of the upstream fin 431 is located.

Referring to FIG. 20, the housing 510 may be formed such that the reference cross-sectional area of a partial section of the sensible heat exchange area also decreases along the reference direction D1.

As the width of the heat exchange area is changed as described above, each fin may have a section in which the width in the orthogonal direction decreases along the reference direction D1.

The area of the sensible heat fin 330 or the latent heat fin 430 in the heat exchange area that makes contact with the inner surface of the housing 510 may be provided such that the width gradually decreases along the reference direction D1 to correspond to a gradual reduction in the reference cross-sectional area based on the width of a fin defined in a direction perpendicular to the reference direction D1. Referring to FIG. 20, it can be seen that the area adjacent to the outlet end of the sensible heat fin 330 and the width of the upstream fin 431 located in the section from the fourth point A4 to the outlet end of the upstream fin 431 decrease along the reference direction D1 depending on the shape of the inner surface of the housing 510.

Figure 22:
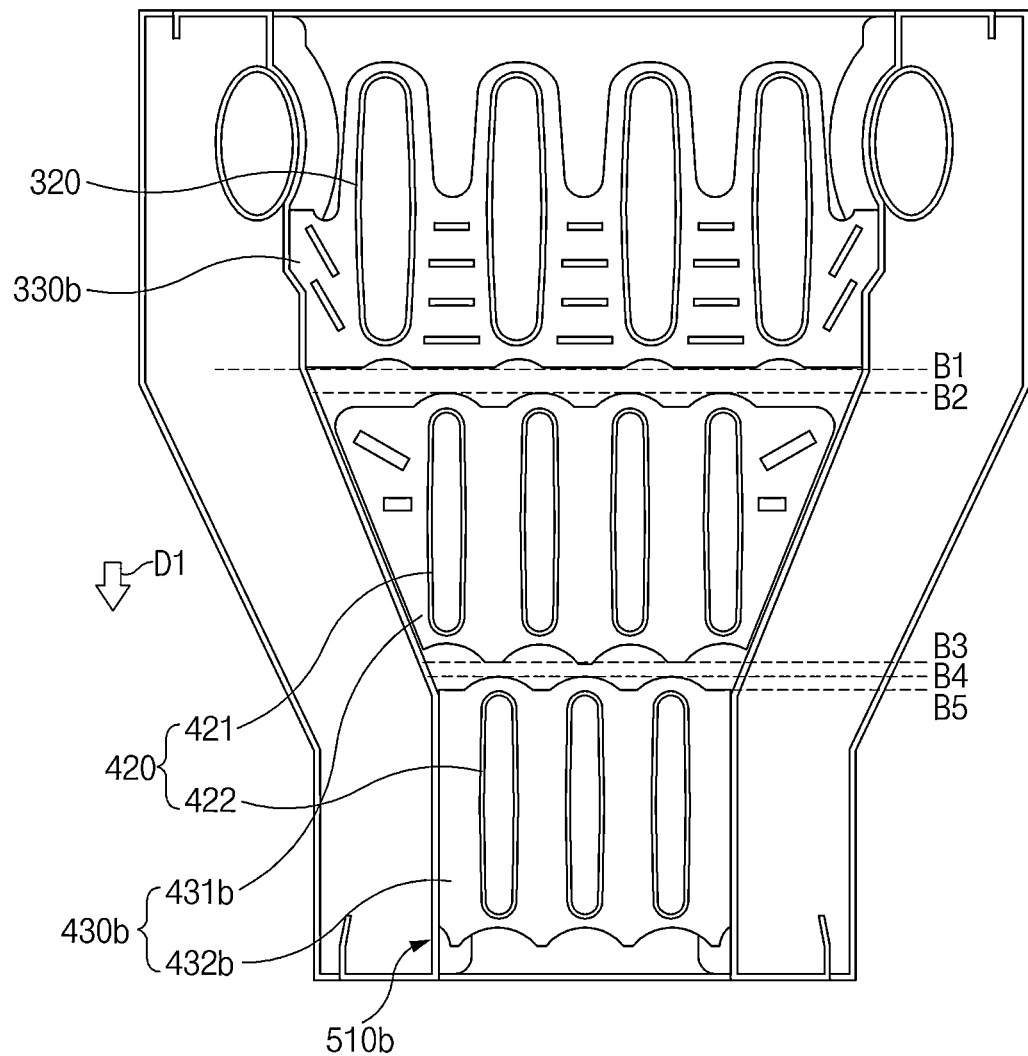
FIG. 22 is a vertical sectional view of a heat exchanger unit according to a first modified example of the third embodiment of the present disclosure.

FIG. 22 is a vertical sectional view of a heat exchanger unit according to a first modified example of the third embodiment of the present disclosure.

In FIG. 22, the form of the heat exchanger unit according to the first modified example of the third embodiment that has one row of sensible heat exchange pipes 320 and two rows of latent heat exchange pipes 420 as in the third embodiment of the present disclosure may be identified.

A housing 510b according to the first modified example of the third embodiment may also be provided such that the reference cross-sectional area at the most downstream side is smaller than the reference cross-sectional area at the most upstream side based on a reference direction D1.

The housing 510b may be provided such that at least one section in which the reference cross-sectional area gradually decreases along the reference direction D1 is formed to allow combustion gas to flow at higher speed in a latent heat exchange area than in a sensible heat exchange area. Descriptions of effects obtained by the heat exchanger unit as the section in which the reference cross-sectional area decreases is disposed are replaced with the contents described above with reference to FIG. 20.

The housing 510b may be provided such that the reference cross-sectional area gradually decreases from the outlet end of a sensible heat fin 330b to the inlet end of a latent heat fin 430b. The housing 510b may be formed such that the reference cross-sectional area gradually decreases along the reference direction D1 in the section from a first point B1 at which the outlet end of the sensible heat fin 330b is located to a second point B2 at which the inlet end of the latent heat fin 430b is located.

In the section from the second point B2 at which the inlet end of the latent heat fin 430b is located to the outlet end of a downstream fin 432b, a heat exchange area may have only a section in which the reference cross-sectional area gradually decreases along the reference direction D1 and a section in which the reference cross-sectional area is maintained. Accordingly, the reference cross-sectional area at the outlet end of the downstream fin 432b may be smaller than the reference cross-sectional area at the second point B2.

The housing 510b may be provided such that the reference cross-sectional area gradually decreases from the inlet end of the latent heat fin 430b to the outlet end of the latent heat fin 430b. The housing 510b may be formed such that the reference cross-sectional area of the section from the second point B2 at which the inlet end of an upstream fin 431b, which is a kind of the latent heat fin 430b, is located to a third point b3 at which the outlet end of the upstream fin 431b is located gradually decreases along the reference direction D1.

The housing 510b may be provided such that the reference cross-sectional area at the inlet end of the downstream fin 432b is smaller than the reference cross-sectional area at the inlet end of the upstream fin 431b. The housing 510b may be provided such that the reference cross-sectional area gradually decreases along the reference direction D1 in the section from the second point B2 at which the inlet end of the upstream fin 431b is located to a fourth point B4 at which the inlet end of the downstream fin 432b is located, and the condition may be satisfied.

Referring to the drawing, the latent heat exchange area may have a section from the second point B2 to a fifth point B5 in which the reference cross-sectional area gradually decreases along the reference direction D1 and a section from the fifth point B5 to the outlet end of the downstream fin 432b in which the reference cross-sectional area remains constant.

The area of the latent heat fin 430b that makes contact with the inner surface of the housing 510b may be provided such that the width gradually decreases along the reference direction D1 to correspond to a gradual reduction in the reference cross-sectional area based on the width of the fin defined in an orthogonal direction. Referring to the drawing, the housing 510b is provided such that the reference cross-sectional area of the section from the second point B2 at which the inlet end of the upstream fin 431b is located to the third point B3 at which the outlet end is located gradually decreases along the reference direction D1. Accordingly, a tapered shape may be formed such that the width of the upstream fin 431b defined in the orthogonal direction gradually decreases along the reference direction D1.

Figure 23:
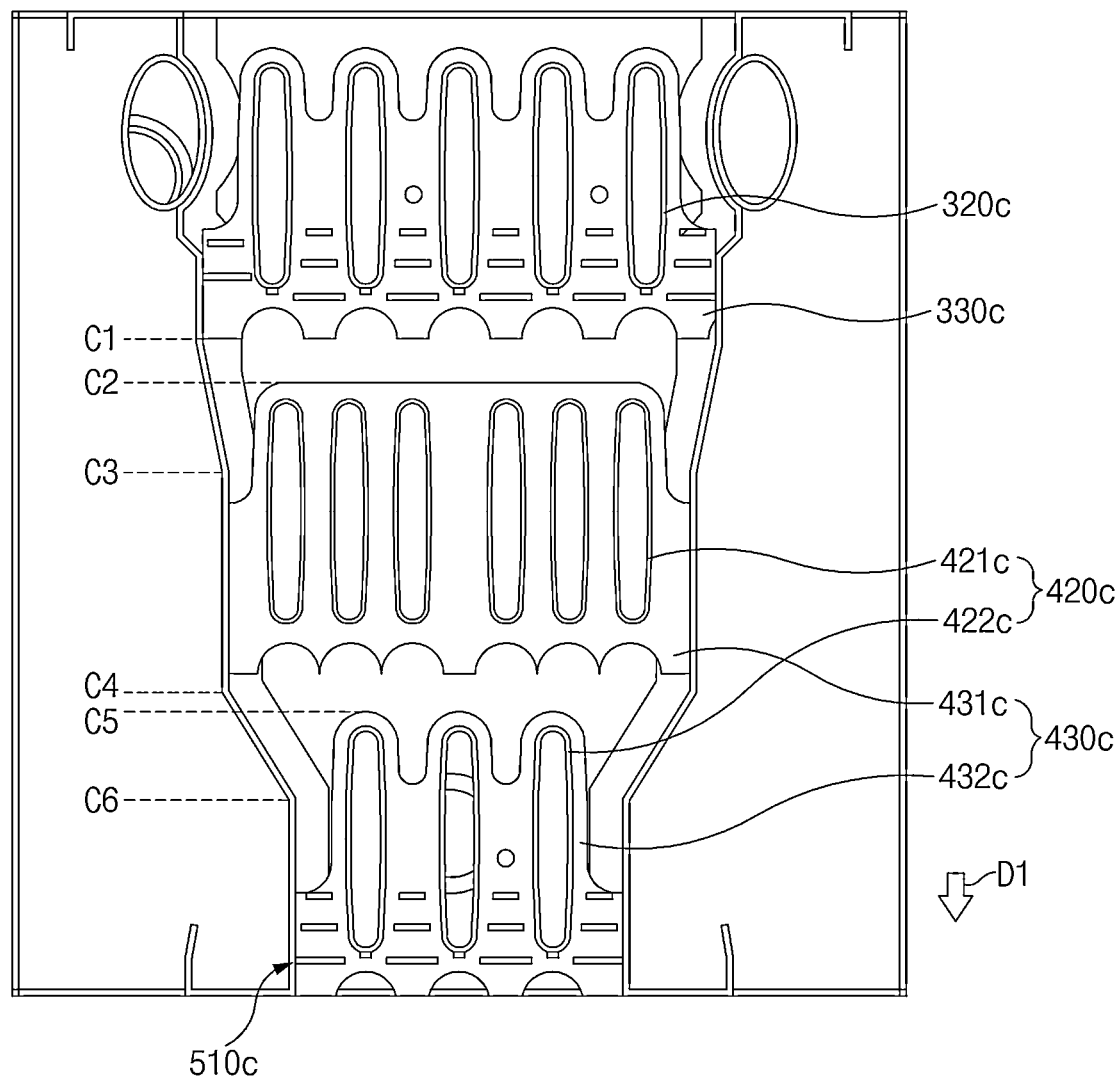
FIG. 23 is a vertical sectional view of a heat exchanger unit according to a second modified example of the third embodiment of the present disclosure.

FIG. 23 is a vertical sectional view of a heat exchanger unit according to a second modified example of the third embodiment of the present disclosure.

In FIG. 23, the form of the heat exchanger unit according to the second modified example of the third embodiment that has one row of sensible heat exchange pipes 320c and two rows of latent heat exchange pipes 420c as in the third embodiment of the present disclosure may be identified. The heat exchange pipes of the second modified example differ from the heat exchange pipes of the third embodiment in that in this modified example, the sensible heat exchange pipes 320c include a total of five straight portions and a total of six upstream straight portions 421c are disposed.

A housing 510c according to the second modified example of the third embodiment may also be provided such that the reference cross-sectional area at the most downstream side is smaller than the reference cross-sectional area at the most upstream side based on a reference direction D1.

The housing 510c may be provided such that at least one section in which the reference cross-sectional area gradually decreases along the reference direction D1 is formed to allow combustion gas to flow at higher speed in a latent heat exchange area than in a sensible heat exchange area. Descriptions of effects obtained by the heat exchanger unit as the section in which the reference cross-sectional area decreases is disposed are replaced with the contents described above with reference to FIG. 20.

The housing 510c may be provided such that the reference cross-sectional area gradually decreases from the outlet end of a sensible heat fin 330c to the inlet end of a latent heat fin 430c. The housing 510c may be formed such that the reference cross-sectional area of the section from a first point C1 at which the outlet end of the sensible heat fin 330c is located to a second point C2 at which the inlet end of the latent heat fin 430c is located gradually decreases along the reference direction D1.

The housing 510c may be provided such that in the section from the second point C2 at which the inlet end of the latent heat fin 430c is located to the outlet end of a downstream fin 432c, a heat exchange area has only a section in which the reference cross-sectional area gradually decreases along the reference direction D1 and a section in which the reference cross-sectional area is maintained. Accordingly, the reference cross-sectional area at the outlet end of the downstream fin 432c may be smaller than the reference cross-sectional area at the second point C2.

By more specifically limiting the shape of the latent heat exchange area, the housing 510c may be provided such that the reference cross-sectional area at the inlet end of the downstream fin 432c is smaller than the reference cross-sectional area at the inlet end of an upstream fin 431c. The housing 510c may be provided such that the reference cross-sectional area gradually decreases along the reference direction D1 in the section from the second point C2 at which the inlet end of the upstream fin 431c is located to a fifth point C5 at which the inlet end of the downstream fin 432c is located, and the condition may be satisfied.

Referring to the drawing, the latent heat exchange area may have a section from the second point C2 to a third point C3 and a section from the fifth point C5 to a sixth point C6, which are sections in which the reference cross-sectional area gradually decreases along the reference direction D1, and a section from the third point C3 to a fourth point C4 and a section from the sixth point C6 to the outlet end of the downstream fin 432c, which are sections in which the reference cross-sectional area remains constant.

According to the second modified example of the third embodiment of the present disclosure, the inlet end of one of the latent heat fins 430c may be formed to be flat without having a plurality of valleys and protruding portions, like another fin.

Figure 24:
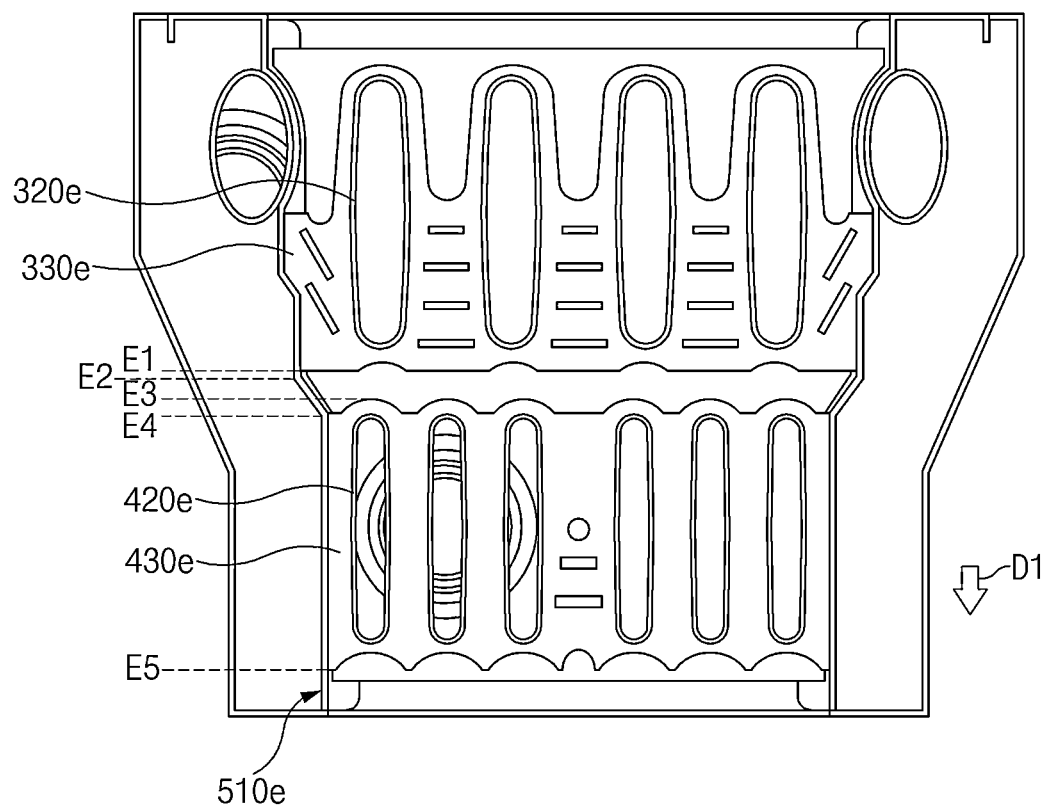
FIG. 24 is a vertical sectional view of a heat exchanger unit according to a third modified example of the third embodiment of the present disclosure.

FIG. 24 is a vertical sectional view of a heat exchanger unit according to a third modified example of the third embodiment of the present disclosure.

Referring to FIG. 24, the heat exchanger unit according to the third modified example of the third embodiment of the present disclosure includes one row of sensible heat exchange pipes 320e and one row of latent heat exchange pipes 420e. The sensible heat exchange pipes 320e include four straight portions, and the latent heat exchange pipes 420e include six straight portions. However, the numbers of straight portions are not limited thereto.

A housing 510e according to the third modified example of the third embodiment may also be provided such that the reference cross-sectional area at the most downstream side is smaller than the reference cross-sectional area at the most upstream side based on a reference direction D1.

The housing 510e may be provided such that at least one section in which the reference cross-sectional area gradually decreases along the reference direction D1 is formed to allow combustion gas to flow at higher speed in a latent heat exchange area than in a sensible heat exchange area. Descriptions of effects obtained by the heat exchanger unit as the section in which the reference cross-sectional area decreases is disposed are replaced with the contents described above with reference to FIG. 20.

The housing 510e may be provided such that the reference cross-sectional area gradually decreases from the outlet end of a sensible heat fin 330e to the inlet end of a latent heat fin 430e. The housing 510e may be formed such that the reference cross-sectional area is maintained in the section from a first point E1 at which the outlet end of the sensible heat fin 330e is located to a second point E2 located downstream of the first point E1 and the reference cross-sectional area of the section from the second point E2 to a third point E3 at which the inlet end of the latent heat fin 430e is located gradually decreases along the reference direction D1. Accordingly, the reference cross-sectional area does not increase from the outlet end of the sensible heat fin 330e to the inlet end of the latent heat fin 430e.

The housing 510e may be provided such that in the section from the third point E3 at which the inlet end of the latent heat fin 430e is located to a fifth point E5 at which the outlet end of the latent heat fin 430e is located, a heat exchange area has only a section in which the reference cross-sectional area gradually decreases along the reference direction D1 and a section in which the reference cross-sectional area is maintained. In the section from the third point E3 at which the inlet end of the latent heat fin 430e is located to a fourth point E4 located downstream of the third point E3, the reference cross-sectional area may gradually decrease along the reference direction D1, and in the section from the fourth point E4 to the fifth point E5, the reference cross-sectional area remains constant. Accordingly, the reference cross-sectional area at the fifth point E5 at which the outlet end of the latent heat fin 430e is located may be smaller than the reference cross-sectional area at the third point E3 at which the inlet end of the latent heat fin 430e is located.

The housing 510e may be provided such that a first section in which the reference cross-sectional area gradually decreases from the outlet end of the sensible heat fin 330e to the inlet end of the latent heat fin 430e and a second section in which the reference cross-sectional area is maintained between the most upstream side and the outlet end of the latent heat fin 430e based on the reference direction D1 in the area where the latent heat fin 430e makes contact with the housing 510e are formed. The first section is a section from the second point E2 adjacent to the outlet end of the sensible heat fin 330e to the third point E3 at which the inlet end of the latent heat fin 430e is located, and the second section is a section from the fourth point E4 to the fifth point E5. The area of the latent heat fin 430e that makes contact with the inner surface of the housing 510e may be provided such that the width of a portion corresponding to the second section remains constant based on the width of a fin defined in an orthogonal direction perpendicular to the reference direction D1.

Referring to the drawing, the latent heat exchange area may have a section from the second point E2 to the fourth point E4, which is a section in which the reference cross-sectional area gradually decreases along the reference direction D1, and a section from the first point E1 to the second point E2 and a section from the fourth point E4 to the fifth point E5, which are sections in which the reference cross-sectional area remains constant.

Figure 25:
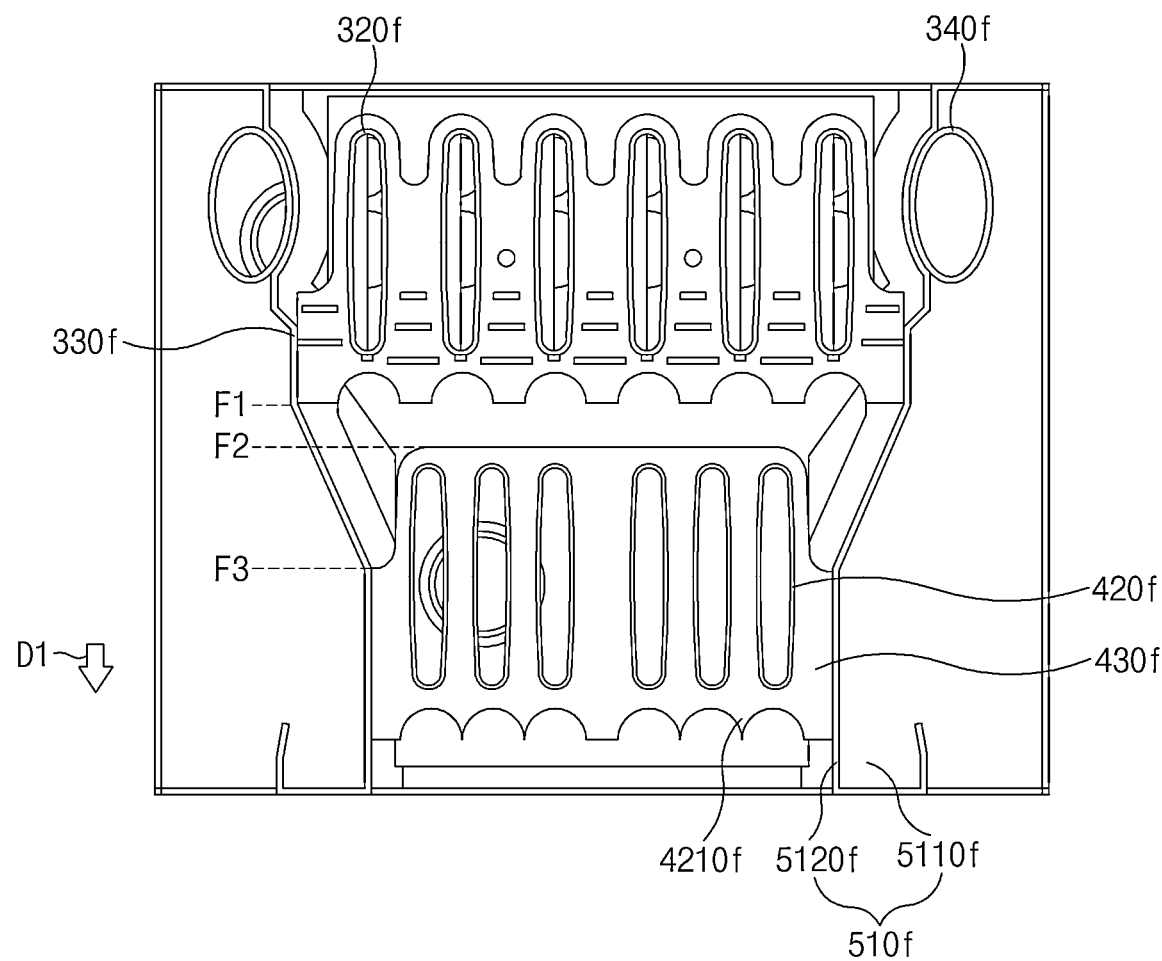
FIG. 25 is a vertical sectional view of a heat exchanger unit according to a fourth modified example of the third embodiment of the present disclosure.

FIG. 25 is a vertical sectional view of a heat exchanger unit according to a fourth modified example of the third embodiment of the present disclosure.

Referring to FIG. 25, the heat exchanger unit according to the fourth modified example of the third embodiment of the present disclosure includes one row of sensible heat exchange pipes 320*f* and one row of latent heat exchange pipes 420*f*. The sensible heat exchange pipes 320*f* include six straight portions, and the latent heat exchange pipes 420*f* include six straight portions. However, the numbers of straight portions are not limited thereto.

A housing 510*f* according to the fourth modified example of the third embodiment may also be provided such that the reference cross-sectional area at the most downstream side is smaller than the reference cross-sectional area at the most upstream side based on a reference direction D1.

The housing 510*f* may be provided such that at least one section in which the reference cross-sectional area gradually decreases along the reference direction D1 is formed to allow combustion gas to flow at higher speed in a latent heat exchange area than in a sensible heat exchange area. Descriptions of effects obtained by the heat exchanger unit as the section in which the reference cross-sectional area decreases is disposed are replaced with the contents described above with reference to FIG. 20.

The housing 510*f* may be provided such that the reference cross-sectional area gradually decreases from the outlet end of a sensible heat fin 330*f* to the inlet end of a latent heat fin 430*f*. The housing 510*f* may be formed such that the reference cross-sectional area of the section from a first point F1 at which the outlet end of the sensible heat fin 330*f* is located to a second point F2 at which the inlet end of the latent heat fin 430*f* is located gradually decreases along the reference direction D1. Accordingly, the reference cross-sectional area does not increase from the outlet end of the sensible heat fin 330*f* to the inlet end of the latent heat fin 430*f*.

The housing 510*f* may be provided such that in the section from the second point F2 at which the inlet end of the latent heat fin 430*f* is located to the outlet end of the latent heat fin 430*f*, a heat exchange area has only a section in which the reference cross-sectional area gradually decreases along the reference direction D1 and a section in which the reference cross-sectional area is maintained. In the section from the second point F2 at which the inlet end of the latent heat fin 430*f* is located to a third point F3 located downstream of the second point F2, the reference cross-sectional area may gradually decrease along the reference direction D1, and in the section from the third point F3 to the outlet end of the latent heat fin 430*f*, the reference cross-sectional area may remain constant. Accordingly, the reference cross-sectional area at the outlet end of the latent heat fin 430*f* may be smaller than the reference cross-sectional area at the second point F2 at which the inlet end of the latent heat fin 430*f* is located.

Referring to the drawing, the latent heat fin 430*f* according to the fourth modified example of the third embodiment of the present disclosure may include a pointed portion 4210*f* at the most downstream-side end thereof. The pointed portion 4210*f* is a portion in which the width in an orthogonal direction perpendicular to the reference direction D1 decreases along the reference direction D1, and a plurality of pointed portions 4210*f* may be provided along the orthogonal direction. The pointed portion may have the above-described shape such that condensate formed on the latent heat fin 430*f* by a phase change of the combustion gas is collected.

The descriptions of the configurations of the housings according to the modified examples of the third embodiment may be applied to other embodiments of the present disclosure and modified examples thereof.

Figure 26:
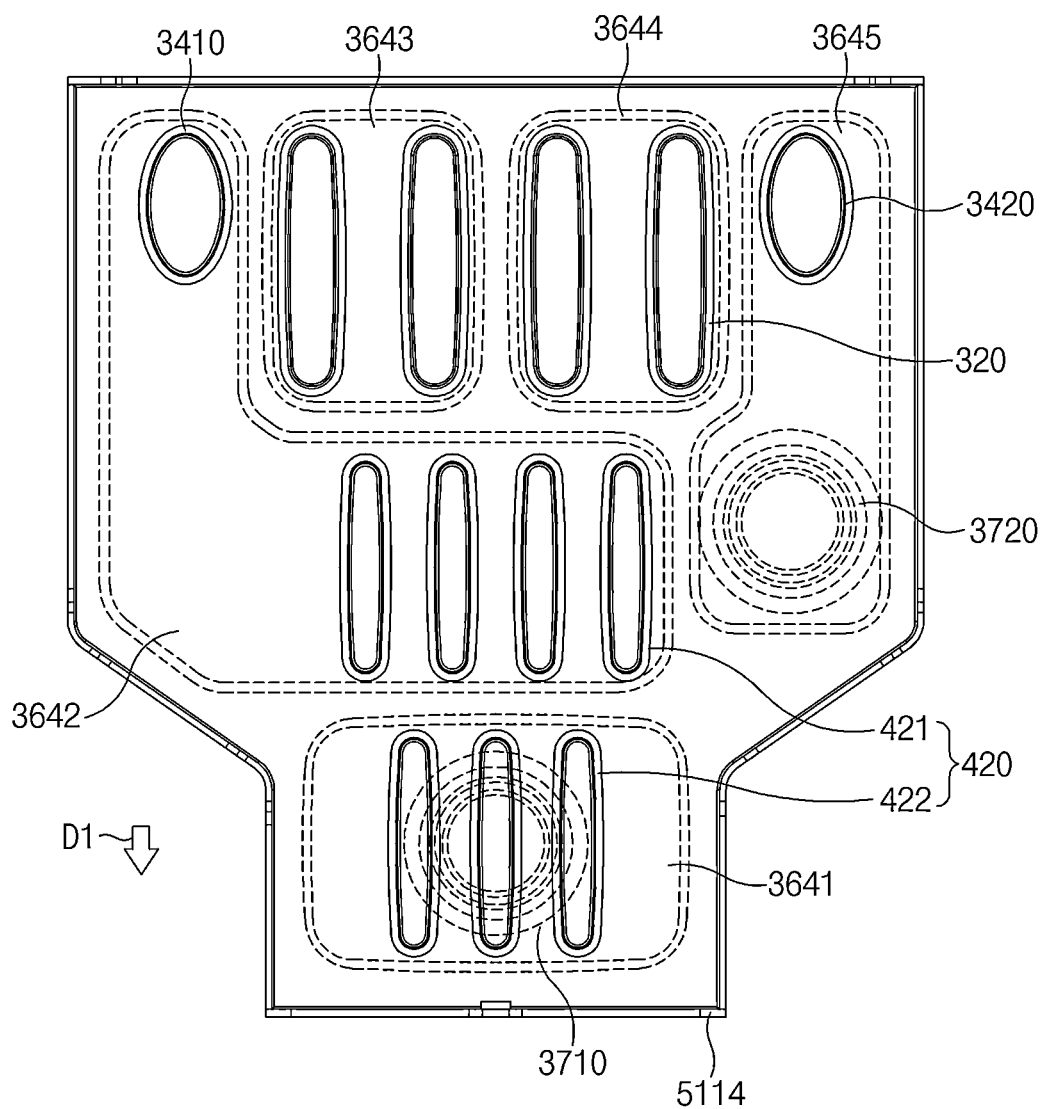
FIG. 26 is a view illustrating a second general side plate of the heat exchanger unit according to the third embodiment of the present disclosure together with flow passage caps included in the second flow passage cap plate.
Figure 27:
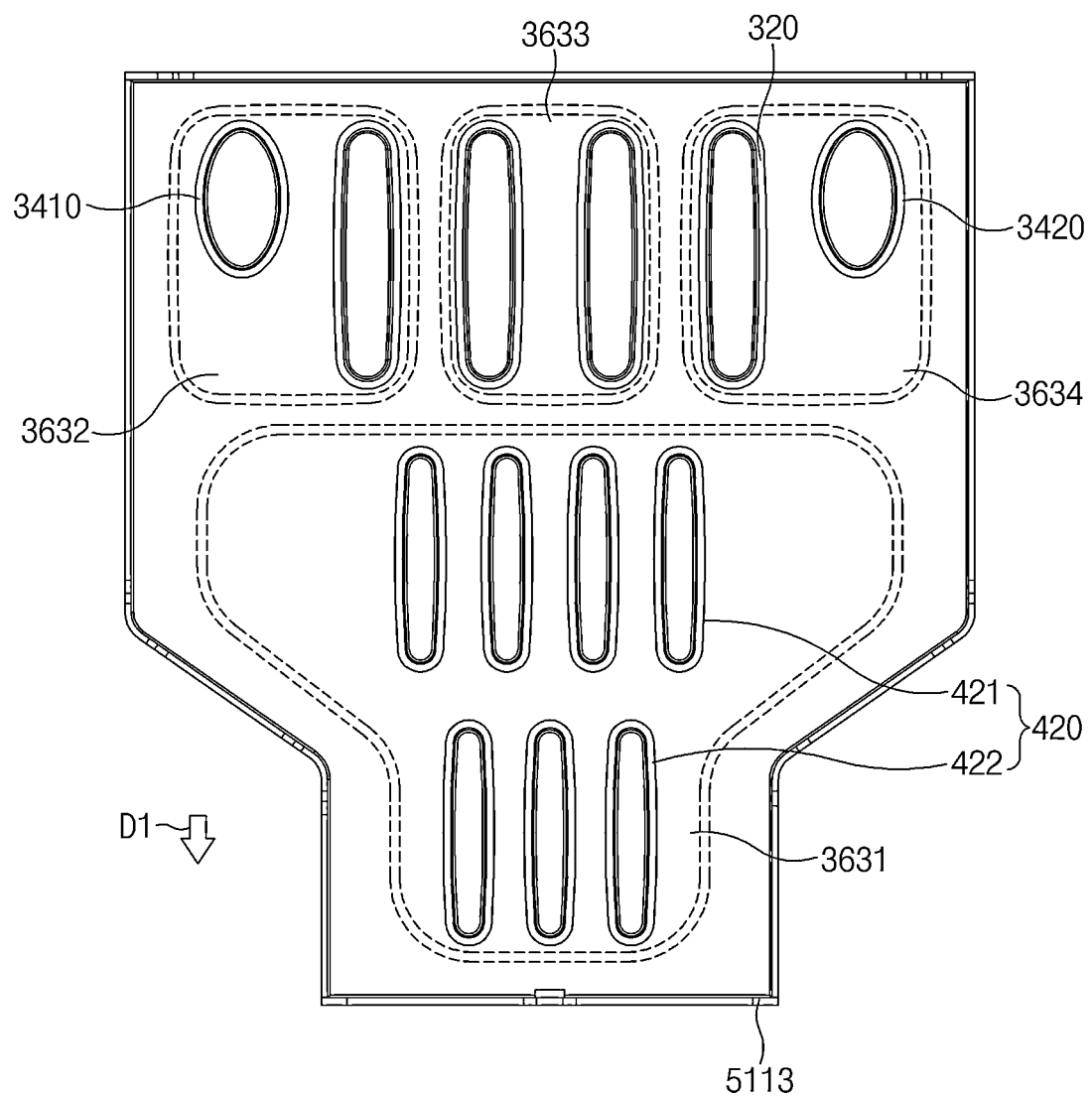
FIG. 27 is a view illustrating a first general side plate of the heat exchanger unit according to the third embodiment of the present disclosure together with flow passage caps included in the first flow passage cap plate.
Figure 28:
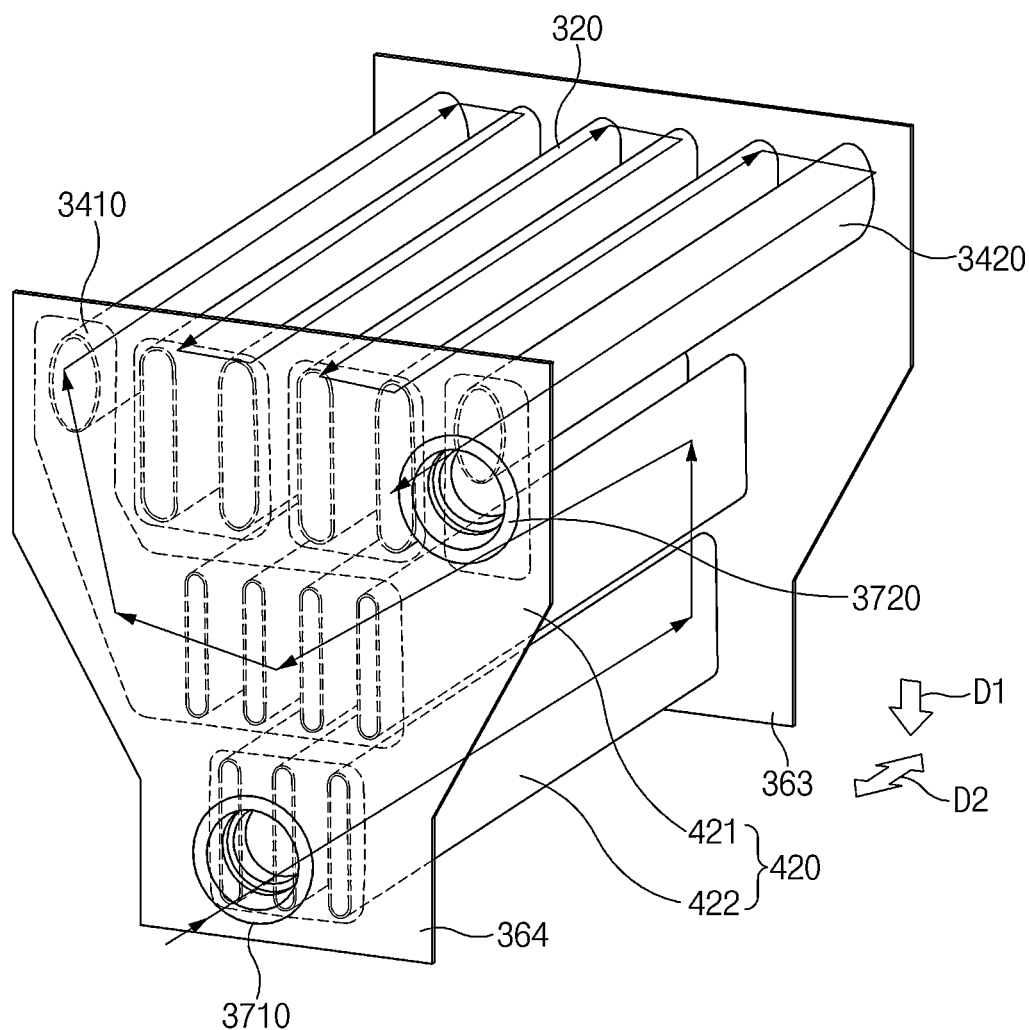
FIG. 28 is a perspective view illustrating all flow passages included in the heat exchanger unit according to the third embodiment of the present disclosure.

FIG. 26 is a view illustrating the second general side plate 5114 of the heat exchanger unit according to the third embodiment of the present disclosure together with flow passage caps included in the second flow passage cap plate 364. FIG. 27 is a view illustrating the first general side plate 5113 of the heat exchanger unit according to the third embodiment of the present disclosure together with flow passage caps included in the first flow passage cap plate 363. FIG. 28 is a perspective view illustrating all the flow passages included in the heat exchanger unit according to the third embodiment of the present disclosure.

Flow passages formed by the sensible heat exchange pipe 320, the latent heat exchange pipe 420, and the flow passage cap plates 363 and 364 of the heat exchanger unit according to the third embodiment of the present disclosure will be described below with reference to FIGS. 26 to 28. For a better understanding of areas through which the flow passages pass, the flow passage caps of the flow passage cap plates 363 and 364 are not illustrated in FIG. 28 in a state in which the general side plates 5110, the heat insulation side plates 5120, and the fins of the heat exchanger unit are removed.

Referring to the other modified example of the first embodiment of FIG. 29, FIG. 26 is view in which flow passage caps 3641, 3642, 3643, 3644, and 3645 of the second flow passage cap plate 364 are illustrated by dotted lines on a view of the second general side plate 5114, the sensible heat exchange pipe 320, the latent heat exchange pipe 420, and sensible heat insulation pipes 3410 and 3420 of the third embodiment of the present disclosure that corresponds to a view of the heat exchanger unit when viewed from the second connection flow passage cap plate 72 of FIG. 29 along line H-H'. FIG. 27 is a view in which flow passage caps 3631, 3632, 3633, and 3634 of the first flow passage cap plate 363 are illustrated by dotted lines on a view of the first general sensible heat side plate 5111, the sensible heat exchange pipe 320, the latent heat exchange pipe 420, and the sensible heat insulation pipes 3410 and 3420 of the third embodiment of the present disclosure that corresponds to a view of the first main general side plate 5111, into which the first connection flow passage cap plate 71 is inserted, when viewed along line G-G' of FIG. 29.

The sensible heat straight portions may form a sensible flow passage through which the heating-water flows, and the latent heat straight portions 421 and 422 may form a latent heat flow passage through which the heating-water flows and that is connected to the sensible heat flow passage. The sensible heat flow passage may include a series flow passage in at least a partial section, and the latent heat flow passage may include a parallel flow passage in at least a partial section.

As described above, the flow passage cap plates 363 and 364 may include the first flow passage cap plate 363 and the second flow passage cap plate 364. The second flow passage cap plate 364 may have the first flow passage cap 3641, the second flow passage cap 3642, the third flow passage cap 3643, the fourth flow passage cap 3644, and the fifth flow passage cap 3645 formed thereon, and the first flow passage cap plate 363 may have the sixth flow passage cap 3631, the seventh flow passage cap 3632, the eighth flow passage cap 3633, and the ninth flow passage cap 3634 formed thereon. The flow passage caps formed on the flow passage cap plates 363 and 364 are formed in a convex shape toward the outside of the heat exchanger unit and are connected with the ends of the straight portions included in the sensible heat exchange pipe 320 or the ends of the straight portions 421 and 422 included in the latent heat exchange pipe 420 to allow the heating-water to flow inside. When the flow passage caps of the flow passage cap plates 363 and 364 cover the general side plates (5110 of FIG. 17), the heating-water flows in the space formed by the general side plates and the flow passage caps.

The heating-water supply hole 3710 is formed in the first flow passage cap 3641 located at the most downstream side of the second flow passage cap plate 364 based on the reference direction D1. The heating-water is introduced into the heat exchanger unit through the heating-water supply hole 3710. The introduced heating-water flows through the downstream straight portions 422, each having one end connected to the first flow passage cap 3641. Accordingly, the downstream straight portions 422 may form a parallel flow passage.

The heating-water reaches the sixth flow passage cap 3631, to which an opposite end of each downstream straight portion 422 is connected, through the downstream straight portion 422. The opposite end of the downstream straight portion 422 and one end of each upstream straight portion 421 are connected to the sixth flow passage cap 3631. Accordingly, the heating-water is introduced into the upstream straight portions 421 from the sixth flow passage cap 3631 and flows along the upstream straight portions 421. Accordingly, the upstream straight portions 421 may form a parallel flow passage.

An opposite end of each upstream straight portion 421 is connected to the second flow passage cap 3642, and the heating-water flowing along the upstream straight portion 421 is delivered to the second flow passage cap 3642. The second flow passage cap 3642 is connected with the first sensible heat insulation pipe 3410 and delivers the heating-water to the first sensible heat insulation pipe 3410.

The heating-water moving along the first sensible heat insulation pipe 3410 reaches the seventh flow passage cap 3632 to which the first sensible heat insulation pipe 3410 is connected. A sensible heat flow passage in a zigzag form is formed along the sensible heat straight portions arranged in sequence from the seventh flow passage cap 3632 and connected in series, and the heating-water flows along the sensible heat flow passage from the seventh flow passage cap 3632 to the third flow passage cap 3643, from the third flow passage cap 3643 to the eighth flow passage cap 3633, from the eighth flow passage cap 3633 to the fourth flow passage cap 3644, and from the fourth flow passage cap 3644 to the ninth flow passage cap 3634. In a case where the sensible heat insulation pipes 3410 and 3420 are arranged as in the third embodiment of the present disclosure, the sensible heat flow passage may be implemented by connection of the straight portions included in the sensible heat insulation pipes 3410 and 3420 and the sensible heat exchange pipe 32.

The ninth flow passage cap 3634 is also connected with the second sensible heat insulation pipe 3420, and the heating-water flows along the second sensible heat insulation pipe 3420 and reaches the fifth flow passage cap 3645. The fifth flow passage cap 3645 is connected with the heating-water discharge hole 3720, and the heating-water delivered through the second sensible heat insulation pipe 3420 is discharged in a heated state through the heating-water discharge hole 3720. The entire flow passage in which the heating-water is delivered between the downstream straight portions 422 and the upstream straight portions 421 connected with each other and the heating-water is delivered between the upstream straight portions 421 and the latent heat flow passage connected with each other is illustrated by arrows in FIG. 28. The heating-water is heated and discharged while flowing along the entire flow passage.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The invention claimed is:

1. A heat exchanger unit comprising:
    a sensible heat exchanger including a sensible heat exchange pipe disposed in a sensible heat exchange area and configured to receive water and allow the water to flow through the sensible heat exchange pipe and a sensible heat fin disposed in the sensible heat exchange area and formed in a plate shape across the sensible heat exchange pipe such that the sensible heat exchange pipe passes through the sensible heat fin, the sensible heat exchange area being configured to receive sensible heat generated by a combustion reaction and heat the water; and
    a latent heat exchanger including a latent heat exchange pipe disposed in a latent heat exchange area and configured to receive the water and allow the water to flow through the latent heat exchange pipe, wherein the latent heat exchange area is located downstream of the sensible heat exchange area with respect to a reference direction that is a flow direction of combustion gas generated during the combustion reaction, the latent heat exchange area being configured to receive latent heat generated during a phase change of the combustion gas and heat the water, and a latent heat fin disposed in the latent heat exchange area and formed in a plate shape across the latent heat exchange pipe such that the latent heat exchange pipe passes through the latent heat fin; and a housing configured to surround the heat exchange areas to define the heat exchange areas therein, wherein when a cross-sectional area of the heat exchange area defined on a plane perpendicular to the reference direction is referred to as a reference cross-sectional area and the most upstream side and the most downstream side of the sensible heat exchanger or the latent heat exchanger with respect to the reference direction are referred to as an inlet end and an outlet end, a section in which the reference cross-sectional area is reduced along the reference direction is formed between an inlet end of the sensible heat fin and an outlet end of the sensible heat fin.

2. The heat exchanger unit of claim 1, wherein the housing is provided such that at a predetermined point on the latent heat exchange area spaced apart from the outlet end of the latent heat exchange pipe in a direction opposite to the reference direction, the combustion gas flows at a speed increased by the section, in which the reference cross-sectional area is reduced, compared to a speed at the inlet end of the sensible heat exchange pipe.

3. The heat exchanger unit of claim 1, wherein the housing is provided such that a reference cross-sectional area at the most downstream side is smaller than a reference cross-sectional area at the most upstream side with respect to the reference direction.

4. The heat exchanger unit of claim 1, wherein the housing is provided such that a first section in which the reference cross-sectional area is reduced from the outlet end of the sensible heat exchange pipe toward the inlet end of the latent heat exchange pipe and a second section in which the reference cross-sectional area is maintained between the inlet end of the latent heat exchange pipe and the outlet end of the latent heat exchange pipe are formed.

5. The heat exchanger unit of claim 1, wherein the sensible heat fin includes a plurality of sensible heat fins, and the latent heat fin includes a plurality of latent heat fins, and wherein a distance by which two latent heat fins adjacent to each other among the plurality of latent heat fins are spaced apart from each other is longer than a distance by which two sensible heat fins adjacent to each other among the plurality of sensible heat fins are spaced apart from each other.

6. The heat exchanger unit of claim 1, wherein the latent heat fin includes a plurality of upstream fins located at an upstream side with respect to the reference direction and a plurality of downstream fins located at a downstream side, and wherein a distance by which two downstream fins adjacent to each other among the plurality of downstream fins are spaced apart from each other is longer than a distance by which two upstream fins adjacent to each other among the plurality of upstream fins are spaced apart from each other.

7. The heat exchanger unit of claim 1, wherein the sensible heat fin includes a plurality of sensible heat fins and the latent heat fin includes a plurality of latent heat fins, wherein the plurality of latent heat fins form at least one layer in which latent heat fins located in the same position with respect to the reference direction are disposed, and wherein the total number of latent heat fins disposed in a layer at the most downstream side with respect to the reference direction is smaller than the total number of sensible heat fins.

8. The heat exchanger unit of claim 1, wherein the latent heat fin includes, on an end portion at the most downstream side of the latent heat fin with respect to the reference direction, a pointed portion in which a width in a direction perpendicular to the reference direction decreases along the reference direction to collect condensate formed by the phase change of the combustion gas.

9. The heat exchanger unit of claim 1, wherein the sensible heat exchange pipe includes a plurality of sensible heat straight portions extending along a predetermined direction, the plurality of sensible heat straight portions being arranged to be spaced apart from each other along an orthogonal direction perpendicular to the predetermined direction and configured to form a sensible heat flow passage through which the water flows, and wherein the latent heat exchange pipe includes a plurality of latent heat straight portions extending along the predetermined direction, the plurality of latent heat straight portions being arranged to be spaced apart from each other along the orthogonal direction and configured to form a latent heat flow passage through which the water flows and that is fluidly connected to the sensible heat flow passage.

10. The heat exchanger unit of claim 9, wherein the sensible heat flow passage includes a series flow passage in at least a partial section, and wherein the latent heat flow passage includes a parallel flow passage in at least a partial section.

11. The heat exchanger unit of claim 9, wherein based on a cross-section depending on a plane perpendicular to the predetermined direction, a cross-sectional area of an interior space of the sensible heat straight portion is larger than a cross-sectional area of an interior space of the latent heat straight portion.

12. The heat exchanger unit of claim 9, wherein the latent heat straight portion includes an upstream straight portion located at an upstream side with respect to the reference direction and a downstream straight portion located at a downstream side, and wherein the section in which the reference cross-sectional area is reduced along the reference direction is additionally formed between an outlet end of the upstream straight portion and an inlet end of the downstream straight portion.

13. The heat exchanger unit of claim 12, wherein based on a cross-section depending on a plane perpendicular to the predetermined direction, a cross-sectional area of an interior space of the downstream straight portion is larger than or equal to a cross-sectional area of an interior space of the upstream straight portion.

14. The heat exchanger unit of claim 9, wherein based on a cross-section depending on a plane perpendicular to the predetermined direction, an interior space of the sensible heat straight portion and an interior space of the latent heat straight portion have a shape of a long hole extending along the reference direction.

15. The heat exchanger unit of claim 14, wherein the long hole is formed such that a value obtained by dividing a length in the reference direction by a width in a direction perpendicular to the reference direction equals 2 or more.

16. The heat exchanger unit of claim 9, wherein an outlet of the sensible heat flow passage and an inlet of the latent heat flow passage are formed in one of side plates configured to form the housing.

17. The heat exchanger unit of claim 9, further comprising:
a flow passage cap plate including, between the flow passage cap plate and one side plate among side plates configured to form the housing, a flow passage cap having a connection space surrounding an outlet of the latent heat flow passage and an inlet of the sensible heat flow passage to fluidly connect the outlet of the latent heat flow passage exposed outside the one side plate and the inlet of the sensible heat flow passage exposed outside the one side plate.

18. The heat exchanger unit of claim 9, wherein the number of sensible heat straight portions is smaller than the number of latent heat straight portions.

19. The heat exchanger unit of claim 1, wherein the sensible heat exchange pipe includes a plurality of sensible heat straight portions extending along a predetermined direction, the plurality of sensible heat straight portions being arranged to be spaced apart from each other along an orthogonal direction perpendicular to the predetermined direction and configured to form a sensible heat flow passage through which the water flows, and wherein based on a cross-section depending on a plane perpendicular to the predetermined direction, an interior space of the sensible heat straight portion has a shape of a long hole extending along the reference direction.

* * * * *